(12) United States Patent
Cheatham, III et al.

(10) Patent No.: US 11,170,901 B2
(45) Date of Patent: Nov. 9, 2021

(54) FISSION REACTION CONTROL IN A MOLTEN SALT REACTOR

(71) Applicant: TerraPower, LLC, Bellevue, WA (US)

(72) Inventors: Jesse R. Cheatham, III, Seattle, WA (US); Anselmo T. Cisneros, Jr., Seattle, WA (US); Jeffery F. Latkowski, Mercer Island, WA (US); James M. Vollmer, Kirkland, WA (US); Christopher J. Johns, Tocoma, WA (US)

(73) Assignee: TerraPower, LLC, Bellevue, WA (US)

( * ) Notice: Subject to any disclaimer, the term of this patent is extended or adjusted under 35 U.S.C. 154(b) by 31 days.

(21) Appl. No.: 16/595,064

(22) Filed: Oct. 7, 2019

(65) Prior Publication Data

US 2020/0118698 A1    Apr. 16, 2020

Related U.S. Application Data

(63) Continuation of application No. 14/981,606, filed on Dec. 28, 2015, now Pat. No. 10,438,705.
(Continued)

(51) Int. Cl.
*G21C 19/28*    (2006.01)
*G21C 7/30*    (2006.01)
(Continued)

(52) U.S. Cl.
CPC .................. *G21C 7/30* (2013.01); *G21C 1/03* (2013.01); *G21C 1/22* (2013.01); *G21C 3/24* (2013.01);
(Continued)

(58) Field of Classification Search
None
See application file for complete search history.

(56) References Cited

U.S. PATENT DOCUMENTS

| 2,375,009 A | 5/1945 | Lepsoe |
| 2,874,106 A | 2/1959 | Hammond et al. |

(Continued)

FOREIGN PATENT DOCUMENTS

| CA | 631890 A | 11/1961 |
| CN | 107112055 | 9/2020 |

(Continued)

OTHER PUBLICATIONS

Rykhlevskii, Andrei, et al. Fuel cycle performance of fast spectrum molten salt reactor designs. Oak Ridge National Lab.(ORNL), Oak Ridge, TN (United States), 2019. (Year: 2019).*

(Continued)

*Primary Examiner* — Lily C Garner

(57) ABSTRACT

A molten salt reactor includes a nuclear reactor core for sustaining a nuclear fission reaction fueled by a molten fuel salt. A molten fuel salt control system removes a volume of the molten fuel salt from the nuclear reactor core to maintain a reactivity parameter within a range of nominal reactivity. The molten fuel salt control system includes a molten fuel salt exchange system that fluidically couples to the nuclear reactor core and exchanges a volume of the molten fuel salt with a volume of a feed material containing a mixture of a selected fertile material and a carrier salt. The molten fuel salt control system can include a volumetric displacement control system having one or more volumetric displacement bodies insertable into the nuclear reactor core. Each volumetric displacement body can remove a volume of molten fuel salt from the nuclear reactor core, such as via a spill-over system.

10 Claims, 15 Drawing Sheets

Related U.S. Application Data

(60) Provisional application No. 62/234,889, filed on Sep. 30, 2015, provisional application No. 62/098,984, filed on Dec. 31, 2014, provisional application No. 62/097,235, filed on Dec. 29, 2014.

(51) Int. Cl.
| | | |
|---|---|---|
| *G21C 1/22* | (2006.01) | |
| *G21C 3/24* | (2006.01) | |
| *G21C 1/03* | (2006.01) | |
| *G21C 3/54* | (2006.01) | |
| *G21C 15/28* | (2006.01) | |
| *G21C 19/30* | (2006.01) | |
| *G21C 19/50* | (2006.01) | |
| *G21C 19/303* | (2006.01) | |
| G21C 19/20 | (2006.01) | |
| G21C 17/104 | (2006.01) | |
| G21C 3/22 | (2006.01) | |

(52) U.S. Cl.
CPC ............. *G21C 3/54* (2013.01); *G21C 15/28* (2013.01); *G21C 19/28* (2013.01); *G21C 19/30* (2013.01); *G21C 19/303* (2013.01); *G21C 19/50* (2013.01); *G21C 3/22* (2013.01); *G21C 17/104* (2013.01); *G21C 19/205* (2013.01); *Y02E 30/30* (2013.01)

(56) References Cited

U.S. PATENT DOCUMENTS

| | | |
|---|---|---|
| 2,920,024 A | 1/1960 | Barton et al. |
| 2,945,794 A | 7/1960 | Winters et al. |
| 3,018,239 A | 1/1962 | Happell |
| 3,029,130 A | 4/1962 | Moore |
| 3,046,212 A | 7/1962 | Anderson |
| 3,136,700 A | 6/1964 | Poppendiek et al. |
| 3,216,901 A | 11/1965 | Teitel |
| 3,218,160 A | 11/1965 | Knighton et al. |
| 3,262,856 A | 7/1966 | Bettis |
| 3,287,225 A | 11/1966 | Ackroyd et al. |
| 3,383,285 A | 5/1968 | Ackroyd et al. |
| 3,450,198 A | 6/1969 | Brunner |
| 3,743,577 A | 7/1973 | Bettis et al. |
| 3,785,924 A | 1/1974 | Notari |
| 3,909,351 A | 9/1975 | Tilliette |
| 3,996,099 A | 12/1976 | Faugeras |
| 3,997,413 A | 12/1976 | Fougner |
| 4,039,377 A | 8/1977 | Andrieu |
| 4,045,286 A | 8/1977 | Blum |
| 4,056,435 A | 11/1977 | Carlier |
| 4,216,821 A | 8/1980 | Robin |
| 4,342,721 A | 8/1982 | Pomie |
| 4,397,778 A | 8/1983 | Lloyd |
| 4,762,667 A | 8/1988 | Sharbaugh |
| 5,185,120 A | 2/1993 | Fennern |
| 5,196,159 A | 3/1993 | Kawashima |
| 5,223,210 A | 6/1993 | Hunsbedt |
| 5,380,406 A | 1/1995 | Horton |
| 5,421,855 A | 6/1995 | Hayden |
| 6,181,759 B1 | 1/2001 | Heibel |
| 7,217,402 B1 | 5/2007 | Miller |
| 8,416,908 B2 | 4/2013 | Mann |
| 8,594,268 B2 | 11/2013 | Shu |
| 8,734,738 B1 | 5/2014 | Herrmann |
| 9,171,646 B2 | 10/2015 | Moses et al. |
| 10,043,594 B2 | 8/2018 | Scott |
| 10,438,705 B2 | 10/2019 | Cheatham |
| 10,497,479 B2 | 12/2019 | Abbott et al. |
| 10,734,122 B2 | 8/2020 | Cisneros et al. |
| 2004/0114703 A1 | 6/2004 | Bolton |
| 2005/0220251 A1 | 10/2005 | Yokoyama |
| 2008/0232533 A1* | 9/2008 | Blanovsky ............ G21D 5/02 376/172 |
| 2008/0310575 A1 | 12/2008 | Cinotti |
| 2011/0222642 A1 | 9/2011 | Gautier |
| 2011/0286563 A1 | 11/2011 | Moses |
| 2012/0027156 A1* | 2/2012 | Peterson ............... G21C 11/06 376/264 |
| 2012/0051481 A1 | 3/2012 | Shu |
| 2012/0056125 A1 | 3/2012 | Raade |
| 2012/0183112 A1 | 7/2012 | Leblanc |
| 2012/0288048 A1 | 11/2012 | Mann |
| 2012/0314829 A1 | 12/2012 | Greene |
| 2013/0083878 A1 | 4/2013 | Massie |
| 2013/0180520 A1 | 7/2013 | Raade |
| 2013/0272470 A1 | 10/2013 | Whitten et al. |
| 2014/0166924 A1 | 6/2014 | Raade |
| 2014/0348287 A1 | 11/2014 | Huke et al. |
| 2015/0010875 A1 | 1/2015 | Raade |
| 2015/0117589 A1 | 1/2015 | Kamei |
| 2015/0036779 A1 | 2/2015 | Leblanc |
| 2015/0078504 A1 | 3/2015 | Woolley |
| 2015/0170766 A1 | 6/2015 | Singh et al. |
| 2015/0228363 A1 | 8/2015 | Dewan et al. |
| 2015/0243376 A1 | 8/2015 | Wilson |
| 2015/0310943 A1 | 10/2015 | Kielb et al. |
| 2015/0357056 A1 | 12/2015 | Shayer |
| 2016/0005497 A1 | 1/2016 | Scott |
| 2016/0189806 A1 | 6/2016 | Cheatham, III et al. |
| 2016/0189812 A1 | 6/2016 | Czerwinski |
| 2016/0189813 A1 | 6/2016 | Cisneros |
| 2016/0196885 A1 | 7/2016 | Singh |
| 2016/0217874 A1 | 7/2016 | Dewan |
| 2016/0260505 A1 | 9/2016 | Cadell et al. |
| 2016/0260509 A1 | 9/2016 | Kim et al. |
| 2017/0084355 A1 | 3/2017 | Scott |
| 2017/0092381 A1 | 3/2017 | Cisneros |
| 2017/0117065 A1 | 4/2017 | Scott |
| 2017/0213610 A1 | 7/2017 | Sumita et al. |
| 2017/0301413 A1 | 10/2017 | Cisneros |
| 2017/0301421 A1 | 10/2017 | Abbott |
| 2017/0316840 A1 | 11/2017 | Abbott |
| 2017/0316841 A1 | 11/2017 | Abbott et al. |
| 2018/0019025 A1 | 1/2018 | Abbott et al. |
| 2018/0047467 A1 | 2/2018 | Czerwinski |
| 2018/0068750 A1 | 3/2018 | Cisneros |
| 2018/0137944 A1 | 5/2018 | Abbott |
| 2018/0277260 A1 | 9/2018 | Marcille et al. |
| 2019/0237205 A1 | 8/2019 | Abbott |
| 2019/0311816 A1 | 10/2019 | Sumita et al. |
| 2020/0027590 A1 | 1/2020 | Cisneros |
| 2020/0122109 A1 | 4/2020 | Kruizenga |
| 2020/0185114 A1 | 6/2020 | Abbott |

FOREIGN PATENT DOCUMENTS

| | | | |
|---|---|---|---|
| DE | 1112791 | 8/1961 | |
| DE | 1439107 | 2/1969 | |
| EP | 0617430 | 9/1994 | |
| EP | 33570680 | 8/2018 | |
| FR | 2296248 | 7/1976 | |
| GB | 739968 | 11/1955 | |
| GB | 835266 | 5/1960 | |
| GB | 964841 | 7/1964 | |
| GB | 2073938 | 10/1981 | |
| GB | 2508537 | 12/2014 | |
| JP | S57 1991 | 1/1982 | |
| JP | 1991282397 | 12/1991 | |
| JP | 2001-133572 | 5/2001 | |
| JP | 2014-119429 | 6/2014 | |
| JP | 2014534413 | 12/2014 | |
| JP | 2015510588 | 4/2015 | |
| RU | 57040 U1 | 9/2006 | |
| RU | 2424587 C1 | 7/2011 | |
| WO | WO-2009135286 A1 * | 11/2009 | ............ G21C 3/58 |
| WO | WO 2013/116942 | 8/2013 | |
| WO | WO 2014/0128457 | 8/2014 | |
| WO | 2014/196338 | 12/2014 | |
| WO | WO 2013/180029 | 5/2015 | |
| WO | WO 2014/074930 | 5/2015 | |

(56) References Cited

FOREIGN PATENT DOCUMENTS

| WO | WO 2015/140495 | 9/2015 |
|---|---|---|
| WO | WO 2016/109565 | 7/2016 |
| WO | WO 2018013317 | 1/2018 |

OTHER PUBLICATIONS

Mourogov, A., and P. M. Bokov. "Potentialities of the fast spectrum molten salt reactor concept: REBUS-3700." Energy conversion and management 47.17 (2006): 2761-2771. (Year: 2006).*

Abbott et al, Thermal and Mechanical Design Aspects of the LIFE Engine, Fusion Science and Technology Dec. 2008; 56(2), 7 pages.

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

ASTM International, Designation: B898-11, Standard Specification for Reactive and Refractory Metal Clad Plate (Sep. 2011), 15 pages.

Cohen et al., "Vanadium-Lined HT9 Cladding Tubes", Argonne National Lab ANL/ET/CP-80384, (Feb. 1994), 12 pgs.

Donnelly et al., Fabrication of Heat Exchanger Tube Bundle for the Molten-Salt Reactor Experiment, ORNL-3500, Dec. 9, 1963, 42 pgs.

European Extended Search Report for EP 15876187.4 dated Sep. 11, 2018, 10 pages.

Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.

Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.

Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.

Freeman et al., "Archimedes Plasma Mass Filter", AIP Cont. Proc. 694, 403 (2003), 9 pages.

Gen IV International Forum, Molten Salt Reactor (MSR), https://www.gen-4.org/gif/jcms/c_9359/msr, accessed Feb. 26, 2016, 3 pgs.

Grimes, W.R., "Molten-Salt Reactor Chemistry" Nucl. Appl. Technol. 8(137) (1970), 19 pgs.

Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.

Holcomb, et al. "Fast Spectrum Molten Salt Reactor Options", Jul. 2011, 46 pages. Available at: http://info.ornl.gov/sites/publications/files/Pub29596.pdf.

Kramer et al., Fusion-Fission Blanket Options for the LIFE Engine, Fusion Science and Technology, vol. 60, pp. 72-77, Jul. 2011.

Kramer et al., Parameter study of the LIFE engine nuclear design, Energy Conversion and Management, 51, pp. 1744-1750, 2010.

Merle-Lucotte, E., Introduction to the Physics of the Molten Salt Fast Reactor, Thorium Energy Conference 2013 (ThEC13), 2013, 82 pgs.

Molten Salt Reactor (MSR) Review: Feasibility Study of developing a pilot scale molten salt reactor in the UK, Jul. 2015, Energy Process Development, LTD., www.energyprocessdevelopments.com, 75 pgs.

Mourogov et al., Potentialities of the fast spectrum molten salt reactor concept: REBUS-3700, Energy Conversion and Management, Mar. 30, 2006, vol. 47, No. 17, pp. 2761-2771.

MSR-FUJI General Information, Technical Features, and Operating Characteristics., pp. 1-30.

Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.

Ottewitte, E. H., Cursory First Look at the Molten Chloride Fast Reactor as an Alternative to the Conventional BATR Concept, 1992, 75 pgs.

PCT International Preliminary Report on Patentability in International Application PCT/US2016/055001, dated Apr. 12, 2018, 9 pages.

PCT International Preliminary Report on Patentability in International Application PCT/US2017/030455, dated Nov. 6, 2018, 17 pages.

PCT International Preliminary Report on Patentability in International Application PCT/US2017/030457, dated Nov. 15, 2018, 15 pages.

PCT International Preliminary Report on Patentability in International Application PCT/US2017/030666 dated Nov. 6, 2018, 9 pages.

PCT International Search Report and Written Opinion in International Application No. PCT/US2017/030672, dated Sep. 27, 2017, 9 pages.

PCT International Search Report and Written Opinion in International Application PCT/US2015/067905 dated Aug. 5, 2016, 18 pages.

PCT International Search Report and Written Opinion in International Application PCT/US2015/067923, dated Apr. 19, 2016, 10 pages.

PCT International Search Report and Written Opinion in International Application PCT/US2016/055001, dated Jan. 25, 2017, 11 pages.

PCT International Search Report and Written Opinion in International Application PCT/US2017/030455, dated Jan. 30, 2018, 23 pages.

PCT International Search Report and Written Opinion in International Application PCT/US2017/030457, dated Jan. 23, 2018, 20 pages.

PCT International Search Report and Written Opinion in International Application PCT/US2017/030666 dated Jul. 20, 2017, 11 pages.

Reactor Start-up Procedure. Technical University Dresden. Reactor Training Course. pp. 3-4. <https://tudresden.de/ing/maschinenwesen/iet/wket/ressourcen/dateien/akr2/Lehrrnaterialien/start_e.pdf?lang=en>. (Mar. 2015), 21 pgs.

Scott, Ian and Durham John, The Simple Molten Salt Reactor, Practical, safe and cheap, Moltex Energy LLP presentation slides, 19 pgs.

Scott, Ian, Safer, cheaper nuclear: The simple molten salt reactor (Dec. 2, 2014), http://www.ee.co.za/article/safer-cheaper-nuclear-simple-molten-salt-reactor.hlml, 10 pgs.

Taube, et al., Molten Plutonium Chlorides Fast Breeder Reactor Cooled by Molten Uranium Chloride, Annals of Nuclear Science and Engineering, vol. 1, pp. 277-281., 1974.

Thoma, R. E., "Chemical Aspects of MSRE Operations," ORNL-4658, Dec. 1971, 151 pages.

TransAtomic Power Technical White Paper, Mar. 2014, V1 .0.1., (2014), http://www.transatomicpower.com/, 34 pgs.

Van't Eind, R.J.S., Simulation of a Fast Molten Salt Reactor, PSR-131-2011-009, Jul. 2011, 68 pages.

Xu et al., Thorium Energy R&D in China, THEO13, CERN, Oct. 28, 2013, 59 pgs.

PCT International Search Report and Written Opinion in International Application PCT/US2017/038806, dated Oct. 16, 2017, 13 pgs.

PCT International Preliminary Report on Patentability in International Application PCT/US2017/038806, dated Jan. 15, 2019, 7 pgs.

Maltsev et al., "Redox potentials of uranium in molten eutectic mixture of lithium, potassium, and cesium chlorides", Russian Metallurgy, Maiknauka-Interperidica, RU, vol. 2016, No. 8, Dec. 2016, 2 pgs.

(56) References Cited

OTHER PUBLICATIONS

Kuznetsov et al., "Electrochemical Behavior and Some Thermodynamic Properties of UCl [sub 4] and UCl [sub 3] Dissolved in a LiCl-KCl Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.
PCT International Search Report and Written Opinion in International Application PCT/US2017/061843, dated Oct. 29, 2018, 23 pages.
PCT International Preliminary Report on Patentability in International Application PCT/US2017/061843, dated May 21, 2019, 13 pages.
PCT International Search Report and Written Opinion in International Application PCT/US2019/015967, dated Jun. 12, 2019, 25 pages.
PCT International Search Report and Written Opinion in International Application PCT/US2019/021791, dated Nov. 19, 2019, 15 pages.
Kimura, "Neutron spectrum in small iron pile surrounded by lead reflector", Journal of Nucear Science and Technology 15, No. 3 (1978): 183-191.
Clarno, K.T. et al., "Trade studies for the liquid-salt-cooled very high-temperature reactor: fiscal year 2006 progress report", ORNL/TM-2006 140 (2007), 35 pgs.
PCT International Search Report and Written Opinion in International Application PCT/US2019/051345, dated Mar. 5, 2020, 15 pages.

Wang, Jun-Wei et al., "Influence of MgCl2content on corrosion behavior of GH1140 in molten naCl-MgCl2as thermal storage medium", Solar Energy Materials and Solar Cells, Elsevier Science Pub., Amsterdam, NL, vol. 179, Nov. 20, 2017, pp. 194-201.
PCT International Preliminary Report on Patentability in International Application PCT/US2019/015967, dated Aug. 13, 2020, 16 pages.
PCT International Preliminary Report on Patentability in International Application PCT/US2019/021791, dated Sep. 24, 2020, 9 pages.
ESR20211581.2 European Extended Search Report in European Application EP 20 21 1581.2, dated Mar. 24, 2021, 8 pages.
PCT/US2020/066599 ISR + WO dated May 17, 2021, 17 pages.
Reactor Training Course Experiment Reactor Start-up Procedure, Technical University Dresden, Institute of Power Engineering Training Reactor.
Rouch et al, Preliminary thermal-hydraulic core design of the Molten Salt Fast Reactor (MSFR), Annals of Nuclear Energy 64 (2014) 449-456.
Yamaji et al., Experimental and numerical thermal-hydraulics investigation of a molten salt reactor concept core, KERNTECHNIK 82 (2017) 4.
Yamaji et al., Experimental investigation of the MSFR molten salt reactor concept, KERNTECHNIK 79 (2014) 5, pp. 408-416.
Yamaji et al., Experimental Modelling and Numerical Analysis of a Molten Salt Fast Reactor, PHYSOR 2014—The Role of Reactor Physics Toward a Sustainable Future, Kyoto, Japan, Sep. 28-Oct. 2, 2014.
Yamaji et al., Thermal-hydraulic analyses and experimental modelling of MSFR, Annals of Nuclear Energy 64 (2014) 457-471.

\* cited by examiner

FISSION REACTION CONTROL IN A MOLTEN SALT REACTOR

CROSS-REFERENCE TO RELATED APPLICATIONS

The present application is a Continuation of U.S. patent application Ser. No. 14/981,606, entitled "Fission Reaction Control in a Molten Salt Reactor", issued on Oct. 8, 2019 as U.S. Pat. No. 10,438,705.

U.S. patent application Ser. No. 14/981,606 claims priority to U.S. Provisional Patent Application No. 62/098,984, entitled "Molten Salt Nuclear Reactor and Method of Controlling the Same" and filed on Dec. 31, 2014, and U.S. Provisional Patent Application No. 62/234,889, entitled "Molten Chloride Fast Reactor and Fuel" and filed on Sep. 30, 2015, both of which are specifically incorporated herein for all that they disclose and teach.

U.S. patent application Ser. No. 14/981,606 also claims priority to U.S. Provisional Patent Application No. 62/097,235, entitled "Targetry Coupled Separations" and filed on Dec. 29, 2014, which is specifically incorporated herein for all that it discloses and teaches.

U.S. patent application Ser. No. 14/981,606 is also related to U.S. patent application Ser. No. 14/981,512, entitled "Molten Nuclear Fuel Salts and Related Systems and Methods" and filed on Dec. 28, 2015, which is specifically incorporated herein for all that it discloses and teaches.

BACKGROUND

Molten salt reactors (MSRs) identify a class of nuclear fission reactors in which the fuel and coolant are in the form of a molten salt mixture containing solid or dissolved nuclear fuel, such as uranium or other fissionable elements. One class of MSR is a molten chloride fast reactor (MCFR), which uses a chloride-based fuel salt mixture that offers a high uranium/transuranic solubility to allow a more compact system design than other classes of MSRs. The design and operating parameters (e.g., compact design, low pressures, high temperatures, high power density) of an MCFR offer the potential for a cost-effective, globally-scalable solution to zero carbon energy.

SUMMARY

The described technology provides a molten salt reactor including a nuclear reactor core configured to contain a nuclear fission reaction fueled by a molten fuel salt. A molten fuel salt control system coupled to the nuclear reactor core is configured to remove a selected volume of the molten fuel salt from the nuclear reactor core to maintain a parameter indicative of reactivity of the molten salt reactor within a selected range of nominal reactivity.

In one implementation, a molten salt reactor including a nuclear reactor core configured to sustain a nuclear fission reaction fueled by a molten fuel salt. The molten fuel salt control system includes a molten fuel salt exchange system that fluidically couples to the nuclear reactor core and is configured to exchange a selected volume of the molten fuel salt with a selected volume of a feed material containing a mixture of a selected fertile material and a carrier salt. In another implementation, the molten fuel salt control system includes a volumetric displacement control system having one or more volumetric displacement bodies insertable into the nuclear reactor core. Each volumetric displacement body is configured to volumetrically displace a selected volume of molten fuel salt from the nuclear reactor core when inserted into the nuclear reactor core. In one implementation, the volumetric displacement body removes the selected volume of molten fuel salt from the nuclear reactor core, such as via a spill-over system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 1 schematically illustrates an example molten chloride fast reactor (MCFR) fuel cycle with a MCFR parent reactor and a MCFR daughter reactor.

DETAILED DESCRIPTIONS

A molten salt fast reactor system employs a molten fuel salt in a fast neutron spectrum fission reactor. One type of molten salt reactor includes a fluoride salt as the carrier salt for the fissile fuel. Another type of molten salt reactor is a molten chloride fast reactor (MCFR) with a chloride salt as the carrier salt for the fissile fuel. Although the below description is written with respect to a molten salt chloride reactor, it is to be appreciated that the description, components, and methods described herein may be applicable to any molten fuel salt reactor.

In an MCFR system, the fast neutron spectrum provided by chloride salts enables good breed-and-burn performance using the uranium-plutonium fuel cycle. The fast neutron spectrum also mitigates fission product poisoning to provide exceptional performance without online reprocessing and the attendant proliferation risks. During operation of an MCFR system, a molten fuel salt control system allows maintenance of fuel reactivity and/or fuel composition within desired operational bounds. In one implementation, the molten fuel salt control system includes a molten fuel salt exchange system that removes molten fuel salt from the nuclear reactor core, such as to maintain a parameter indicative of reactivity within a selected range of a nominal reactivity. In an additional or alternative implementation, a molten fuel salt control system includes a volumetric displacement control assembly to remove molten fuel salt from a nuclear reactor to control the fission reaction in the MCFR system (e.g., to maintain a parameter indicative of reactivity within a selected range of a nominal reactivity). The volumetric displacement control assembly may contain or be formed of non-neutron absorbing materials, neutron absorbing materials, and/or moderators.

Figure 1:
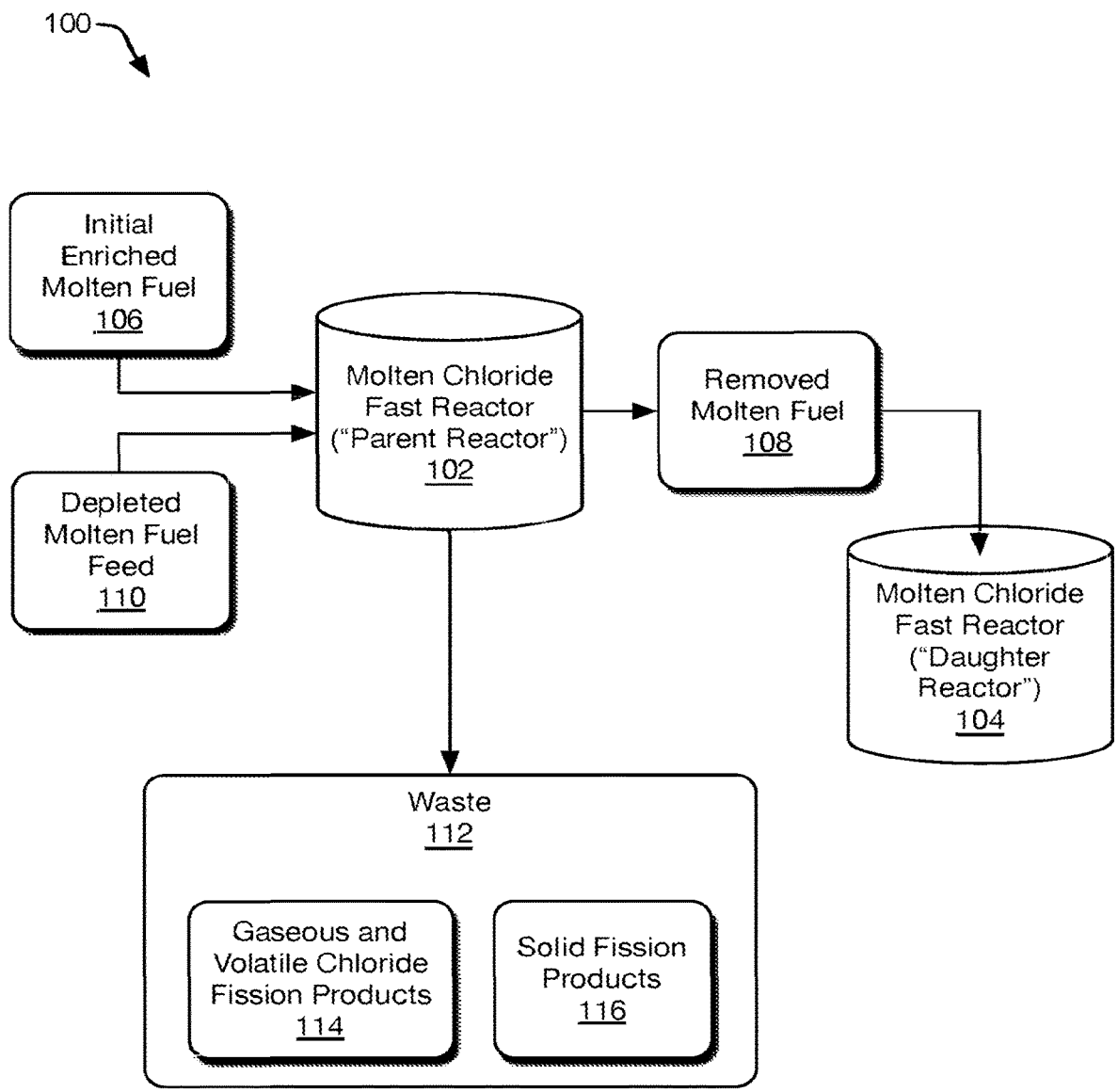

FIG. 1 schematically illustrates an example molten chloride fast reactor (MCFR) fuel cycle 100 with a MCFR parent reactor 102 and a MCFR daughter reactor 104. A particular classification of fast nuclear reactor, referred to as a "breed-and-burn" fast reactor, is a nuclear reactor capable of generating more fissile nuclear fuel than it consumes. For example, the neutron economy is high enough to breed more fissile nuclear fuel (e.g., plutonium-239) from fertile nuclear reactor fuel (e.g., uranium-238) than it burns. The "burning" is referred to as "burn-up" or "fuel utilization" and represents a measure of how much energy is extracted from the nuclear fuel. Higher burn-up typically reduces the amount of nuclear waste remaining after the nuclear fission reaction terminates.

The example MCFR fuel cycle 100 is designed to use molten salt as a carrier for the fissile fuel in the reactor(s). In one example, this carrier salt may include one or more of a sodium salt, a chloride salt, a fluoride salt, or any other appropriate molten fluid to carry the fissile fuel through the reactor core. In one example, the molten chloride salt includes a ternary chloride fuel salt, although other chloride salts may be employed alternative to or in addition to the ternary chloride salt, including without limitation binary, ternary and quaternary chloride fuel salts of uranium and various fissionable materials. Various compositions have been explored through modelling and testing with a focus on high actinide concentrations and a resulting compact reactor size. For example, bred plutonium can exist as $PuCl_3$ within the MCFR fuel cycle 100, and reduction-oxidation control can be maintained by adjusting the ratio of the oxidation states of the chloride salt used as fertile feed material.

The example MCFR fuel cycle 100 enables an open breed-and-burn fuel cycle (e.g., exhibiting equilibrium, quasi-equilibrium, and/or non-equilibrium breed-and-burn behavior) employing a uranium-plutonium fuel cycle and resulting in significantly lower volumes of waste than a conventional open fuel cycle. Various implementations of the described technology provide for a molten fuel salt having a uranium tetrachloride ($UCl_4$) content level above 5% by molar fraction, which aids in establishing high heavy metal content in the molten fuel salt (e.g., above 61% by weight). Uranium tetrachloride implementations may be accomplished through a mixture of $UCl_4$ and uranium trichloride ($UCL_3$) and/or an additional metal chloride (e.g., NaCl), such that desirable heavy metal content levels and melting temperatures (e.g., 330°-800° C.) are achieved.

In one implementation, the MCFR parent reactor 102 includes a reactor vessel designed to hold the molten fuel salt as a reactor core section, one or more heat exchangers, control systems, etc. In one implementation, the reactor vessel may have a circular cross-section when cut along a vertical or Z-axis (i.e., yielding a circular cross-section in the XY plane), although other cross-sectional shapes are contemplated including without limitation ellipsoidal cross-sections and polygonal cross-sections. The MCFR parent reactor 102 is started with a loading into the reactor vessel an enriched fuel charge of initial molten fuel 106, such as using uranium-235 as a startup fuel, such as in the form of $UCl_4$ and/or $UCl_3$, along with a carrier salt (e.g., NaCl). In one example, the initial molten fuel 106 mixture contains enriched uranium at 12.5 w %, although other compositions may be employed. The initial molten fuel 106 circulates through a reactor core section in the reactor vessel of the MCFR parent reactor 102. In one implementation of the MCFR parent reactor 102, the molten fuel salt flows in an upward direction as it is heated by the fission reaction in the internal central reactor core section and downward around the internal periphery of the reactor vessel as it cools. It is to be appreciated that other additional or alternative molten fuel flows may also be employed (such as the primary coolant loop 313 of FIG. 3) that are designed to use the convention flows of a heated fluid and gravity, and/or assisted fluid flows through values, pumps, and the like. The constituent components of the molten fuel are well-mixed by the fast fuel circulation flow (e.g., one full circulation loop per second). In one implementation, one or more heat exchangers are positioned at the internal periphery of the reactor vessel to extract heat from the molten fuel flow, further cooling the downward flow, although heat exchangers may additionally or alternatively be positioned outside the reactor vessel.

After initial startup, the MCFR parent reactor 102 reaches criticality in nuclear fission and the initial fissile fuel (e.g., enriched uranium) converts the fertile fuel to fissile fuel (breeds up). In the example of initial fissile fuel including enriched uranium, this fissile enriched uranium can breed depleted and/or natural uranium up to another fissile fuel, e.g., plutonium. This breed-and-burn cycle can breed enough plutonium-239 fissile nuclear fuel (e.g., in the form of $PuCl_3$) to not only operate for decades but to also supply fuel for the MCFR daughter reactor 104 and other daughter and granddaughter reactors. Although other daughter and/or granddaughter reactors are not shown, it is to be appreciated that multiple reactors may be fed by the removed used fuel from the parent reactor 102 to one or more daughter reactors, which may then feed start up material to one or more granddaughter reactors, and on and on. In one implementation, the MCFR parent reactor 102 operates at 1000 $MW_t$, which corresponds to a natural fuel circulation point design, although other operating outputs are achievable under different operating conditions, including forced fuel circulation to achieve higher thermal power levels. Other fertile fuels may include without limitation used nuclear fuel or thorium.

As previously suggested, during normal operations, the MCFR parent reactor 102 breeds with sufficient efficiency to support a gradually increasing reactivity. The MCFR parent reactor 102 can be maintained at critical (e.g., barely critical) by removing molten fuel salt 108 (which may contain fissile fuel, fertile fuel, carrier salt, and or fission products) from the MCFR parent reactor 102 and replacing the removed molten fuel salt 108 with fertile fuel salt at a slow rate. In this manner, reactivity can be controlled by periodic removal of a volume of fully mixed molten fuel salt that circulates within the reactor vessel, depicted as removed molten fuel 108, and periodic replacement of the removed molten fuel 108 with depleted uranium chloride salt, depicted as fertile molten fuel feed 110. Other fertile fuels may include without limitation natural uranium, used nuclear fuel or thorium.

In one implementation, the removed molten fuel 108 can be prepared for disposal as waste or it can be stored until sufficient material is available to start a new MCFR plant (e.g., the MCFR daughter reactor 104). In some cases, the removed molten fuel 108 can be used to start or initiate the MCFR daughter plant without reprocessing the removed molten fuel 108. In the latter scenario, it may be possible for nearly all actinides to move to the next MCFR plant for additional burn-up, thus avoiding proliferation risks associated with nuclear waste. Furthermore, the molten fuel salt exhibits a large negative temperature coefficient, very low excess reactivity, and passive decay heat removal, which combine to stabilize the fission reaction.

The MCFR parent reactor 102 outputs certain waste components, illustrated as waste 112. In one implementation, the waste 112 does not contain actinides. Instead, the waste 112 includes gaseous and possibly volatile chloride fission products 114 and solid fission products 116, such as noble metals. The waste 112 can be captured through mechanical filtering and/or light gas sparging or any other appropriate technique to filter waste 112 from the molten fuel salt while the MCFR parent reactor 102 is in operation or the removed molten fuel 108 may be separated, treated, and re-introduced to the reactor. The mechanical filtering captures the solid fission products 116 and other particulates that are less soluble in the molten fuel salt. Similarly, noble fission product gasses are captured and allowed to decay in holding tanks. The filters containing the insoluble and longer lived solid fission products 116 form a portion of the waste stream. In one implementation, the waste 112 also reduces or eliminates criticality concerns as the waste 112 does not contain fissile isotopes separated from the fuel salt.

The waste 112 components may include any one or more of transmutation products of the nuclear fission or any one of its decay products, chemical reaction products of the fuel salt with other fission products, corrosion products, etc. The elemental components of the waste 112 (also generally called fission products herein) are based upon the elemental components of the fuel salt, carrier salt, components and coatings, etc. For a molten chloride salt, fission products may include any one or more of noble gases and/or other gases including Iodine, Cesium, Strontium, halogens, tritium, noble and semi-noble metals in aerosol form, and the like. Solid waste fission products may include noble metals, semi-noble metals, alkali elements, alkali earth elements, rare earth elements, etc. and molecular combinations and thereof.

Figure 2:
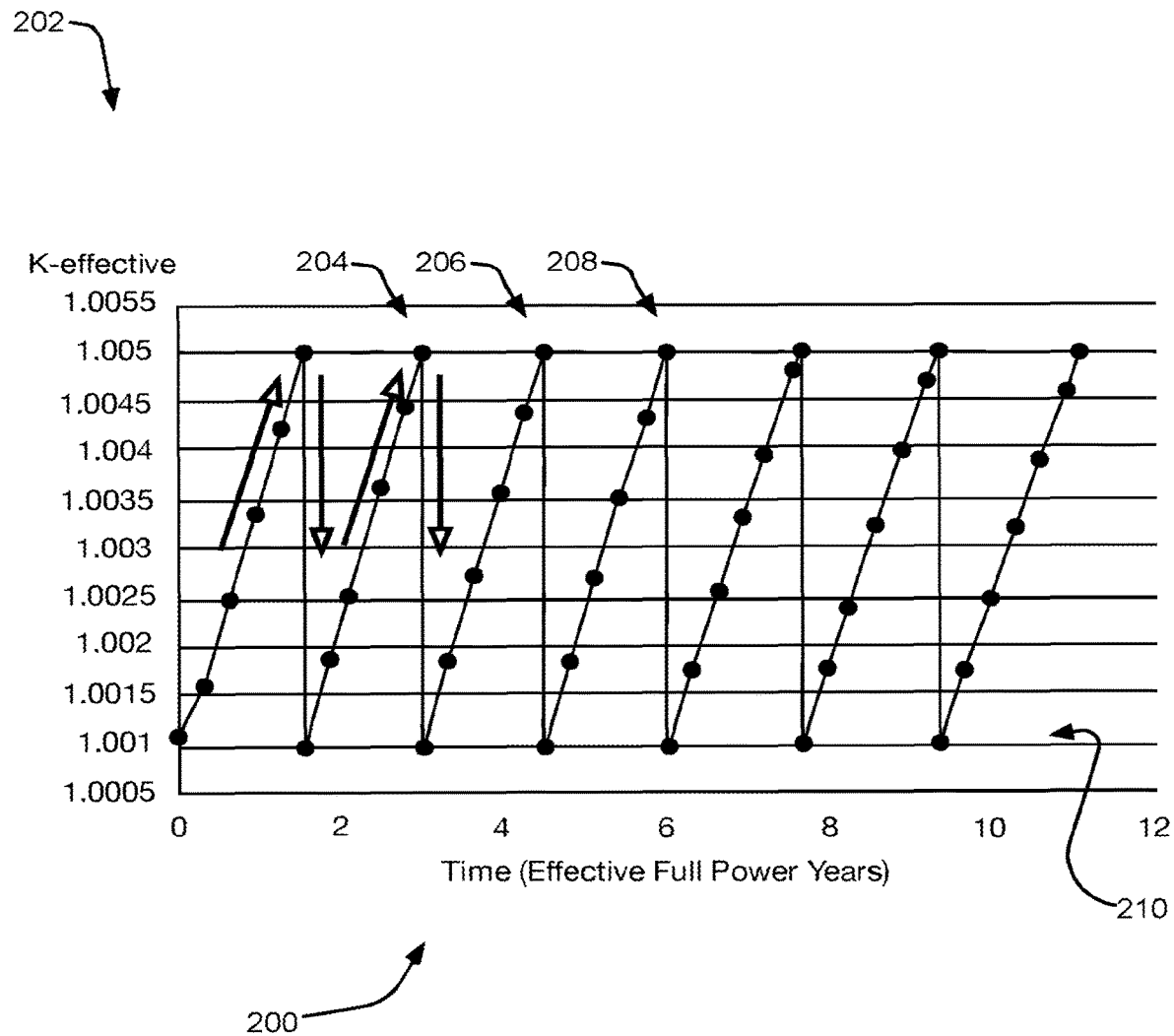
FIG. 2 illustrates example MCFR reactivity control resulting from periodic molten fuel removal of molten fuel salt and replacement with a fertile molten fuel feed, referred to as molten fuel salt exchange.

FIG. 2 illustrates example MCFR reactivity control resulting from periodic molten fuel removal of molten fuel salt and replacement with a fertile molten fuel feed material, referred to as molten fuel salt exchange. Molten fuel salt exchange systems represent a type of molten fuel salt control system. The X-axis 200 represents time in effective full power years, and the Y-axis represents reactivity in terms of modeled k-effective 202. The parameter, k-effective, represents the multiplication factor, which indicates the total number of fission events during successive cycles of the fission chain reaction. Each drop in k-effective, such as drops 204, 206, and 208, represents a molten fuel salt exchange event. By replacing bred up or fissile molten fuel salt within the reactor with a fertile molten fuel feed, the MCFR can be maintained within a threshold level of a nominal reactivity. In some cases, the nominal reactivity is at an average near-zero excess reactivity operating condition with an upper threshold defining a maximum reactivity of that fuel cycle to trigger a molten fuel exchange, and the lower threshold defining the minimum reactivity to be achieved after the molten fuel exchange. The nominal, upper threshold, and/or lower threshold reactivity levels may stay the same or change over the lifetime of the MCFR based upon design, operation, and/or safety parameters. These parameters, which are indicative of reactivity, may include, without limitation, thermal energy desired to be generated by the reactor, safety levels, component design and lifetime constraints, maintenance requirements, etc. It should be understood that other reactivity control techniques may be employed in combination with molten fuel salt exchange, including without limitation use of a volumetric displacement assembly, neutron-absorbing control assemblies, etc. Furthermore, other molten salt reactors may employ a similar molten fuel exchange feature.

As illustrated in FIG. 2, the periodic replacement of molten fuel salt with the fertile molten fuel feed may be used to limit reactivity and maintain ongoing breed-and-burn behavior within the reactor. Chronologically, the initial enriched fuel charge of molten fuel salt and fertile molten fuel salt can breed up, thereby increasing the reactivity within the reactor. After the reactor breads up, the periodic removal of fissile material acts to periodically (whether with uniform or non-uniform periods over time) reduce or control the reactivity of the reactor, returning the reactivity of the molten fuel salt back to an acceptable and pre-selected threshold level which may be a critical condition 210 (e.g., a barely critical condition) at each molten fuel salt exchange operation to approximate an average near-zero excess reactivity operating condition. This exchange operation can be repeated over time, resulting in the "saw tooth" reactivity curve, such as that shown in the MCFR reactivity control graph of FIG. 2. In some implementations, periodic exchange operations can allow the reactor to operate indefinitely without adding supplemental enriched fuel material. While molten fuel salt exchange is described as periodic, it should be understood that such exchange may be performed in a batch-wise, continuous, semi-continuous (e.g., drip) manner, etc. It is to be appreciated that increasing the frequency (which may be paired with smaller volumes of removed bred up fuel) can tighten the control or thresholds around the nominal reactivity to which the MCFR is controlled.

Figure 3:
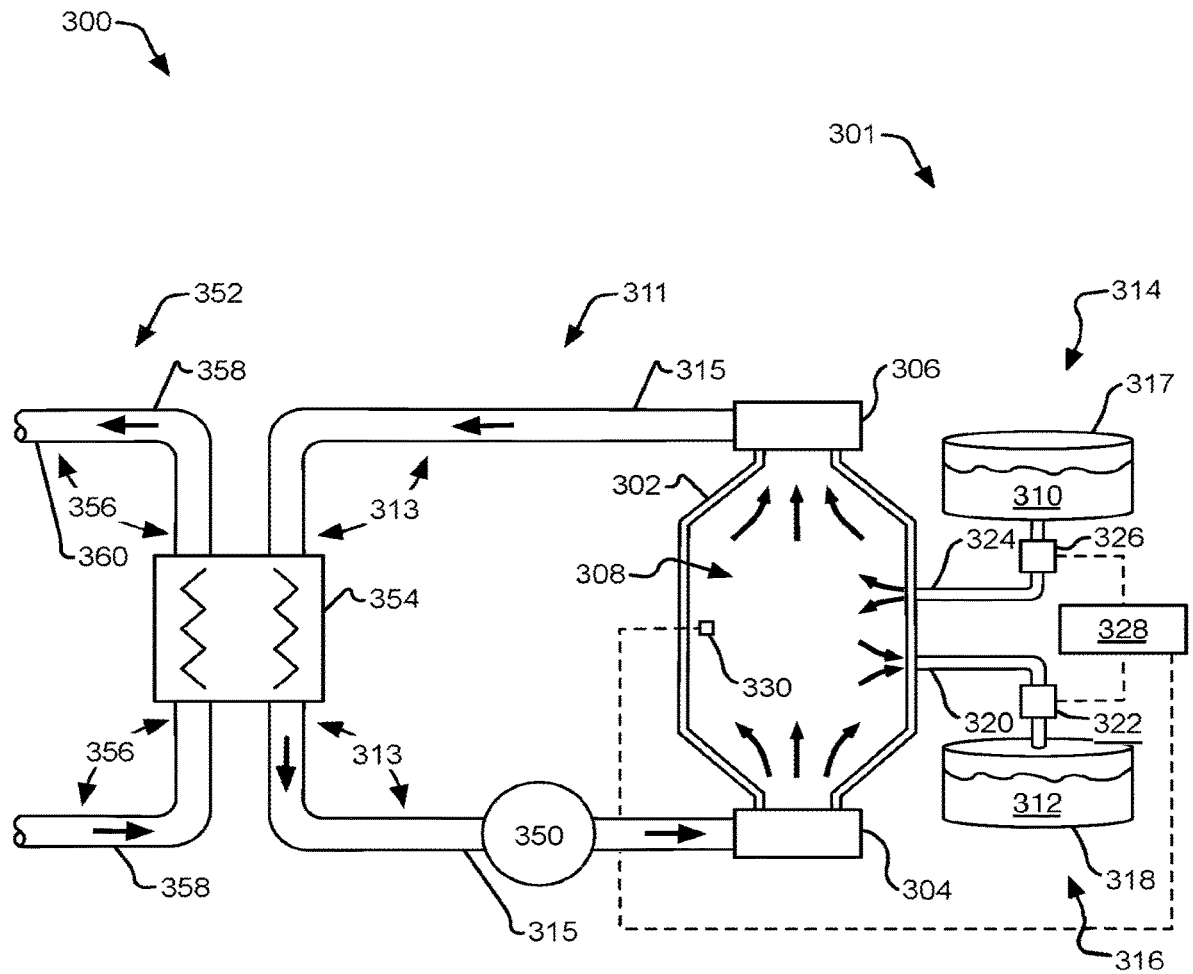
FIG. 3 illustrates an example MCFR system equipped with a molten fuel salt exchange assembly.

FIG. 3 illustrates an example MCFR system 300 equipped with a molten fuel salt exchange assembly 301. In one implementation, the MCFR system 300 includes a reactor core section 302. The reactor core section 302 (which may also be referred to as a "reactor vessel") includes a molten fuel salt input 304 and a molten fuel salt output 306. The molten fuel salt input 304 and the molten fuel salt output 306 are arranged such that, during operation, a flow of molten fuel salt 308 may form or include conical sections acting as converging and diverging nozzles, respectively. In this regard, the molten fuel salt 308 is fluidically transported through the volume of the reactor core section 302 from the molten fuel salt input 304 to the molten fuel salt output 306.

The reactor core section 302 may take on any shape suitable for establishing criticality within the molten fuel salt 308 within the reactor core section 302. As shown in FIG. 3, the reactor core section 302 may be in the form of an elongated core section and may having a circular cross-section when cut along a vertical or Z-axis (i.e., a circular cross-section in the XY plane), although other cross-sectional shapes are contemplated including without limitation ellipsoidal cross-sections and polygonal cross-sections.

The dimensions of the reactor core section 302 are selected such that criticality is achieved within the molten fuel salt 308 when flowing through the reactor core section 302. Criticality refers to a state of operation in which the nuclear fuel sustains a fission chain reaction, i.e., the rate of production of neutrons in the fuel is at least equal to rate at which neutrons are consumed (or lost). For example, in the case of an elongated core section, the length and cross-sectional area of the elongated core section may be selected in order to establish criticality within the reactor core section 302. It is noted that the specific dimensions necessary to establish criticality are at least a function of the type of fissile material, fertile material and/or carrier salt contained within the example MCFR system 300.

As part of the reactor startup operation, the example MCFR system 300 is loaded with an initial enriched fuel charge of molten fuel salt. The reactor startup operation initiates a fission reaction with a breed-and-burn fuel cycle. The reactivity of the fission reaction of the example MCFR system 300 increases over time (see FIG. 2.). When reactivity fails to satisfy an acceptable reactivity condition (e.g., k-effective meets or exceeds a threshold, such as an upper threshold of 1.005, as indicated in the example shown in FIG. 2), also referred to as an "exchange condition" or a "control condition," a selected volume of molten fuel salt 308 is removed from the reactor core section 302 and a selected volume and composition of fertile molten fuel feed 310 (e.g., a salt loaded with fertile material, such as depleted and/or natural uranium, used nuclear fuel or thorium.) is loaded into the reactor core section 302 in place of the removed molten fuel salt 308. The removed molten fuel salt 308 may include without limitation one or more of the following: lanthanides, other fission products, fissile material, fertile material and/or carrier salt. It is noted that a non-specific removal of lanthanides reduces the fission product inventory reactor core section 302 and the associated poisoning but also removes some of the fissile material from the reactor core section 302.

In FIG. 3, the molten fuel salt exchange assembly 301 is operably coupled to the reactor core section 302 (or another portion of the example MCFR system 300) and is configured to periodically replace a selected volume of the molten fuel salt 308 with a selected volume and composition of the feed material 310. In this regard, the molten fuel salt exchange assembly 301 can control the reactivity and/or composition of the molten fuel salt 308 within the example MCFR system 300. The composition of the molten fuel salt 308 influences the oxidation states of the molten fuel salt 308. In one implementation, it is noted that the molten fuel salt 308 removed from the reactor core section 302 (shown as removed molten fuel 312) includes at least some fissile material, while the feed material 310 includes at least some fertile material. In another implementation, the removed molten fuel 312 includes one or more fission products. For example, the removed molten fuel 312 may include without limitation one or more lanthanides generated via fission within the molten fuel salt 308. In yet another implementation, the removed molten fuel 312 may include without limitation a mixture of fissionable material (e.g., $UCl_4$), one or more fission products (e.g., one or more lanthanides and/or a carrier salt (e.g., NaCl). While molten fuel salt exchange is described as periodic, it should be understood that such exchange may be performed in a batch-wise, continuous, semi-continuous (e.g., drip) manner, etc.

As the molten fuel salt 308 within the reactor core section 302 breeds up, converting fertile material to fissile material, the molten fuel salt exchange assembly 301 removes some of the molten fuel salt 308 as the removed molten fuel 312, which contains some volume of fissile material, and replaces the removed molten fuel 312 with the feed material 310, which includes at least some fertile material. In another implementation, the removed molten fuel 312 includes one or more fission products. Accordingly, the molten fuel salt exchange assembly 301 may act as a control mechanism on the reactivity within the example MCFR system 300 and may serve to return the reactivity of the molten fuel salt 308 to a critical condition (e.g., a barely critical condition). Thus, in one implementation, the molten fuel salt exchange assembly 301 of the example MCFR system 300 can allow operation of the example MCFR system 300 indefinitely without adding further enrichment.

The molten fuel salt of the feed material 310 may include without limitation one or more fertile fuel salts, such as a salt containing at least one of depleted uranium, natural uranium, thorium, or used nuclear fuel. For example, in the case of a chloride-based fuel, one or more fertile fuel salts may include a chloride salt containing at least one of depleted uranium, natural uranium, thorium, or a used nuclear fuel. In some cases, the feed material 310 may contain fissile fuel, such as enriched uranium, which can be fed into the example MCFR system 300 at a rate or molecular volume less than the initial volume (e.g., 12.5%). This inclusion of fissile fuel in the feed fuel may be used throughout the lifetime of the example MCFR system 300, or alternatively, may be occasionally used to speed up or enrich the molten fuel salt within the example MCFR system 300 to enhance later removed fuel in future molten fuel salt exchanges for placement in daughter reactors. Furthermore, the molten fuel salt of the feed material 310 may include without limitation one or more fissile and/or fertile fuel salts mixed with a carrier salt, such as NaCl, although other carrier salts may be employed.

The reactor core section 302 may be formed from any material suitable for use in molten salt nuclear reactors. For example, the bulk portion of the reactor core section 302 may be formed from one or more molybdenum alloys, one or more zirconium alloys (e.g., Zircaloy), one or more niobium alloys, one or more nickel alloys (e.g., Hastelloy N), ceramics, high temperature steel and/or other appropriate materials. The internal surface of the reactor core section 302 may be coated, plated or lined with one or more additional material in order to provide resistance to corrosion and/or radiation damage. In one example, the reactor core section 302 may be constructed wholly or substantially from a corrosion and/or radiation resistant material.

In one implementation, the reactor core section 302 includes a primary coolant system 311, which may include one or more primary coolant loops 313 formed from piping 315. The primary coolant system 311 may include any primary coolant system suitable for implementation in a molten fuel salt context. In the illustrated implementation, the primary coolant system 311 circulates molten fuel salt 308 through one or more pipes 315 and/or fluid transfer assemblies of the one or more of the primary coolant loops 313 in order to transfer heat generated by the reactor core section 302 via one or more heat exchangers 354 to downstream thermally driven electrical generation devices and system or other heat storage and/or uses. It should be understood that an implementation of the example MCFR system 300 may include multiple parallel primary coolant loops (e.g., 2-5 parallel loops), each carrying a selected volume of the molten fuel salt inventory through the primary coolant system 311.

In the implementation illustrated in FIG. 3, the molten fuel salt 308 is used as the primary coolant. Cooling is achieved by flowing molten fuel salt 308 heated by the ongoing chain reaction from the reactor core section 302, and flowing cooler molten fuel salt 308 into the reactor core section 302, at the rate maintaining the temperature of the reactor core section 302 within its operational range. In this implementation, the primary coolant system 311 is adapted to maintain the molten fuel salt 308 in a subcritical condition when outside of the reactor core section 302.

It is further noted that, while not depicted in FIG. 3, the example MCFR system 300 may include any number of additional or intermediate heating/cooling systems and/or heat transfer circuits. Such additional heating/cooling systems may be provided for various purposes in addition to maintaining the reactor core section 302 within its operational temperature range. For example, a tertiary heating system may be provided for the reactor core section 302 and primary coolant system 311 to allow a cold reactor containing solidified fuel salt to be heated to an operational temperature in which the salt is molten and flowable.

Other ancillary components may also be utilized in the primary coolant loop 313. Such ancillary components may be include one or more filters or drop out boxes for removing particulates that precipitate from the primary coolant during operation. To remove unwanted liquids from the primary coolant, the ancillary components may include any suitable liquid-liquid extraction system such as one or more co-current or counter-current mixer/settler stages, an ion exchange technology, or a gas absorption system. For gas removal, the ancillary components may include any suitable gas-liquid extraction technology such as a flash vaporization chamber, distillation system, or a gas stripper. Some additional implementations of ancillary components are discussed in greater detail below.

It is noted herein that the utilization of various metal salts, such as metal chloride salts, in example MCFR system 300 may cause corrosion and/or radiation degradation over time. A variety of measures may be taken in order to mitigate the impact of corrosion and/or radiation degradation on the integrity of the various salt-facing components (e.g., reactor core section 302, primary coolant piping 315, heat exchanger 354 and the like) of the example MCFR system 300 that come into direct or indirect contact with the fuel salt or its radiation.

In one implementation, the velocity of fuel flow through one or more components of the example MCFR system 300 is limited to a selected fuel salt velocity. For example, the one or more pumps 350 may drive the molten fuel salt 308 through the primary coolant loop 313 of the example MCFR system 300 at a selected fuel salt velocity. It is noted that in some instances a flow velocity below a certain level may have a detrimental impact on reactor performance, including the breeding process and reactor control. By way of non-limiting example, the total fuel salt inventory in the primary loop 313 (and other portions of the primary coolant system 311) may exceed desirable levels in the case of lower velocity limits since the cross-sectional area of the corresponding piping of the primary loop 313 scales upward as flow velocity is reduced in order to maintain adequate volumetric flow through the primary loop 313. As such, very low velocity limits (e.g., 1 m/s) result in large out-of-core volumes of fuel salt and can negatively impact the breeding process of the example MCFR system 300 and reactor control. In addition, a flow velocity above a certain level may detrimentally impact reactor performance and longevity due to erosion and/or corrosion of the internal surfaces of the primary loop 313 and/or reactor core section 302. As such, suitable operational fuel salt velocities may provide a balance between velocity limits required to minimize erosion/corrosion and velocity limits required to manage out-of-core fuel salt inventory. For example, in the case of a molten chloride fuel salt, the fuel salt velocity may be controlled from 2-20 m/s, such as, but not limited to, 7 m/s.

In the example implementation illustrated in FIG. 3, the molten fuel salt exchange assembly 301 (a "molten fuel salt exchange system") includes a used-fuel transfer unit 316 and a feed-fuel supply unit 314. In one implementation, the used-fuel transfer unit 316 includes a reservoir 318 for receiving and storing used-fuel 312 (e.g., burned fuel) from one or more portions of the MCFR system 300. As previously noted, the used-fuel 312 transferred to and stored in reservoir 318 represents a portion of the molten fuel salt mixture 308 previously used fission reaction within the MCFR system 300 and may include initial fissile material, bred up fissile material, fertile material and/or fission products, such as lanthanides.

In another implementation, the used-fuel transfer unit 316 includes one or more fluid transfer elements for transferring molten fuel salt 308 from one or more portions of the MCFR system 300 to the reservoir 318. The used-fuel transfer unit 316 may include any fluid transfer element or device suitable for molten salt transfer. By way of non-limiting example, the used-fuel transfer unit 316 may include one or more pipes 320, one or more valves 322, one or more pumps (not shown) and the like. In another implementation, the used-fuel transfer unit 316 may transfer molten fuel salt 308 from any portion of the MCFR system 300 fluidically coupled to the reactor core section 302. By way of non-limiting example, the used-fuel transfer unit 316 may transfer molten fuel salt 308 from any portion of the primary circuit, such as, but not limited to, the reactor core section 302, the primary coolant system 311 (e.g., primary coolant loop 313) and the like, to the reservoir 318.

In one implementation, the feed-fuel supply unit 314 includes a feed material source 317 for storing feed material 310 (e.g., mixture of fertile material and carrier salt). In one implementation, the feed material 310 may include a mixture of a selected fertile material (e.g., depleted uranium, natural uranium, used nuclear fuel, thorium and the like) and a carrier salt (e.g., NaCl) mixed such that the concentration of the molten feed material has a concentration of fertile material compatible with the molten fuel salt 308 remaining in the primary circuit of the MCFR system 300. In another implementation, the fertile material may include a fertile salt, such as uranium chloride, thorium chloride and the like. In this regard, the particular components of the feed material may be selected so as to at least approximately maintain or adjust the stoichiometry and/or chemistry (e.g., the chemical composition and/or reactivity) present in the molten fuel salt 308 contained within the MCFR system 300.

In one implementation, the molten fuel salt exchange assembly 301 is capable of transferring the used fuel 312 out of the one or more portions of the MCFR system 300 while concurrently or sequentially transferring the feed material (e.g., which can include a mixture of a selected fertile material and a carrier salt) into the one or more portions of the MCFR system 300. In another implementation, the transfers may be performed synchronously or asynchronously.

In another implementation, the feed-fuel supply unit 314 includes one or more fluid transfer elements for transferring feed material 310 from the feed material source 317 to one or more portions of the MCFR system 300. The feed-fuel supply unit 314 may include any fluid transfer element or device. By way of non-limiting example, the feed-fuel transfer unit 314 may include one or more pipes 324, one or more valves 326, one or more pumps (not shown) and the like. In another implementation, the feed-fuel supply unit 314 may transfer feed material 310 from the feed material source 317 to any portion of the MCFR system 300 fluidically coupled to the reactor core section 302. By way of non-limiting example, the feed-fuel supply unit 314 may transfer feed material 310 from the feed material source 317 to any portion of the primary circuit, such as, but not limited to, the reactor core section 302, the primary coolant system 311 (e.g., primary coolant loop 315) and the like.

In one implementation, the feed material 310 is continuously transferred by the feed-fuel supply unit 314 to the reactor core section 302. By way of non-limiting example, the feed material 310 is continuously transferred at a selected flow rate by the feed-fuel supply unit 314 to the reactor core section 302. It is to be appreciated that the method of molten fuel salt removal may be continuous, semi-continuous, or in batches, and may be the same as or different from the method or timing of the fuel replacement.

In another implementation, the feed material 310 is transferred batch-wise (i.e., in discrete volume units) by the feed-fuel supply unit 314 to the reactor core section 302. By way of example, the feed material 310 is transferred to the reactor core section 302 at a selected frequency (or at non-regular time intervals), a selected volume transfer size, and a selected composition for each batch transfer. The selected frequency, volume transfer size, and composition can vary over time.

In another implementation, the feed material 310 is transferred by the feed-supply unit 314 to the reactor core section 302 in a semi-continuous matter. By way of non-limiting example, the feed material 310 is transferred to the reactor core section 302 via drip delivery. Such a semi-continuous feed of material (and simultaneous removal of utilized fuel from the reactor core section 302) may allow for limiting reactivity swings to less than 100 pcm (per cent mille or change in $k_{\it eff}$ of less than 0.01).

In another implementation, the feed-fuel supply unit 314 may include multiple feed material sources and associated fluid transfer elements (e.g., valves and piping) to allow an exchange of multiple variations of feed materials, so as to maintain the oxidation state of the reactor core section 302. For example, individual feed material sources, each containing one of $UCl_3$, $UCl_4$, or NaCl, may be used to selectively adjust the chemical composition of the molten fuel salt 308. See FIG. 8 for an explanation of the ternary phase diagram for $UCl_3$—$UCl_4$—NaCl (in mole %), wherein the oxidation states and stoichiometry of the molten fuel salt 308 may be controlled by adding selected volumes of $UCl_3$, $UCl_4$, or NaCl.

In one implementation, the reservoir 318 includes one or more storage reservoirs suitable for receiving and storing the molten fuel salt from the reactor core section 302. The reservoir 318 may be sized and or designed to limit reactivity of the used fuel salt 312 to reduce or limit reactivity below criticality. The reservoir 318 may include any one or more of neutron absorbers, moderating materials, heat transfer devices, etc. to ensure any ongoing nuclear fission reactions within the used fuel salt 312 do not exceed some specified threshold of design and/or safety. In another implementation, the reservoir 318 may include a second generation ("daughter") fast spectrum molten salt reactor.

It should be understood that used-fuel removal and feed material supply are coordinated to maintain the reactivity and/or composition of the molten fuel salt 308 within the reactor core section 302. Accordingly, in one implementation, the molten fuel salt exchange assembly 301 includes an exchange controller 328. In one implementation, the exchange controller 328 may control one or more active fluid control elements in order to control the flow of feed material 310 from the feed material source 317 and the flow of used fuel salt 312 from the reactor core section 302 to the reservoir 318. In one implementation, the valves 322 and 326 are active valves controllable via electronic signal from the exchange controller 328. By way of non-limiting example, the valves 322 and 326 may include, but are not limited to, electronically-controlled two-way valves. In this regard, the exchange controller 328 may transmit a control signal to one of or both of the valves 322 and 326 (or other active flow control mechanisms) to control the flow of feed material 310 from the feed material source 317 and the flow of used fuel salt 312 from the reactor core section 302 to the reservoir 318. It is noted herein that the present implementation is not limited to the electronically controlled valves, as depicted in FIG. 3, which are provide merely for illustrative purposes. It is recognized herein that there are a number of flow control devices and configurations applicable to molten salt transfer that may be implemented to control the flow of feed material 310 from the feed material source 317 and the flow of used fuel salt 312 from the reactor core section 302 to the reservoir 318.

In one implementation, the molten fuel salt exchange assembly 301 includes one or more reactivity parameter sensors 330, as discussed above. As previously noted, the one or more reactivity parameter sensors 330 may include any one or more sensors for measuring or monitoring one or more parameters indicative of reactivity or a change in reactivity of the fuel salt 308 of the reactor core section 302. The reactivity parameter sensor 330 may include, but is not limited to, any one or more capable of sensing and/or monitoring one or more of neutron fluence, neutron flux, neutron fissions, fission products, radioactive decay events, temperature, pressure, power, isotropic concentration, burn-up and/or neutron spectrum. By way of non-limiting example, as discussed above, the one or more reactivity parameter sensors 330 may include, but are not limited to, a fission detector (e.g., micro-pocket fission detector), a neutron flux monitor (e.g., a fission chamber or an ion chamber), a neutron fluence sensor (e.g., an integrating diamond sensor), a fission product sensor (e.g., a gas detector, a β detector or a γ detector) or a fission product detector configured to measure a ratio of isotope types in a fission product gas. By way of another non-limiting example, as discussed above, the one or more reactivity parameter sensors 330 may include, but are not limited to, a temperature sensor, a pressure sensor or a power sensor (e.g., power range nuclear instrument).

In another implementation, the reactivity is determined with one or more of the measured reactivity parameters (discussed above). In one implementation, the reactivity of the reactor core section 302 is determined by the controller 328 using a look-up table. In another implementation, the reactivity of the reactor core section 302 is determined by the controller 328 using one or more models. In another implementation, the reactivity parameter may be determined by an operator and entered directly into the controller 328 via an operator interface. It is noted herein that, while the reactivity parameter sensor 330 is depicted as being located within the fuel salt 308 in the reactor core section 302 of the MCFR system 300, this configuration is not a limitation on the present implementation, as noted previously herein. In one implementation, the determined reactivity parameter (whether measured or modeled), or a parameter indicative of reactivity, is compared with a predetermined reactivity threshold. If the determined reactivity parameter, or a parameter indicative of reactivity, satisfies a control condition (e.g., exceeds a high threshold or falls below a low threshold), a control system (e.g., a molten fuel salt exchange system, a volumetric displacement system, and/or other control systems) may be actuated to adjust the reactivity of the reactor core section 302 back into a nominal reactivity range.

In another implementation, the one or more reactivity parameter sensors 330 are communicatively coupled to exchange controller 328. The one or more reactivity parameter sensors 330 are communicatively coupled to the exchange controller 328. For example, the one or more reactivity parameter sensors 330 may be communicatively coupled to the exchange controller 328 via a wireline connection (e.g., electrical cable or optical fiber) or wireless connection (e.g., RF transmission or optical transmission).

In one implementation, the exchange controller 328 includes one or more processors and memory. In one implementation, the memory maintains one or more sets of program instructions configured to carry out one or more operational steps of the molten fuel salt exchange assembly 301.

In one implementation, the one or more program instructions of the exchange controller 328, in response to the determined reactivity parameter exceeding the upper reactivity threshold, may cause the exchange controller 328 to direct the molten fuel salt exchange assembly 301 to replace a selected and determined volume of the molten fuel salt 308 of the MCFR system 300 with a selected and determined volume and composition of feed material 310 in order to control the reactivity and/or composition of the molten fuel salt 308 within the reactor core section 302.

In another implementation, the one or more program instructions are configured to correlate a determined reactivity of the molten fuel salt 308 of the reactor core section 302 with a selected replacement volume and composition to compensate for the measured excess reactivity of the reactor core section 302, as well as other molten fuel salt compositional considerations. By way of non-limiting example, the reactivity parameter sensor 330 may acquire a reactivity parameter associated with the molten fuel salt 308 within the reactivity core section 302 (or another portion of the MCFR system 300). In settings where the reactivity parameter is indicative of a reactivity larger than a selected upper threshold, the exchange controller 328 may determine the replacement volume and composition to compensate for the elevated reactivity and direct the molten fuel salt exchange assembly 301 to remove the determined volume of molten fuel salt 308 from the reactor core section 302 (e.g., removed by used-fuel transfer unit 316) and replace the removed fuel salt with a substantially equal volume of feed material 310 (e.g., replaced by the feed-fuel supply unit 314).

The amount of used-fuel 312 to be removed from the reactor core section 302 may be determined based upon the determined reactivity (measured or modeled) of the reactor core section 302, the determined amount of fissile and/or fertile fuel (measured or modeled), the waste (including fission products and other possible neutron absorbers) in the molten fuel salt 308, etc. The determined core reactivity, exceeding the upper threshold, may be compared to a lower threshold to determine an amount of change in reactivity needed to maintain the core reactivity within the bounds of the selected nominal reactivity. This amount of required change in reactivity can then be used with the existing fuel to determine the amount of used-fuel 312 to be removed to maintain core reactivity within the bounds of the upper and lower thresholds of reactivity. For example, the worth of a determined volume of removed used-fuel 312 may be determined (based upon the burn up of fissile fuel, the available fissile fuel, the remaining fertile fuel, and other components, e.g., fission products and carrier salts) of the existing fuel composition, and compared if sufficient to reduce reactivity of the reactor core to the lower threshold. Based upon the determined core reactivity after fuel removal, the worth, volume and components of the feed fuel may be determined to maintain reactivity for continued breeding of fuel, fuel volume requirements for the system, and maintain or adjust stoichiometry of the fuel overall. These determinations can be based upon computational models of reactivity and reactions, look up tables based on empirical and/or modeled data, etc. As noted above, any one or more (or combination of) the nominal reactivity level, the upper threshold reactivity level, and/or the lower reactivity threshold may dynamically change over the lifetime of the reactor for various operational and/or safety reasons.

In another implementation, in settings where the frequency, volume, and composition of the replacement of molten fuel salt 308 with feed material 310 is predetermined, the exchange controller 328 may carry out a pre-determined scheduled exchange process via the control of active elements (e.g., valves 322 and 326, pumps and the like) of the molten fuel salt exchange assembly 301, based on time since last exchange cycle and/or determined reactivity of the reactor core section 302, as discussed herein. In alternative implementations, exchange may be performed at dynamically determined frequencies and/or volumes, based on results from reactivity parameter sensors 330 and other sensors, monitoring techniques, and computations.

In one implementation, the selected volume and/or composition of feed-material added to the reactor core section 302 has a predetermined "worth" that can be adjusted up or down in volume and/or composition to match a target reactivity removal from a selected volume of used fuel removed from the reactor core section 302.

In another implementation, the exchange controller 328 may direct the molten fuel salt exchange assembly 301 to perform a continuous exchange of molten fuel salt 308 with feed material 310, with feed material 310 being continuously fed to the reactor core section 302 and used-fuel 312 being continuously removed from the reactor core section 302 at a selected rate (e.g., 0.1-10 liters/day). In another implementation, the exchange controller 328 may direct the molten fuel salt exchange assembly 301 to perform semi-continuous exchange (e.g., drip) of molten fuel salt 308 with feed material 310. By way of example, the exchange controller 328 may direct the molten fuel salt exchange assembly 301 to perform drip exchange of molten fuel salt 308 with feed material 310, with feed material 310 being drip fed to the reactor core section 302 and discrete amounts of used-fuel 312 being simultaneously removed from the reactor core section 302. In another implementation, the exchange controller 328 may direct the molten fuel salt exchange assembly 301 to perform a batch-wise exchange of molten fuel salt 308 with feed material 310. By way of example, the exchange controller 328 may direct the molten fuel salt exchange assembly 301 to perform a series of discrete, or batch-wise, exchanges of molten fuel salt 308 with feed material 310, with discrete amounts of feed material 310 being fed to the reactor core section 302 and discrete amounts (equal in volume to the feed material) of used-fuel 310 being concurrently or sequentially removed from the reactor core section 302 at selected time intervals. By way of another non-limiting example, the exchange controller 328 may direct the molten fuel salt exchange assembly 301 to perform a single discrete, or batch-wise, exchange of molten fuel salt 308 with feed material 310, with a discrete amount of feed material 310 being fed to the reactor core section 302 and an equal amount of used-fuel 312 being concurrently or sequentially removed from the reactor core section 302 at the selected time.

In another implementation, the MCFR system 300 includes one or more gas sparging units. The one or more gas sparging units are operably coupled to the reactor core section 302 and configured to continuously remove one or more waste gases (such as gaseous fission products like noble gases) from the molten fuel salt 308 of the reactor core section 302. By way of non-limiting example, the one or more gas sparging units include a helium and/or hydrogen gas sparging unit. It is noted that the noble gases include He, Ne, Ar, Kr and Xe. It is further noted that the gaseous waste absorbed in the molten fuel salt 308 may diffuse out of the molten fuel salt 308 of the reactor core section 302, allowing for them to be pumped out of the reactor via an associated gas pump.

In another implementation, the reactor includes one or more filtering units. The one or more filtering units are operably coupled to the reactor core section 302 and configured to continuously remove one or more solid waste components, e.g., solid fission products such as noble and/or semi-noble metals or other particulate waste. By way of non-limiting example, the one or more filtering units may include one or more filters located in a bypass flow of the reactor core section 302 arranged to collect the one or more components of the solid waste, which precipitate and/or plate (depending on the design geometry) out of the molten fuel salt 308. It is noted that the noble and semi-noble metals include Nb, Mo, Tc, Ru, Rh, Pd, Ag, Sb and Te.

In another implementation, the primary coolant system 311 includes one or more pumps 350. For example, one or more pumps 350 may be fluidically coupled to the primary coolant system 311 such that the one or more pumps 350 drive the molten fuel salt 308 through the primary coolant/reactor core section circuit. The one or more pumps 350 may include any coolant/fuel pump applicable to molten fuel salt 308. For example, the one or more fluid pumps 350 may include, but are not limited to, one or more mechanical pumps fluidically coupled to the primary coolant loop 313. By way of another example, the one or more fluid pumps 350 may include, but are not limited to, one or more electromagnetic (EM) and/or mechanical pumps fluidically coupled to the primary coolant loop 313.

In another implementation, the MCFR system 300 includes a secondary coolant system 352 thermally coupled to the primary coolant system 311 via one or more heat exchangers 354. The secondary coolant system 352 may include one or more secondary coolant loops 356 formed from pipes 358. The secondary coolant system 352 may include any secondary coolant system arrangement suitable for implementation in a molten fuel salt context. The secondary coolant system 352 may circulate a secondary coolant through one or more pipes 358 and/or fluid transfer assemblies of the one or more secondary coolant loops 356 in order to transfer heat generated by the reactor core section 302 and received via the primary heat exchanger 354 to downstream thermally driven electrical generation devices and systems. For purposes of simplicity, a single secondary coolant loop 360 is depicted in FIG. 3. It is recognized herein, however, that the secondary coolant system 352 may include multiple parallel secondary coolant loops (e.g., 2-5 parallel loops), each carrying a selected portion of the secondary coolant through the secondary coolant circuit. It is noted that the secondary coolant may include any second coolant suitable for implementation in a molten fuel salt context. By way of example, the secondary coolant may include, but is not limited to, liquid sodium. It is further noted that, while not depicted in FIG. 3, the MCFR system 300 may include any number of additional or intermediate coolant systems and/or heat transfer circuits.

It is noted herein that the utilization of various metal salts, such as metal chloride salts, in MCFR system 300 may cause corrosion and/or radiation degradation over time. A variety of measures may be taken in order to mitigate the impact of corrosion and/or radiation degradation on the integrity of the various salt-facing components (e.g., reactor core section 302, primary coolant piping 315, heat exchanger 354 and the like) of the MCFR system 300. In one implementation, using a noble metal as a cladding for various salt-facing components can mitigate the impact of corrosion of such components. In one implementation, the use of molybdenum cladding on the sodium-exposed surfaces can mitigate the impact of corrosion on such surfaces. In another implementation, the molten fuel salt may be maintained (e.g., via molten fuel salt exchange) in a redox (chemical reduction oxidation) state that is less corrosive. Certain additives may also be employed to mitigate the corrosive impact of the molten fuel salt on such components.

Figure 4:
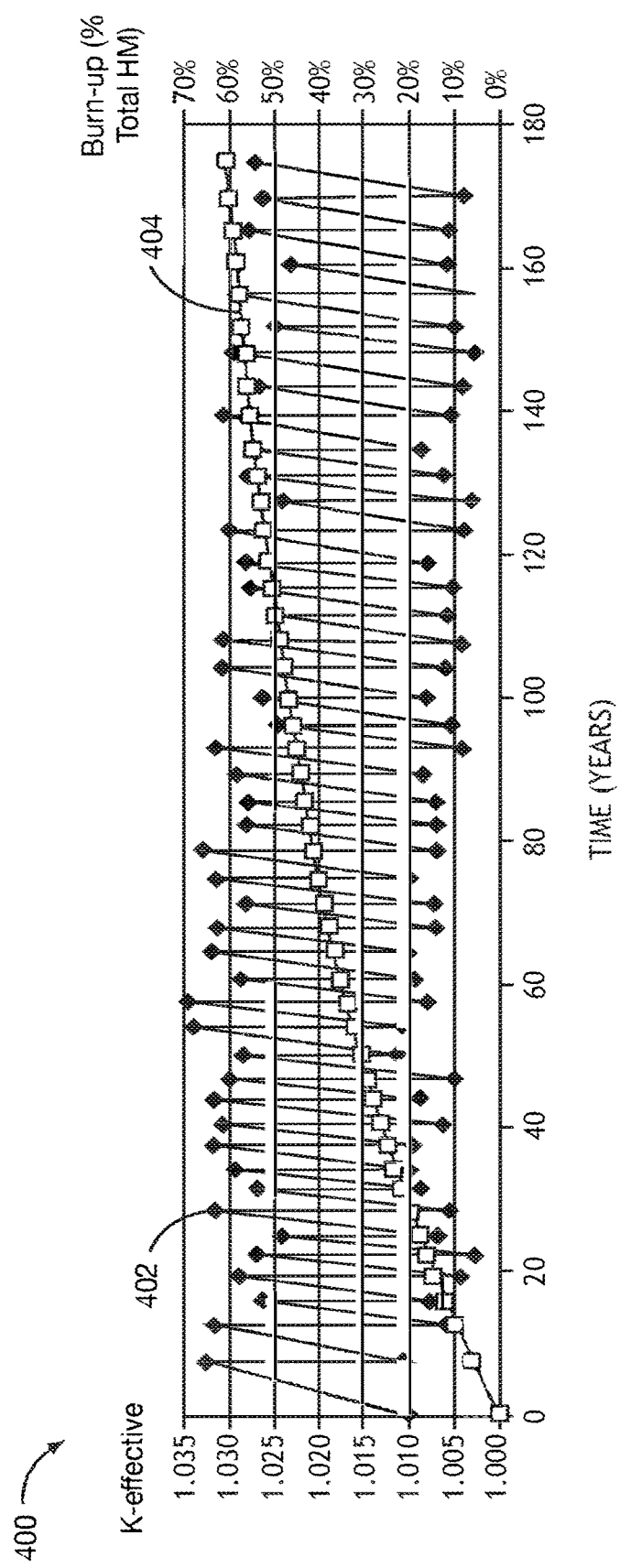
FIG. 4 illustrates a graph of modeled $k_{eff}$ values of a reactor core and the total percentage of burn up of heavy metal (HM) fuel over time for a molten salt reactor controlled by the periodic exchange of molten fuel salt of the reactor with a fertile fuel salt.

FIG. 4 illustrates a graph 400 of modeled $k_{eff}$ values (curve 402) of a reactor core and the total percentage of burn up of heavy metal (HM) fuel (curve 404) over time for a molten salt reactor controlled by the periodic exchange of molten fuel salt of the reactor with a fertile fuel salt. As also noted with regard to FIG. 2, the periodic exchange of molten fuel salt of the reactor with a fertile fuel salt may be used to limit reactivity and maintain ongoing breed-and-burn behavior within the molten salt reactor. In another implementation, the molten fuel salt exchange assembly may feed the molten salt reactor with salt loaded with fertile material (e.g., depleted uranium) at a rate that matches the rate at which fissile material is burned by the molten salt reactor, as discussed with regard to FIG. 5. Alternatively, the fertile material may be added at a different rate and/or time than the fissile fuel is removed.

Figure 5:
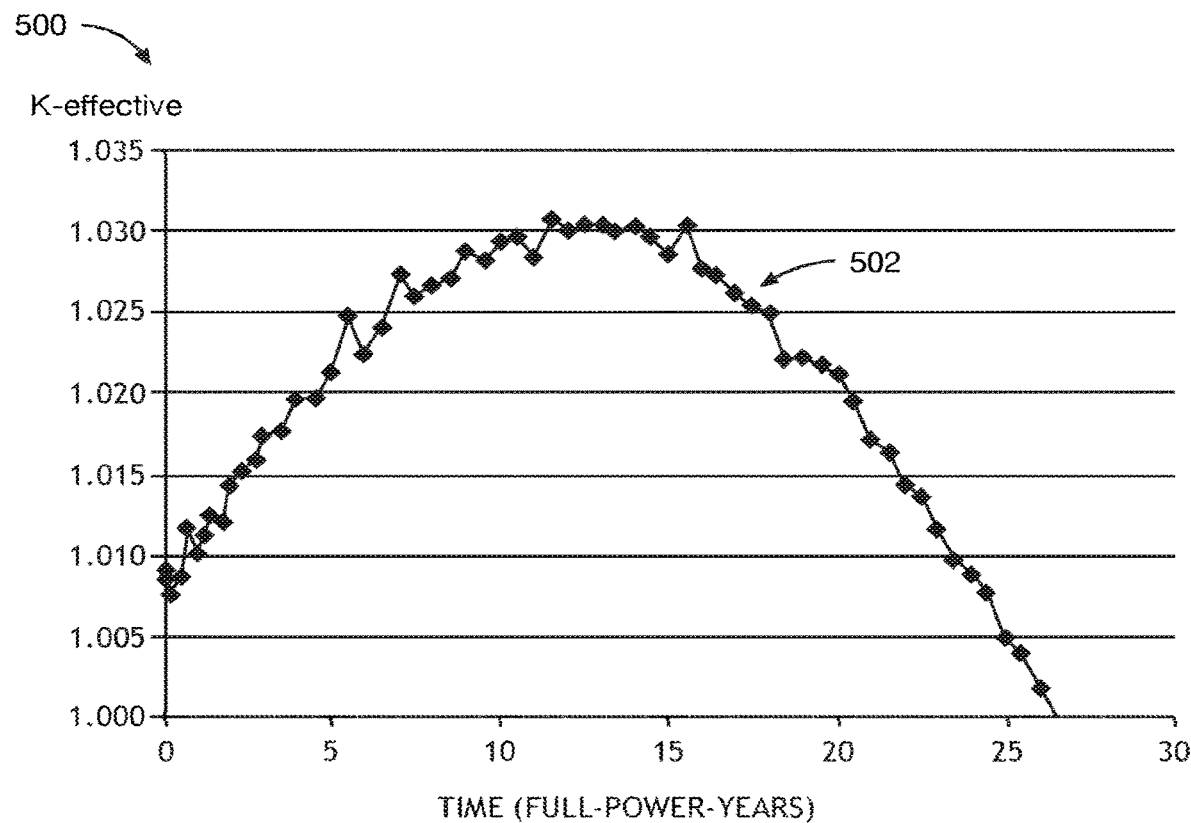
FIG. 5 illustrates a graph of $k_{eff}$ versus time for a modeled molten salt reactor with a depleted uranium feed provided at a rate that matches the reactor burn rate.

FIG. 5 illustrates a graph 500 of $k_{eff}$ (curve 502) versus time for a modeled molten salt reactor with a depleted uranium feed provided at a rate that matches the reactor burn rate. It is noted that, in this implementation, the exchange assembly does not or need not specifically target lanthanides for removal from the molten salt reactor but rather removes them via bulk volume removal of the molten fuel salt within the molten salt reactor. The removed material may include without limitation one or more of the following: lanthanides, other fission products, fissile material, fertile material and/or the carrier salt. As shown in FIG. 5, the molten salt reactor breeds up and reaches a peak in $k_{eff}$ of approximately 1.03 at around 10-15 years. The molten salt reactor thereafter experiences a loss in reactivity as the actinide inventory, including fissile material, falls while the fission product inventories increase. It is noted that such a configuration may operate for over 20 years and burn greater than 36% of the heavy metal fuel initially loaded into the reactor and later fed to the molten salt reactor during the molten salt reactor's lifetime. Example $k_{eff}$ ranges that may be employed can include without limitation 1.0 as a low threshold and 1.035 as a high threshold, defining an example nominal reactivity range. Another example of $k_{eff}$ can include without limitation 1.001 as a low threshold and 1.005 as a high threshold, defining another example nominal reactivity range. Yet another example nominal reactivity range may extend from just over 1.0 to about 1.01. Other nominal ranges and thresholds may be employed. Furthermore, other control systems may be employed, including without limitation control rods or control drums, moderators, etc.

Figure 6:
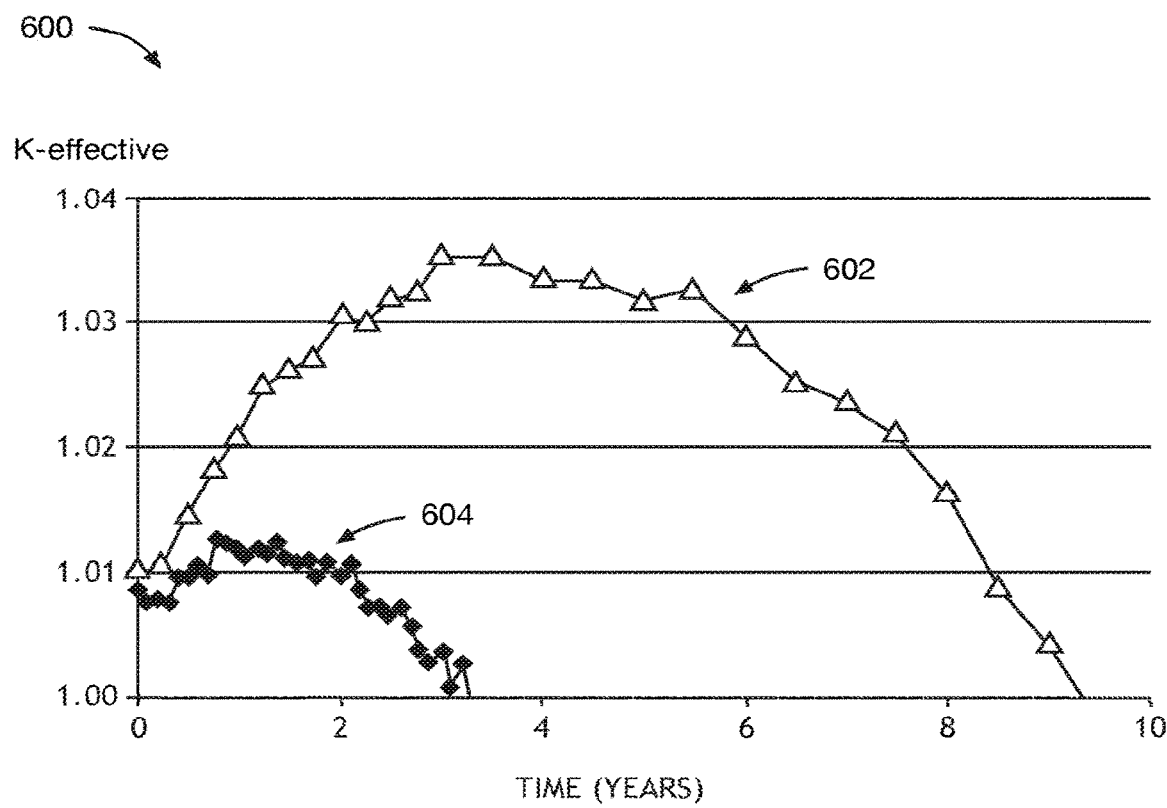
FIG. 6 illustrates a graph depicting $k_{eff}$ as function of time for a molten salt reactor with no addition of feed material and no removal of lanthanides.

FIG. 6 illustrates a graph 600 depicting $k_{eff}$ as function of time for a molten salt reactor with no addition of feed material and no removal of lanthanides. Curve 602 depicts $k_{eff}$ for the case where waste fission products, such as noble gases and noble/semi-noble metals, are removed from the reactor core section 302. In such a scenario, calculations indicate that 30% burn-up may be achieved, with a lifetime of approximately 9 years. Curve 604 depicts $k_{eff}$ as a function of time for the cases where nothing is removed from the reactor core section 302. In such a scenario, calculations indicate that a 10% burn-up may be achieved, with a lifetime of approximately 3 years.

Figure 7:
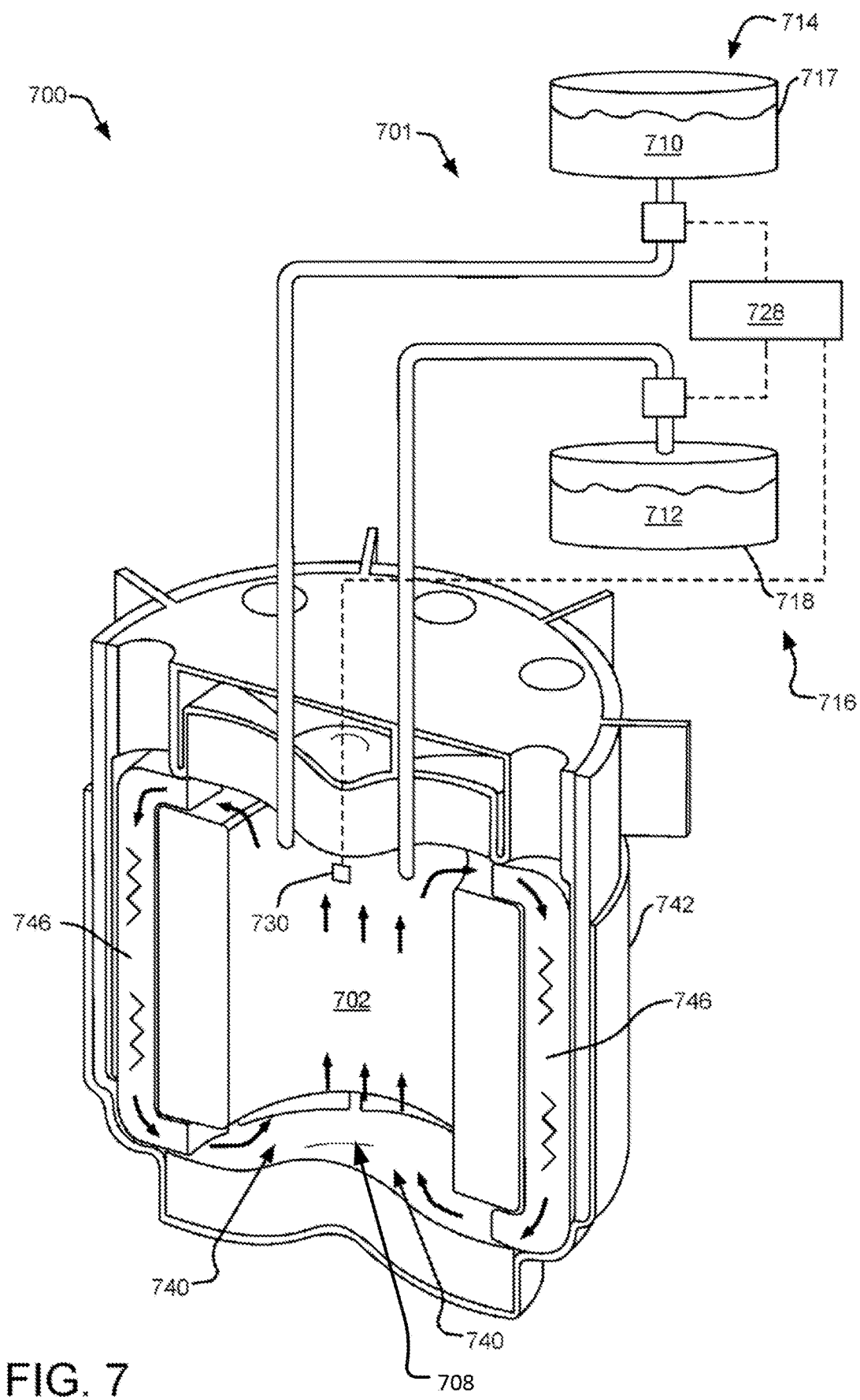
FIG. 7 illustrates an alternative example MCFR system equipped with a molten fuel salt exchange assembly.

FIG. 7 illustrates an alternative example MCFR system 700 equipped with a molten fuel salt exchange assembly 701. The primary coolant system is configured such that a primary coolant 740 includes the molten fuel salt that circulates within the reactor vessel 742 of the reactor core section 702 (e.g., main vessel core). In this regard, the molten fuel salt does not flow out of the reactor core section 702 as part of the primary coolant circuit but rather the molten fuel salt is flowed as the primary coolant through the reactor core section 702. It is noted that in this implementation, the MCFR system 700 may include one or more heat exchangers 746 in the primary coolant circuit for the reactor core section 702, such that the molten fuel salt flows as the primary coolant 740 through the one or more heat exchangers 746, through the reactor core section 702, does not flow out of the reactor core section 702, and back through the one or more heat exchangers 746, as part of the primary coolant circuit. As such, heat from the reactor core section 702 is transferred from the molten fuel salt via one or more heat exchangers 746 to a secondary coolant system (not shown).

In FIG. 7, the molten fuel salt exchange assembly 701 is operably coupled to the reactor core section 702 (or another portion of the example MCFR system 700) and is configured to periodically replace a selected volume of the molten fuel salt 708 with a selected volume and composition of the feed material 710. In this regard, the molten fuel salt exchange assembly 701 can control the reactivity and/or composition of the molten fuel salt 708 within the example MCFR system 700. In one implementation, it is noted that the molten fuel salt 708 removed from the reactor core section 702 (shown as removed molten fuel 712 in a reservoir 718) includes at least some fissile material, while the feed material 710 includes at least some fertile material. In another implementation, the removed molten fuel 712 includes waste that can include one or more fission products. For example, the removed molten fuel 712 may include without limitation one or more lanthanides generated via fission within the molten fuel salt 708. In yet another implementation, the removed molten fuel 712 may include without limitation a mixture of fissionable material (e.g., $UCl_4$), one or more fission products (e.g., one or more lanthanides and/or a carrier salt (e.g., NaCl). While molten fuel salt exchange is described as periodic, it should be understood that such exchange may be performed in a batch-wise, continuous, or semi-continuous (e.g., drip) manner and may be periodic, sporadic or vary in timing from one fuel exchange to the next.

In the example implementation illustrated in FIG. 7, the molten fuel salt exchange assembly 701 (a "molten fuel salt exchange system") includes a used-fuel transfer unit 716 and a feed-fuel supply unit 714. The molten fuel salt exchange assembly 701 may include the same or similar elements and operate the same or in a similar manner as the molten fuel salt exchange assembly 301 of FIG. 3, although alternative structures and operations may also be employed. As shown in FIG. 7, an exchange controller 728 may control one or more active fluid control elements in order to control the flow of feed material 710 from the feed material source 717 and the flow of used fuel salt 712 from the reactor core section 702 to the reservoir 718.

As the molten fuel salt 708 within the reactor core section 702 breeds up, converting fertile material to fissile material, the molten fuel salt exchange assembly 701 removes some of the molten fuel salt 708 as the removed molten fuel 712 in a feed material source 717, and replaces the removed molten fuel 712 with the feed material 710, which includes at least some fertile material. In another implementation, the removed molten fuel 712 includes one or more fission products. Accordingly, the molten fuel salt exchange assembly 701, removing not only fissile fuel but also lanthanides and other neutron absorbers, may act as a control mechanism on the reactivity and lifetime extender of the molten fuel salt 708 within the example MCFR system 700. The control advantage of the fuel exchange may serve to return the reactivity of the molten fuel salt 708 (monitored by a reactivity sensor 730 as discussed above with reference to reactivity sensor 330 of FIG. 3) to a critical condition (e.g., a barely critical condition) and may also increase the effectiveness of the reactor by removing neutron absorbers and/or modifiers. Thus, in one implementation, the molten fuel salt exchange assembly 701 of the example MCFR system 700 can allow operation of the example MCFR system 700 indefinitely without adding further enrichment. It should be understood that molten fuel salt exchange may occur during operation of the nuclear reactor and/or during maintenance shut-down periods.

The molten fuel salt of the feed material 710 may include without limitation one or more fertile fuel salts, such as a salt containing at least one of depleted uranium, natural uranium, thorium, or used nuclear fuel. For example, in the case of a chloride-based fuel, one or more fertile fuel salts may include a chloride salt containing at least one of depleted uranium, natural uranium, thorium, or a used nuclear fuel. Furthermore, the molten fuel salt of the feed material 710 may include without limitation one or more fertile fuel salts mixed with a carrier salt, such as NaCl, although other carrier salts may be employed.

Figure 8:
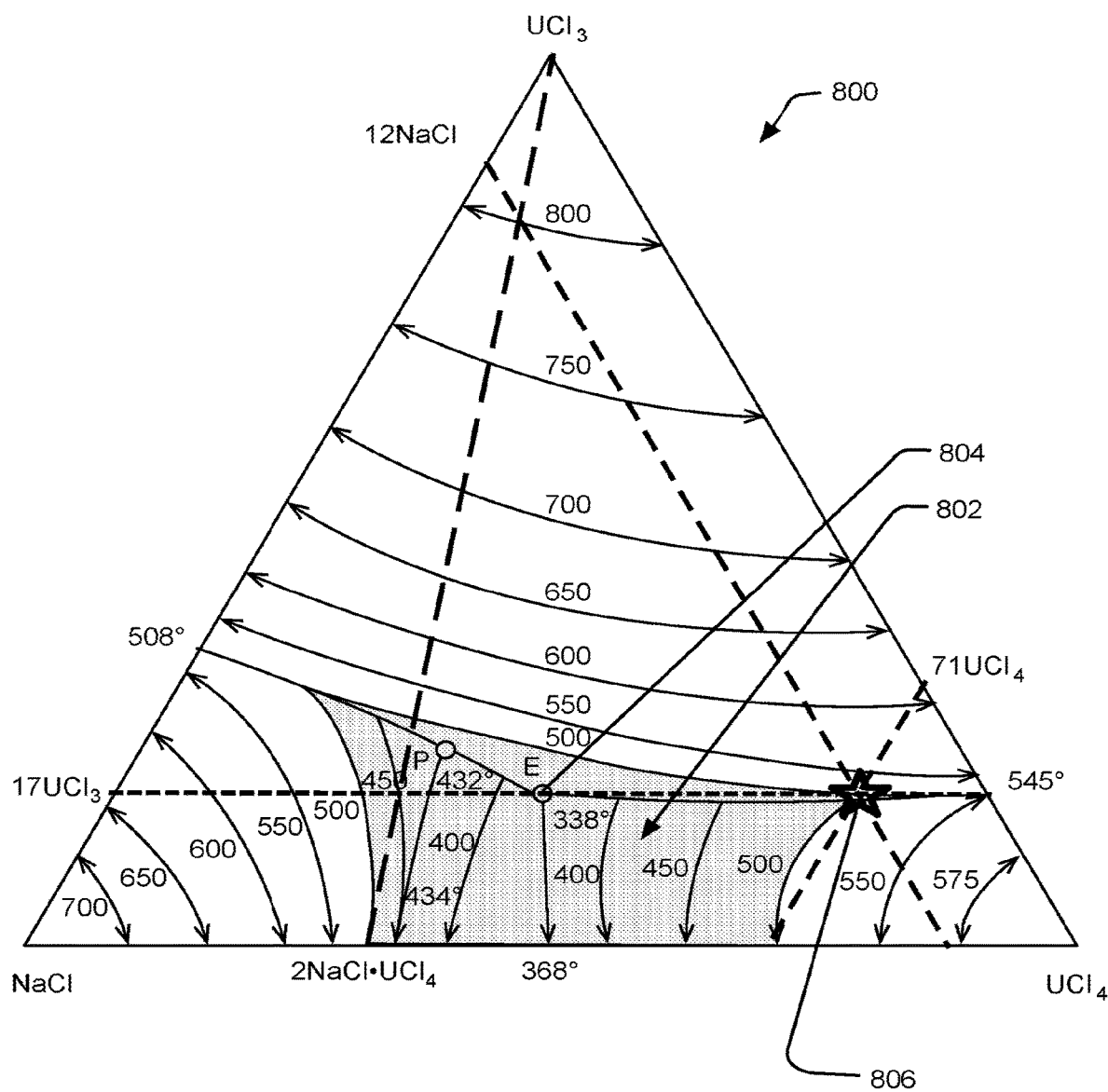
FIG. 8 illustrates an example ternary phase diagram for $UCl_3$—$UCl_4$—$NaCl$ (in mole %).

FIG. 8 illustrates an example ternary phase diagram 800 for $UCl_3$—$UCl_4$—NaCl (in mole %). In one implementation, an MCFR system, as modelled, uses a salt mixture composed of various sodium chloride and uranium chloride components. One example of such compositions may include one more components of NaCl, $UCl_3$, and/or $UCl_4$, as shown in the ternary phase diagram 800 of FIG. 8. The shaded region 802 shows the extent of a 500° C. melting point envelope. Multiple fuel salt compositions have been considered and have been shown to be capable of net breed and burn behavior. Selection of the final composition depends on a variety of factors including oxidation state/corrosion, solubility, viscosity and reactor size.

Modelling has investigated different specific salts in the ternary diagram 800 with melting points suitable for use in the MCFR implementations, including without limitation 82UCl$_4$-18UCl$_3$, 17UCl$_3$-71UCl$_4$-12NaCl, and 50UCl$_4$-50NaCl. Results of the modelling indicate that such fuel salt implementations will sustain breed and burn behavior and could be used in reactor implementations described herein.

As mentioned, the ternary phase diagram 800 shows the expected melting temperature for any mixture of UCl$_3$—UCl$_4$—NaCl. Of particular interest are mixtures having a melting point less than about 500° C., which mixtures are illustrated in the shaded region 802 of the ternary phase diagram 800. The eutectic point 804 has a melt temperature of 338° C. and a composition of 17UCl3-40.5UCl4-42.5NaCl (i.e., 17 mol % UCL3, 40.5 mol % UCL4 and 42.5 mol % NaCl). The shaded region 802 indicates a melting point envelope of 500° C. Moving to the far-right of this shaded region 802 provides an example implementation 806, 17UCl3-71UCl4-12NaCl, but it should be understood that many possible compositions exist within the melting point envelope of the shaded area 802 as various fuel salt mixtures having a melting point below 500° C. Furthermore, if the melting temperature limit is slightly extended to 508° C., a composition of 34UCl3-66NaCl provides an option that is free of UCl$_4$. Likewise, the ternary diagram 800 allows a range of specific UCl3-UCl4-NaCl fuel salt implementations to be identified for any given melting point limit between about 800° C. and 338° C. For example, ternary salts with melting points between 300-550° C., 338-500° C., and 338-450° C. may be easily identified. Example methods of detecting composition changes may include without limitation:

1) measurements of redox (chemical reduction oxidation)
2) online glow discharge mass spectrometry of a sample
3) reactivity changes in the core
4) offline sample analysis including GDMS (glass discharge mass spectroscopy)
5) gamma spectroscopy The specific composition of the mixture may include any formulation including two or more of UCl$_4$, UCl$_3$ or NaCl, such that the resulting uranium content level and melting temperature achieve desired levels. By way of non-limiting example, the specific composition may be selected so that the corresponding melting temperature falls between 330 and 800° C. By way of another non-limiting example, the specific composition may be selected so that the overall uranium content level is at or above 61% by weight. In addition to selecting the overall uranium content level the fuel composition may also be determined to meet a selected amount of fissile uranium (as opposed to fertile). For example, the specific composition of the molten fuel salt may be selected such that the U-235 content of the molten fuel salt is below 20%.

The following discussion will identify particular implementations of interest, however the following discussion does not limit the scope of the invention as claimed to only the implementations described below, but rather, that any implementations identifiable from FIG. 8 are contemplated, as well as any implementations having different metal chlorides other than NaCl. Examples of additional, non-fissile metal chlorides include NaCl, MgCl$_2$, CaCl$_2$, BaCl$_2$, KCl, SrCl$_2$, VCl$_3$, CrCl$_3$, TiCl$_4$, ZrCl$_4$, ThCl$_4$, AcCl$_3$, NpCl$_4$, PuCl$_4$, AmCl$_3$, LaCl$_3$, CeCl$_3$, PrCl$_3$ and/or NdCl$_3$.

Liquid fuels have an inherent advantage over solid fuels in that the heat is "born" within the fuel coolant. A solid fuel may (1) conduct heat to the outer surface of the fuel element, (2) conduct heat through the cladding (including past a physical gap or through a bond material), (3) convect the heat from the cladding surface to the primary coolant, and (4) advect the heat out of the core. By comparison, a liquid fuel provides acceptable thermal transfer with step (4) and transport the fuel salt/primary coolant out of the core and to the primary heat exchanger. Additionally, the liquid salts under consideration have volumetric heat capacities that are nearly twice that of liquid sodium at similar temperatures.

Another key advantage provided by a molten fuel salt is the strong negative temperature coefficient—hot salt is less reactive than cold salt. As a result, transients that result in overheating (e.g., loss of heat sink) are limited in severity by the expansion of the fuel salt. For example, in a molten chloride fast reactor (MCFR), as the selected chloride salt composition is heated from 600 to 800° C., its density drops by more than 12%, providing a negative reactivity feedback that is approximately 50× stronger than that provided by the Doppler effect.

Fuel salts with similar ratios of the number of mono-chlorides, tri-chlorides, and tetra-chlorides behave similarly. The oxidation state within reactor core section of a molten chloride fast reactor (MCFR), for example, may be defined as the ratio of the molecules grouped by the number of attached chlorine molecules. The oxidation state of the reactor core section can be controlled by exchanging a selected amount of fuel salt in the reactor core section with a similar amount of makeup salt or feed material, where the composition of the feed material is designed to bring the oxidation state of the reactor core section toward a target oxidation state. In one implementation, the feed material contains a mixture of a selected fertile material and a carrier salt.

In one implementation, the fuel salt in the reactor core section is initially at an oxidation state that is mostly composed of mono-chlorides, tri-chlorides, and tetra-chlorides. This initial fuel salt composition (prior to removal a selected volume of the fuel salt and addition of feed material) is represented by the initial fuel salt vector (f), where the subscript x represents the number of chloride ions present in each molecule of the fuel salt. Molecules with 2, 5 and 6 chloride atoms can exist within the reactor core section in very small quantities, so they can be ignored—the bulk properties of the molten chloride fuel are dominated by the mono-chlorides, tri-chlorides, and tetra-chlorides (see Equation (1), which indicates a simplified fuel salt vector in which the molten chloride fuel is dominated by mono-chlorides ($f_1$), tri-chlorides ($f_3$), and tetra-chlorides ($f_4$)). As such, if the target salt mixture is PbCl$_2$—UCl$_3$—UCl$_4$ (or PuCl$_2$—UCl$_3$—UCl$_4$), one would control on di-chlorides, tri-chlorides, and tetra-chlorides. Note: the fuel salt vector may be generalized to other chloride salts and fluoride salts. Accordingly, a similar control approach may be applied to fluoride salts, where the subscript x represents the number of fluoride ions in each molecule of the fuel salt.

$$\begin{pmatrix} f_1 \\ f_2 \\ f_3 \\ f_4 \\ f_5 \\ f_6 \end{pmatrix} \sim \begin{pmatrix} f_1 \\ f_3 \\ f_4 \end{pmatrix} = (f) \quad (1)$$

As such, the initial fuel salt vector (f) may be represented by the simplified fuel salt vector given in Equation (1).

Removal of a selected volume (r) of the initial fuel salt over a period of time (either as a large batch, a set or sequence of smaller batches, or a continuous or partially continuous stream) normalized to the amount of initial fuel salt present in the reactor at the start of that period of time (e.g., about 1% per year for a specific MCFR system) yields an adjusted fuel salt vector (f'), which is shown by Equation (2), representing the fuel salt remaining in the reactor after removal of a selected volume of the initial fuel salt.

$$\begin{pmatrix} f_1 \\ f_3 \\ f_4 \end{pmatrix} \sim C * \begin{pmatrix} f_1 \\ f_3 \\ f_4 \end{pmatrix} \rightarrow \begin{pmatrix} f'_1 \\ f'_3 \\ f'_4 \end{pmatrix} = (f') \quad (2)$$

A target fuel salt composition within the reactor, represented by a target fuel salt vector (t), may be set to achieve a particular oxidation state and/or stoichiometry from the adjusted fuel salt composition (adjusted fuel salt composition (f') by adding a selected volume and composition of feed material, which is represented by a feed fuel salt vector (m). This relationship is represented by Equations (3) and (4), where $(r) \sim C*(f)$.

$$(f)-(r)=(f') \quad (3)$$

$$(f')+(m)=(t) \quad (4)$$

In an alternative notation, this relationship is represented by Equations (5) and (6).

$$\begin{pmatrix} f_1 \\ f_3 \\ f_4 \end{pmatrix} - \begin{pmatrix} r_1 \\ r_3 \\ r_4 \end{pmatrix} = \begin{pmatrix} f'_1 \\ f'_3 \\ f'_4 \end{pmatrix} \quad (5)$$

$$\begin{pmatrix} f'_1 \\ f'_3 \\ f'_4 \end{pmatrix} + \begin{pmatrix} m_1 \\ m_3 \\ m_4 \end{pmatrix} = \begin{pmatrix} t_1 \\ t_3 \\ t_4 \end{pmatrix} \quad (6)$$

Given Equations (3)-(6), the volume and composition of the feed material to be added to the reactor to achieved the target oxidation state and/or stoichiometry may be determined (e.g., (m)). For each molecule type, the makeup fuel salt vector ($m_x$) may be represented by Equation (7), where the subscript x represents the number of fluoride ions in each molecule of the fuel salt and C represents the normalized amount removed in a given period of time.

$$(m_x)=(t_x)-(1-C)*(f_x) \quad (7)$$

Nuclear fission reactors operate at zero or approximately zero excess reactivity to operate at a constant power. In addition to controlling the oxidation state of the molten fuel salt in the reactor, the reactivity of the described molten salt reactor implementations can be adjusted in situ by swapping fuel salt for a feed material.

In a burner molten salt reactor, fissile material is burned so reactivity tends to decrease with time. As such, the feed material is designed to contain a significant quantity of high reactivity fuel salt rich in fissile material, such as enriched uranium or reprocessed transuranics. In a breeder molten salt reactor, fissile material is produced faster than it is consumed by the fission reaction, so the reactivity tends to increase with time. As such, the feed material is designed to contain low reactivity fuel salt that is rich in fertile material, such as natural uranium, depleted uranium, used nuclear fuel, or thorium. The rate at which feed material is introduced to the reactor core is selected to maintain the reactivity within certain design limits, such as nominal reactivity (e.g. $k_{eff}$ equaling 1 or slightly greater than 1, an upper reactivity threshold, and/or a lower reactivity threshold).

Figure 9:
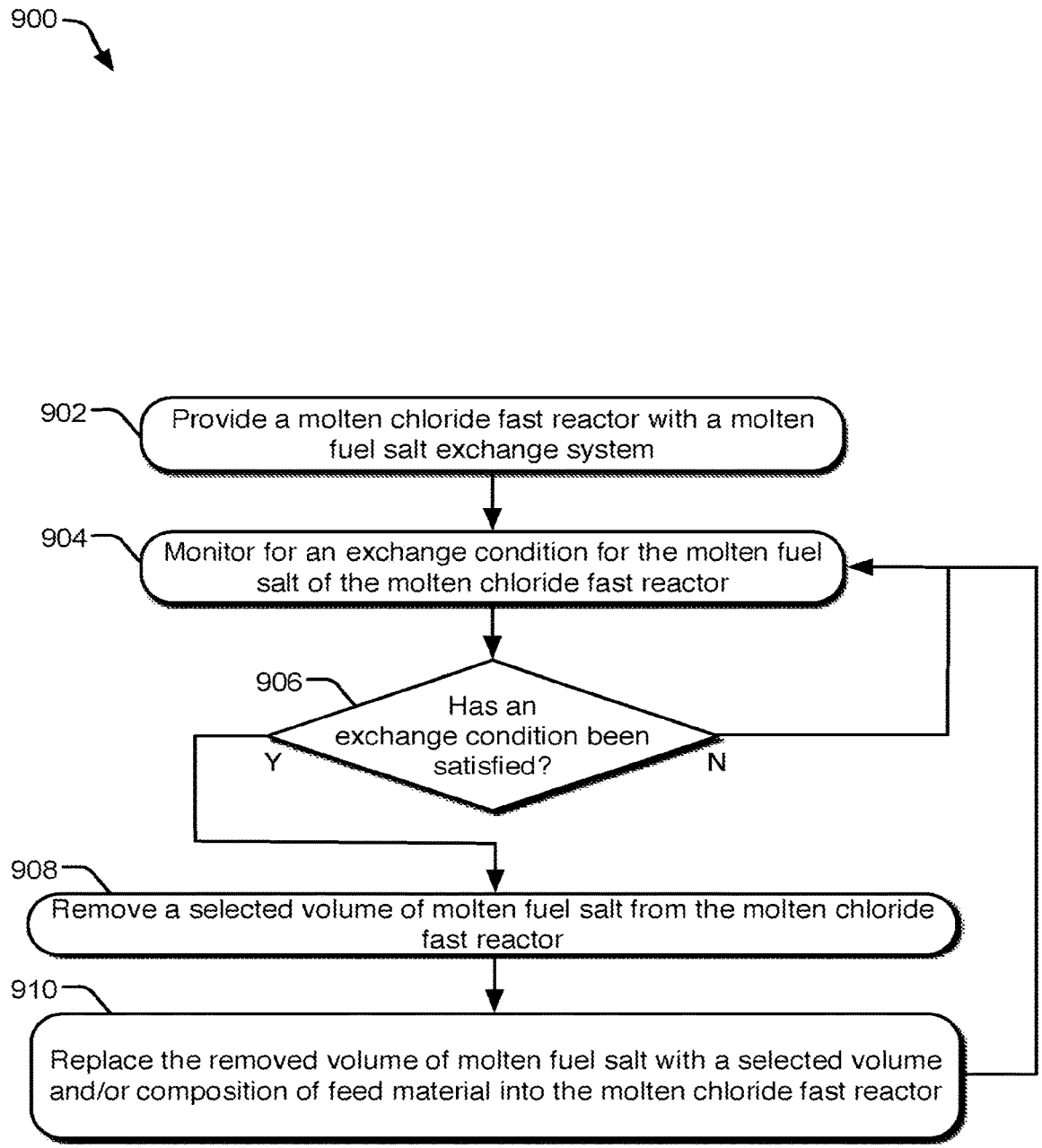
FIG. 9 illustrates example operations for a molten fuel salt exchange process.

FIG. 9 illustrates example operations 900 for a molten fuel salt exchange process. A system provisioning operation 902 provides a molten chloride fast reactor (which is an example molten salt reactor) with a molten fuel salt exchange system. A monitoring operation 904 monitors for an exchange condition for the molten fuel salt. For example, one or more reactivity parameter sensors may monitor the reactivity within the molten chloride fast reactor, and/or chemical composition sensors, such as Raman spectroscopy may monitor the composition of the molten fuel salt within the molten chloride fast reactor. In an implementation, the monitoring may be performed in real-time using Raman spectroscopy. Raman spectroscopy provides information about molecular vibrations that can be used for sample identification and quantitation. The technique involves shining a monochromatic light source (i.e. laser) on a sample and detecting the scattered light. Some amount of fuel may be removed from the reactor core, such as in a side stream, and passed through a monitoring cell that includes a 'window' through with the spectroscopy can be performed. Examples of Raman windows materials are fused quartz, fused silica, sapphire, diamond, and some glasses. Any material may be used as long as it can meet the operational parameters of the reactor and monitoring system. An exchange condition may be set for monitored reactivity, composition, or some other operating parameter to trigger a molten fuel salt exchange event.

If the exchange condition has not been satisfied, then a decision operation 906 returns processing to the monitoring operation 904. If the exchange condition has been satisfied, then the decision operation 906 progresses processing to a removal operation 908, which removes a selected volume of molten fuel salt from the molten chloride fast reactor. A replacement operation 910 replaces the removed volume of the molten fuel salt with a selected volume and/or composition of feed material into the molten chloride fast reactor. Processing returns to the monitoring operation 904.

Figure 10:
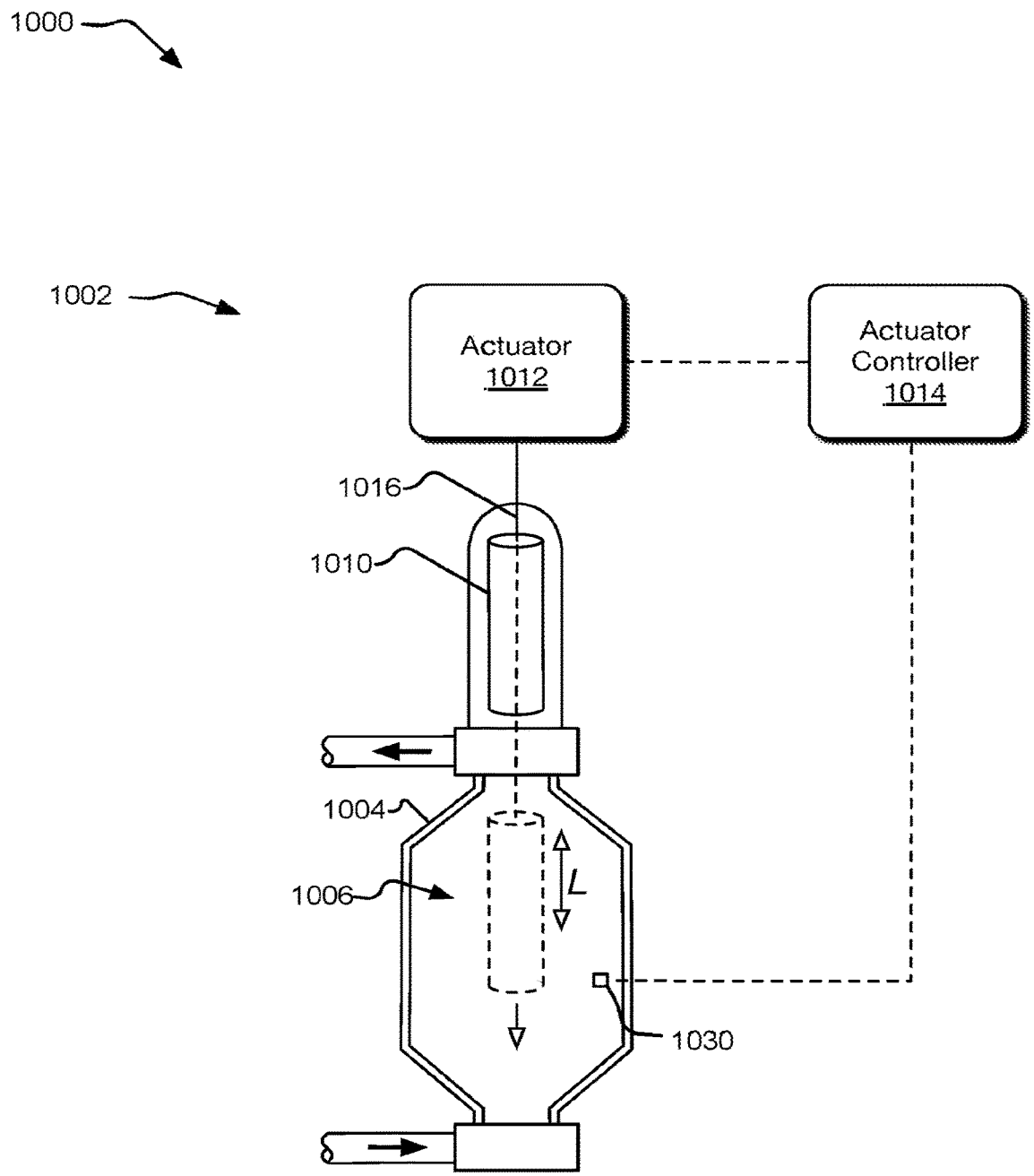
FIG. 10 illustrates a molten salt reactor equipped with a displacement element assembly.

FIG. 10 illustrates a molten salt reactor 1000 equipped with a volumetric displacement element assembly 1002. Volumetric displacement systems represent a type of molten fuel salt control system. In one implementation, the volumetric displacement assembly 1002 is operably coupled to the reactor core section 1004 containing a molten fuel salt 1006. The volumetric displacement assembly 1002 is arranged so as to selectively displace a volume of the molten fuel salt 1006. In this regard, the volumetric displacement assembly 1002 may displace a volume of the fuel salt 108 in order to control reactivity within the molten fuel salt 1006. The volumetric displacement element assembly 1002 may control reactivity of the molten salt reactor 1000 by controlling the volume of molten fuel salt 1006, and thus the fissile material, displaced in the reactor core section 1004 (e.g., center region of the core section). By way of a non-limiting example, in settings where the reactor core section 1004 possesses excess reactivity, a sufficient volume (e.g., 0.1 to 10.0 m³) of molten fuel salt 1006 may be displaced by the volumetric displacement assembly 1002 such that the reactivity decreases to a lower reactivity threshold, such as critical or sub-critical levels. It should be appreciated that multiple volumetric displacement assemblies may be used in various configurations within the molten salt reactor 1000.

In one implementation, the volumetric displacement assembly 1002 includes a volumetric displacement element 1010, an actuator 1012 and an actuator controller 206. In one implementation, the volumetric displacement element 1010 is formed from a non-neutron-absorbing material. In this regard, the volumetric displacement element 1010 controls reactivity in the molten salt reactor 1000 via the volumetric fluid displacement of the molten fuel salt 1006 (and fissile material) and not through a neutron absorption process. It is noted that the utilization of a non-neutron-absorbing material is particularly advantageous in the molten salt reactor 1000 as it avoids large impacts on reactivity, which may occur with the introduction of neutron-absorbing materials into the reactor core section 1004. A non-neutron-absorbing volumetric displacement element, which operates based on volumetric fluid displacement of the molten salt, may provide subtler reactivity control than neutron-absorbing control elements.

It should be understood, however, that the volumetric displacement element 1010 (e.g., displacement rod) may be formed from any non-neutron absorbing material, although neutron absorbing and/or moderating materials may additionally or alternatively be employed in such elements. As such, the volumetric displacement element 1010 may alternatively include a neutron transparent material or a neutron reflector material. For example, the volumetric displacement element 1010 may be formed, but is not required to be formed, from zirconium, steel, iron, graphite, beryllium, molybdenum, lead, tungsten, boron, cadmium, one or more molybdenum alloys (e.g., TZM alloy), one or more tungsten alloys (e.g., tungsten carbide), one or more tantalum alloys, one or more niobium alloys, one or more rhenium alloys, one or more nickel alloys, silicon carbide and the like. In such implementations, the volumetric displacement element 1010 may limit reactivity through the volumetric fluid displacement of fuel and through the absorption of neutrons.

In one implementation, the volumetric displacement element 1010 includes a rod 1016, as shown in FIG. 10. For example, the volumetric displacement element 1010 includes a solid rod or a hollow rod. It is noted herein that the displacement rod 1016 may take on any type of rod shape. For example, a displacement rod of the volumetric displacement assembly 1010 may take on a cylindrical shape, a square or rectangular prism shape, a triangular prism shape, a polygonal prism shape and the like. In another implementation, the volumetric displacement element 1010 may include a set of rods (not shown). For example, the set of rods may be arranged in an array or spoke pattern.

In one implementation, the actuator 1012 is operably coupled to the volumetric displacement element 1010, such that the actuator 1012 may selectively translate the volumetric displacement element 1012. The actuator 1012 may include any actuation device. For example, the actuator 1012 may include, but is not limited to, a displacement rod drive mechanism. In one implementation, the actuator 1012 is configured to drive the volumetric displacement element 1010 bidirectionally. In this regard, the actuator 1012 may drive the volumetric displacement element 1010 into and/or out of the reactor core section 1004 as desired. In another implementation, the actuator 1012 is configured to stop driving the volumetric displacement element 1010 at one or more intermediate positions between a first stop position and a second stop position. In this regard, the actuator 1012 may translate the volumetric displacement element 1010 along a selected direction (e.g., axial direction) so as to insert a selected amount of the volumetric displacement element 1010 into the molten fuel salt 1006 of the reactor core section 1004. For example, in the case of a rod-shaped volumetric displacement element 1010, the actuator 1012 may insert a selected volume of the volumetric displacement element 1010 by controlling the length L of the rod-shaped volumetric displacement element 1010 inserted into the molten fuel salt 1006.

It is noted that the volumetric displacement assembly 1002 may displace any amount of volume of the molten fuel salt 1006 within the reactor core section 1004 necessary to reduce the reactivity of the molten fuel salt 1006 within the reactor core section 1004 as desired. By way of non-limiting example, the volume of molten fuel salt 1006 within the reactor core section 1004 may range from 10 to 100 m$^3$, depending on the particular fuel formulation and operation context of the molten salt reactor 1000. In this setting, a displacement volume of only a fraction of a cubic meter may supply sufficient volumetric salt displacement to significantly reduce reactivity within the reactor core section 1004 and, in some cases, shutdown the reactor. For example, in marginal control or non-shutdown operations, the displacement volume imparted by the volumetric displacement element 1010 may include, but is not limited to, a displacement volume between 0.1 to 10 m$^3$.

In one implementation, as shown in FIG. 10, the volumetric displacement assembly 1010 may insert the volumetric displacement element 1010 into a central region of the reactor core section 1004. In this regard, the actuator 1012 may translate the volumetric displacement element 1010 along the axial direction of the reactor core section 1004, as shown in FIG. 10. It is noted that given a rotationally symmetric core section, as that depicted in FIG. 10, the greatest reactivity worth associated with the volumetric displacement element 1010 may be realized by positioning the volumetric displacement element 1010 at the cross-sectional center of the reactor core section 1004. It is noted that a centered volumetric displacement element 1010 is not a limitation on the molten salt reactor 1000 of the present disclosure and is provided merely for illustrative purposes. Moreover, although displacement element 1010 is shown in FIG. 10 as a single element, it is to be appreciated that the displacement element may include a plurality of insertable elements, which may move into and out of the reactor core in tandem or may be moved and controlled individually to manage reactivity, fuel flow, local temperature, etc.

In another implementation, the actuator controller 1010 is configured to selectively direct the actuator 1012 to insert a selected volume of the volumetric displacement element 1010 a selected distance into a volume of the molten fuel salt 1006 contained within the reactor core section 1004. For example, the actuator controller 1014 may direct the actuator 1012 to translate the volumetric displacement element 1010 such that the volumetric displacement element 1010 partially or entirely submerses in the molten fuel salt 1006. The actuator controller 1014 is communicatively coupled to the actuator 1012. For example, the actuator controller 1014 may be communicatively coupled to the actuator 1012 via a wireline connection (e.g., electrical cable or optical fiber) or wireless connection (e.g., RF transmission or optical transmission).

In one implementation, the actuator controller 1012 includes an operator interface configured to receive volumetric displacement actuation instructions from an operator. In this regard, an operator may selectively direct the control the actuation state of the volumetric displacement element 1010. In another implementation, the actuation controller 1014 may automatically direct the actuation of the volumetric displacement element 1010 in response to one or more sensed or monitored parameters of the molten salt reactor 1000, as discussed below.

In another implementation, the molten salt reactor 1000 includes a reactivity parameter sensor 1030. The reactivity parameter sensor 1030 includes any one or more sensors capable of measuring or monitoring one or more parameters indicative of reactivity or a change in reactivity of the molten fuel salt 1006 of the molten salt reactor 1000. For example, the reactivity parameter sensor 1030 may include, but is not limited to, any one or more sensors capable of sensing and/or monitoring one or more of neutron fluence, neutron flux, neutron fissions, fission products, radioactive decay events, temperature, pressure, power, isotropic concentration, burn-up and/or neutron spectrum.

In one implementation, the reactivity parameter sensor 1030 includes a fission detector. For example, the reactivity parameter sensor 1030 may include, but is not limited to, a micro-pocket fission detector. In another implementation, the reactivity parameter sensor 1030 includes a neutron flux monitor. For example, the reactivity parameter sensor 1030 may include, but is not limited to, a fission chamber or an ion chamber. In another implementation, the reactivity parameter sensor 1030 includes a neutron fluence sensor. For example, the reactivity parameter sensor 1030 may include, but is not limited to, an integrating diamond sensor. In another implementation, the reactivity parameter sensor 1030 includes a fission product sensor. For example, the reactivity parameter sensor 1030 may include, but is not limited to, a gas detector, a β detector or a γ detector. In another implementation, the reactivity parameter sensor 1030 includes a fission product detector configured to measure a ratio of isotope types in a fission product gas.

In another implementation, the reactivity parameter sensor 1030 includes a temperature sensor. In another implementation, the reactivity parameter sensor 1030 includes a pressure sensor. In another example, the reactivity parameter sensor 1030 includes a power sensor. For example, the reactivity parameter sensor 1030 may include, but is not limited to, a power range nuclear instrument.

In another implementation, the reactivity is determined with one or more of the measured reactivity parameters (discussed above). In one implementation, the reactivity of the reactor core section 1004 is determined by the actuator controller 1012 using a look-up table. For example, measured values for temperature, pressure, power level and the like may be used in conjunction with one or more look up tables to determine the reactivity of the reactor core section 1004. In another implementation, the reactivity of the reactor core section 1004 is determined by the actuator controller 1014 using one or more models. For example, the one or more models may include, but are not limited to, a neutronics modeling software package executed by the one or more processors of the actuator controller 1014. For instance, a suitable neutronics software package may include, but is not limited to, MCNP, CINDER, REBUS and the like. In another implementation, the reactivity parameter may be determined by an operator and entered directly into the actuator controller 1014 via an operator interface.

It is noted herein that, while the reactivity parameter sensor 1030 is depicted as being located within the molten fuel salt 1006 in the reactor core section 1004 of the molten salt reactor 1000, this configuration is not a limitation on the present implementation and is provided merely for illustrative purposes. Rather, it is noted that one or more reactivity parameter sensors 1030 may be located at various positions of the molten salt reactor 1000 including, but not limited to, at a position within the reactor core section, at a position external to the reactor core section 1004 (e.g., at external surface of reactor core section 1004), in or along one or more pipes of a primary coolant system, in or near a primary heat exchanger, in or along one or more pipes of a secondary coolant system and the like.

In another implementation, the one or more reactivity parameter sensors 1030 are communicatively coupled to actuator controller 1014. The one or more reactivity parameter sensors 1030 are communicatively coupled to the actuator controller 1014. For example, the one or more reactivity parameter sensors 1030 may be communicatively coupled to the actuator controller 1014 via a wireline connection (e.g., electrical cable or optical fiber) or wireless connection (e.g., RF transmission or optical transmission).

In one implementation, the actuation controller 1014 may direct the actuator 1012 to adjust the position of the volumetric displacement element 1010 (and, thus, the reactivity of the molten fuel salt 1006) based on the measured reactivity parameter.

In one implementation, the actuation controller 1014 includes one or more processing units and memory. In one implementation, the memory maintains one or more sets of program instructions configured to carry out one or more operational steps of the volumetric displacement assembly 1010. In one implementation, the one or more program instructions of the actuation controller 1014 may cause the actuator controller 1014 to direct the actuator 1012 to drive the volumetric displacement assembly 1010 into the reactor core section 1004 to displace a selected volume of the molten fuel salt 1006 within the reactor core section 1004.

In another implementation, the one or more program instructions are configured to correlate a determined reactivity of the reactor core section 1004 with a displacement volume necessary to compensate for the measured reactivity of the reactor core section 1004. For example, as discussed above, the reactivity parameter sensor 1030 may acquire a reactivity parameter associated with the molten fuel salt 1006 within the reactivity core section 1004. In settings where the reactivity parameter is indicative of a reactivity larger than a selected tolerance level, the actuator controller 1014 may determine the displacement volume to compensate for the elevated reactivity and direct the actuator 1012 to insert enough of the volumetric displacement element 1010 to achieve at least this level of volumetric salt displacement. In another implementation, in settings where complete reactor shutdown is required, the actuator controller 1014 may direct the actuator 1012 to insert the entire volumetric displacement element 1010 into the reactor core section 1004 in order to achieve maximum volumetric salt displacement.

Figure 11:
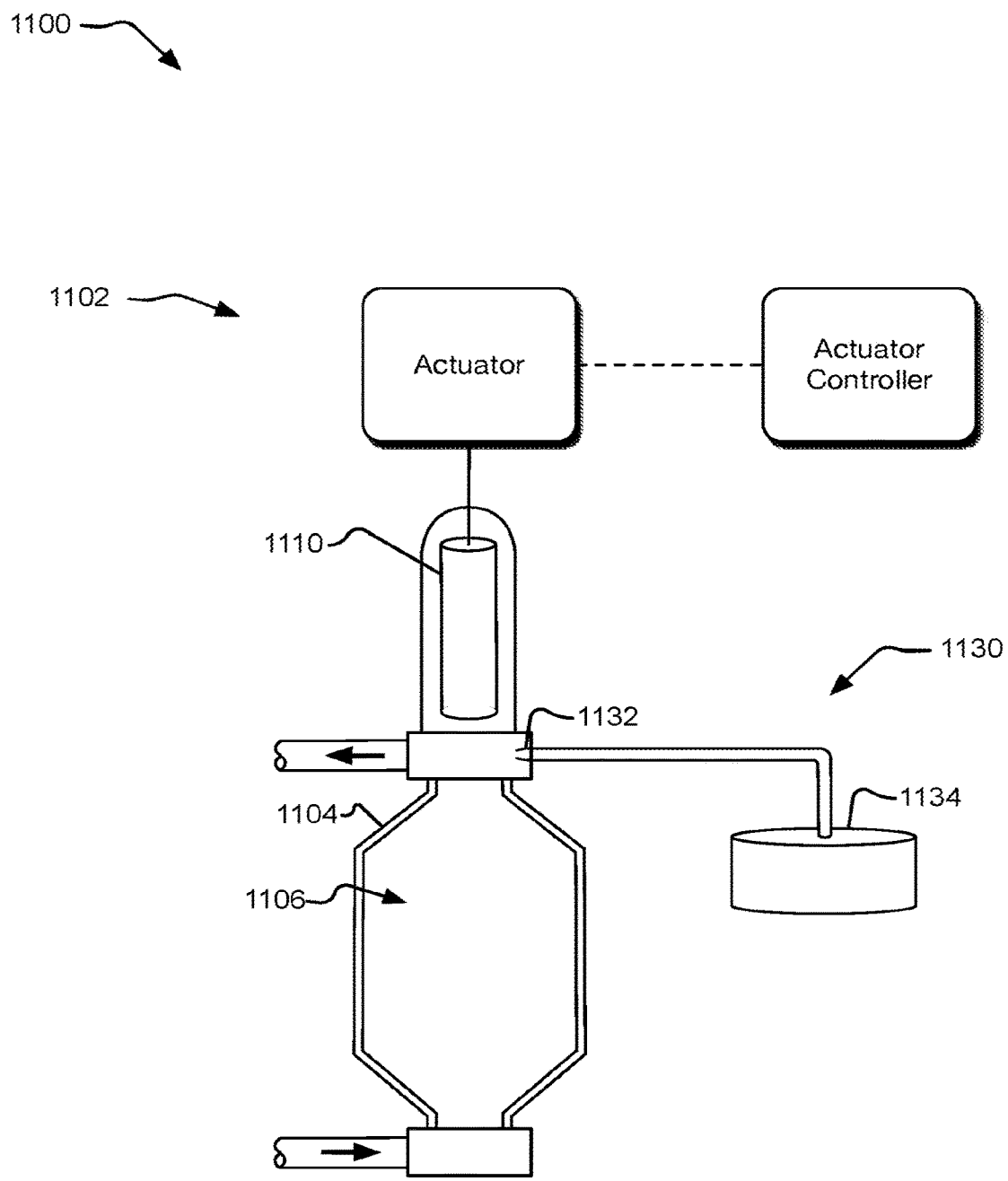
FIG. 11 illustrates a molten salt reactor equipped with a displacement element assembly and a molten fuel salt spill-over system with a displacement element not submerged in molten fuel salt.
Figure 12:
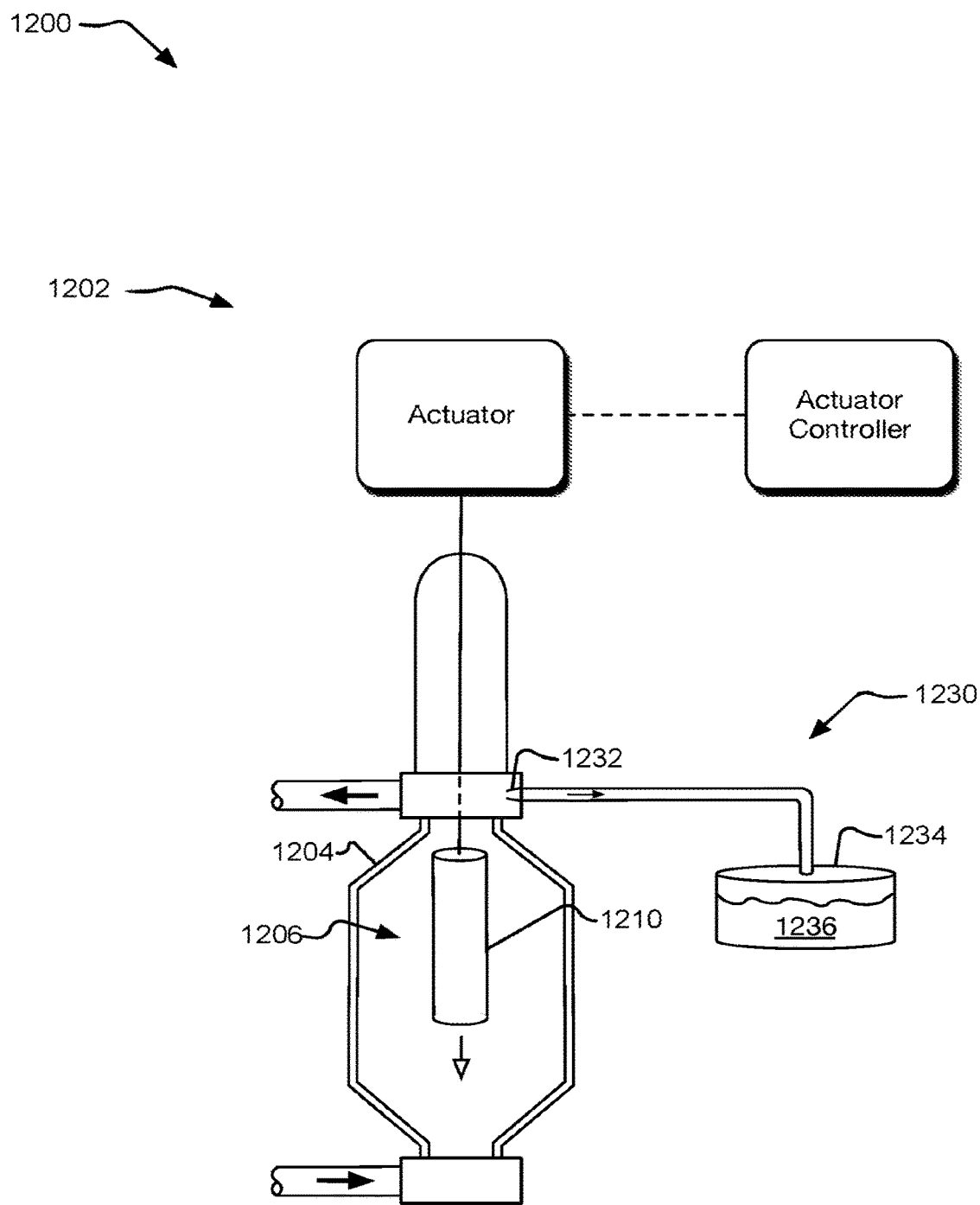
FIG. 12 illustrates a molten salt reactor equipped with a displacement element assembly and a molten fuel salt spill-over system with a displacement element submerged in molten fuel salt.

FIG. 11 illustrates a molten salt reactor 1100 equipped with a volumetric displacement element assembly 1102 and a molten fuel salt spill-over system 1130 with a volumetric displacement element 1110 not submerged in molten fuel salt. In one implementation, the molten fuel salt spill-over system 1130 includes one or more fuel salt uptakes 1132 and one or more spill-over reservoirs 1134. It is noted that in some cases the volumetric displacement of the molten fuel salt 1106 by the volumetric displacement element 1110 may cause a rise in the fuel salt level above a desired level. In one implementation, the molten fuel salt spill-over system 1130 is configured to transport molten fuel salt 1106 that is displaced above the maximum tolerated fill level of the reactor core section 1104, as shown in FIG. 12. By way of non-limiting example, the fuel salt uptake 1132 may be placed approximately 10 cm above a nominal fuel salt level. In this regard, when the volumetric displacement element 1110 is engaged, it may, in some cases, cause the molten fuel salt level to rise above normal salt level. Molten salt that reaches the fuel salt uptake 1132 is then transported to the spill-over reservoir 1134. It should be appreciated that multiple volumetric displacement assemblies may be used in various configurations within the molten salt reactor 1100.

FIG. 12 illustrates a molten salt reactor 1200 equipped with a volumetric displacement element assembly 1202 and a molten fuel salt spill-over system 1230 with a volumetric displacement element 1210 submerged in molten fuel salt. While the molten fuel salt spill-over system 1230 depicted of FIG. 12 is depicted in the context of the volumetric displacement element assembly 1202 and volumetric displacement element 1210, this is not a requirement on the molten fuel salt spill-over system 1230. In this regard, the molten fuel salt spill-over system 1230 of the present disclosure may be implemented in a context that does not include the volumetric displacement assembly 1202 and volumetric displacement element 1202. In one implementation, the molten fuel salt spill-over system 1230 may be implemented in order to account for thermal expansion of the molten fuel salt 1206. By way of non-limiting example, in the case where the fuel salt uptake 1232 is place at 10 cm above the normal salt level a mere 50° C. increase in temperature of the fuel salt 108 may cause the molten fuel salt 1206 to reach the fuel salt uptake 1232. By way of another non-limiting example, approximate increase of 200° C. in temperature of the molten fuel salt 1206 may cause the molten fuel salt 1206 to spill over through the fuel salt uptake 1232 and lead to 1-5 m³ of fuel salt to spill into one or more spill-over reservoirs 1234. Spilled-over fuel salt 1236 is shown in the one or more spill-over reservoirs 1234.

It is recognized herein that the combination of very low excess reactivity and the strong thermal feedback of the molten fuel salt 1206 may allow for nearly passive operation. In this sense, use of the displacement element 1210 may be limited. As the demand on the turbine (not shown) of the nuclear reactor plant varies, the temperature(s) associated with the primary cooling loop will vary slightly. This, in turn, will vary the temperature of the molten fuel salt 1206. As a result, the molten fuel salt 1206 will obtain a new average temperature, and thus, density, causing the fluid level of the molten fuel salt 1206 to increase or decrease.

By way of non-limiting example, in the event that demand for electricity increase, the steam of the turbine comes out at a reduced temperature. As a result, temperatures throughout the nuclear reactor system are reduced, causing the molten fuel salt 1206 to decrease in temperature and increase in density. This increase in density results in an increase in reactivity. In addition, the fluid level of the molten fuel salt 1206 is decreases, while increased reactivity causes the power of the molten salt reactor 1200 to increase, thereby meeting the increased demand on the turbine. In turn, increase in power causes the temperature of the molten fuel salt 1206 to increase and the fluid level of the molten fuel salt 1206 to return to (or near) its original level.

It is further recognized that, in the event of a loss of heat sink or a turbine trip, temperatures throughout the molten salt reactor 1200 would increase. As a result of increased temperatures in the molten fuel salt 1206, the molten fuel salt 1206 would decrease in density, causing the molten fuel salt 1206 to become less reactive. The decrease in density would cause the fluid level to rise and, in some instances (e.g., +50° C. temperature rise) the fluid level of the molten fuel salt 1206 reach the level of the fuel salt uptake 208. Such a rise in fluid level may then cause some molten fuel salt 1206 to spill over into the one or more spill-over reservoirs 1234, which would serve to further reduce reactivity in the reactor core section 1204. As a result, the molten salt reactor 1200 may go into a sub-critical state and remain in that state, even upon cooling. In another implementation, the molten fuel salt spill-over system 1230 may include a return pathway (e.g., one or more pipes, one or more pumps and one or more valves), where fuel salt stored in the one or more spill-over reservoirs 1234 may be actively pumped out of the one or more spill-over reservoirs 1234 and back into the reactor core section 1204 in order to reestablish a critical state.

In another implementation, the displacement element 1210 may be used to accelerate the above process as well as control or shape changes in reactivity/density/temperature during normal operation. It should also be understood that various structural modifications to the displacement element 1210 may be employed to enhance control performance and manage influence that molten fuel salt turbulence may have on the placement and stability of the displacement element 1210 within the reactor core section 1204. Such structural modifications may include without limitation different shapes, sizes, and numbers of displacement elements 1210, dynamic shape change features in displacement element 1210, baffles and/or nozzles in the displacement element 1210, and other flow-friendly features to the displacement element 1210. It should be appreciated that multiple volumetric displacement assemblies may be used in various configurations within the reactor core section 1204.

Figure 13:
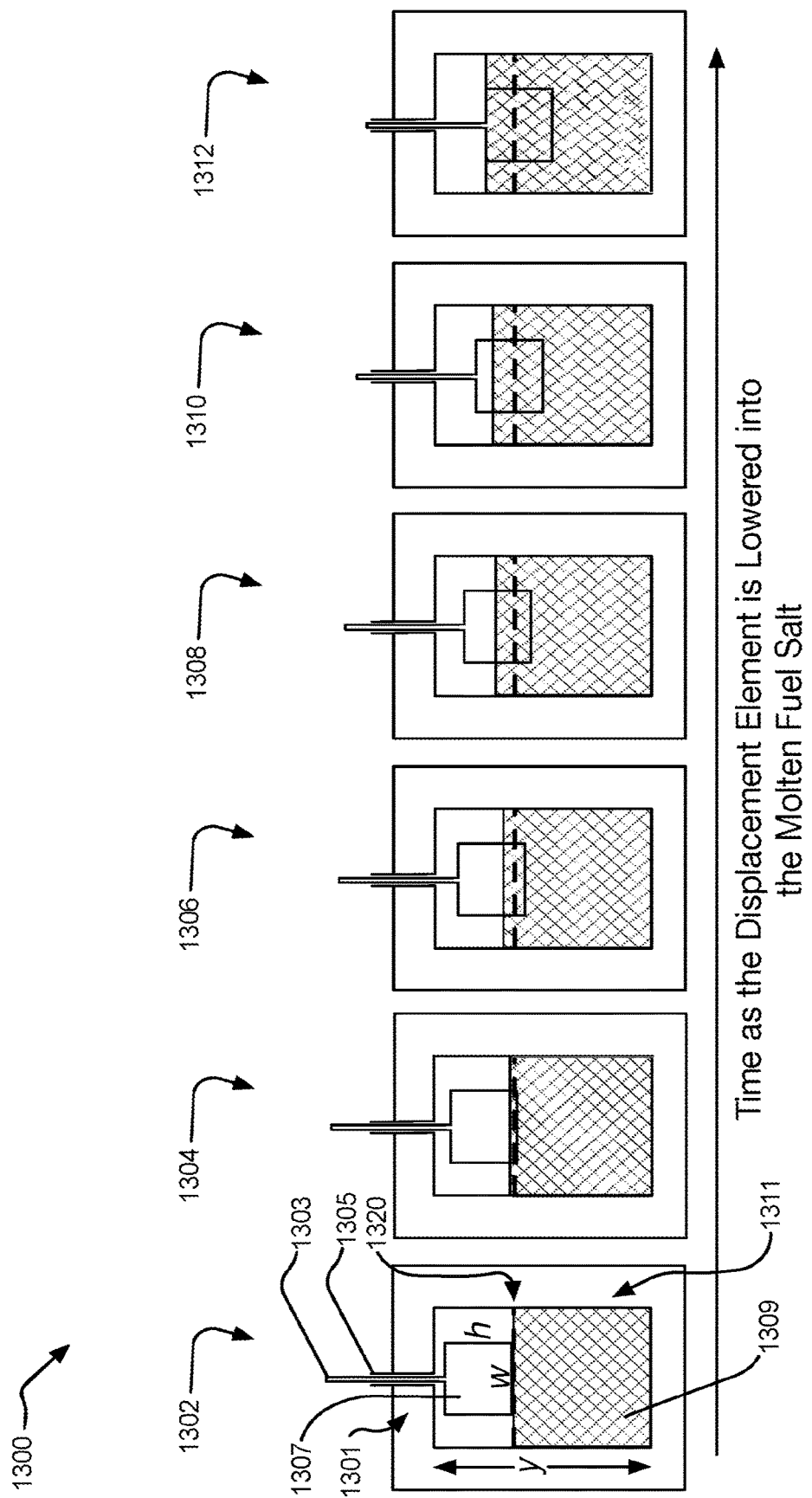
FIG. 13 illustrates various example stages of a fuel displacement cycle.

FIG. 13 illustrates various example stages of a fuel displacement cycle 1300. In stage 1302, the displacement element 1301 includes a hollow or solid displacement rod 1303 inserted through rod inlet 1305 and a displacement body 1307 having a width w that is wider than both the displacement rod 1303 and the rod inlet 1305 and a height h that is less than the height y of the reactor core section 1311. As a result, the maximum volume of displacement can be vertically selected/located within the reactor core section 1311 by raising or lowering the displacement body 1307 to a desired height in the molten fuel salt 1309 within the reactor core section 1311. The dashed line 1320 indicates the molten fuel salt level when the displacement element has not yet been lowered into the molten fuel salt 1309.

It should be understood that the displacement rod 1303 and/or the displacement body 1307 may be formed of or filled with various materials, including non-neutron absorbing materials and neutron absorbing materials.

In stage 1302, the displacement element has been partially lowered into the molten fuel salt, resulting in a raising of the molten fuel salt level. The subsequent stages 1304, 1306, 1308, 1310, and 1312 show progressively lower insertions of the displacement body 1307 into the molten fuel salt 1309, resulting in increasingly higher levels of the molten fuel salt 1309, although such increasing levels of molten fuel salt 1309 may be mitigated by a spill-over system. Stage 1312 illustrates a fully immersed displacement body 1307.

By displacing the volume of molten fuel salt 1309 at a particular location within the reactor core section, the reactivity within the reactor core section 1311 can be controlled. Even after the displacement body 1307 is fully immersed within the molten fuel salt 1309, the vertical location within the reactor core section 1311 can further influence the reactivity (e.g., the lower the displacement body 1307, the more negative influence on reactivity) in the illustrated implementations. See FIG. 14 and the associated discussion.

It should be appreciated that multiple volumetric displacement assemblies may be used in various configurations within the reactor core section 1311.

Figure 14:
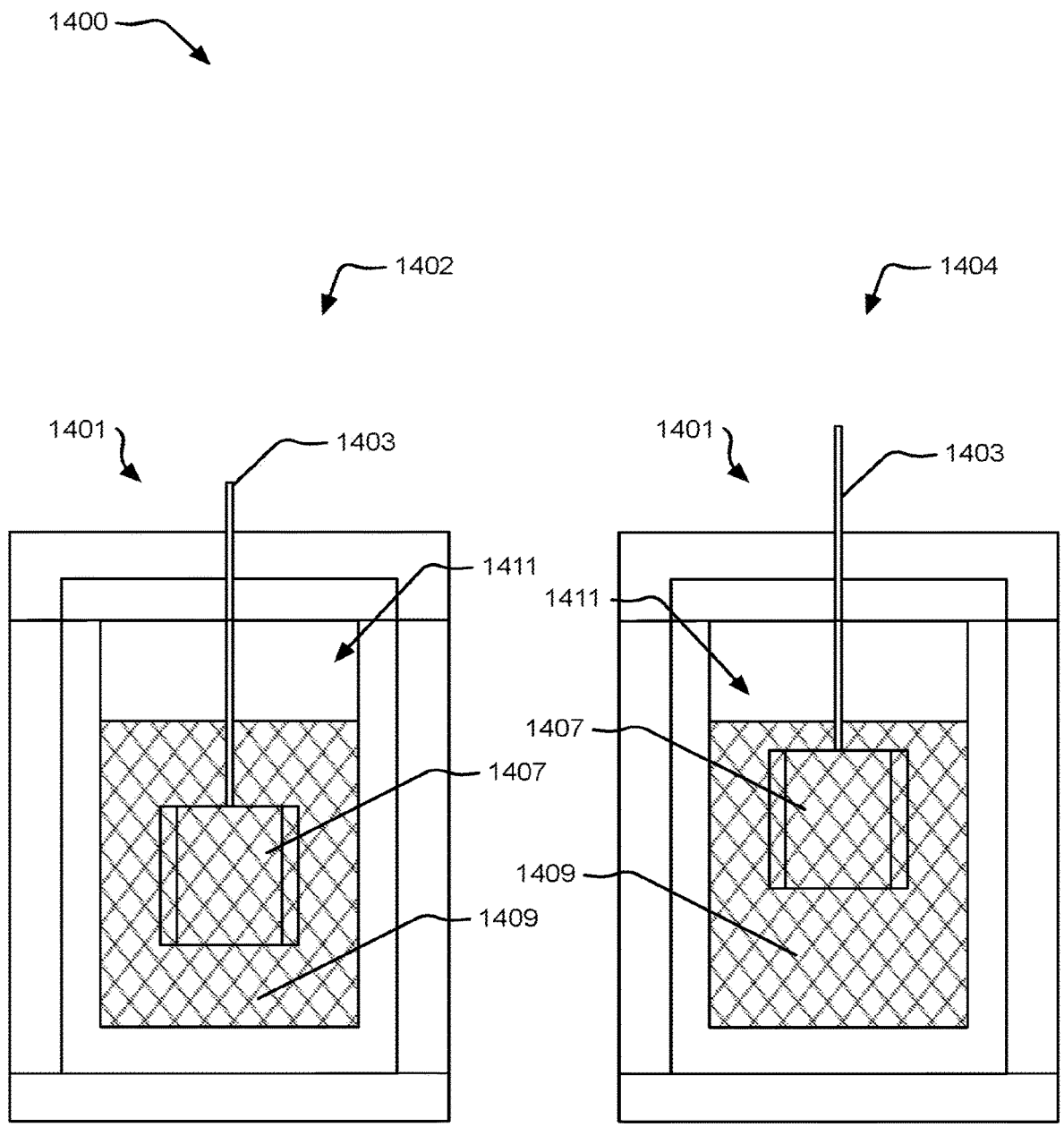
FIG. 14 illustrates two example stages of a fuel displacement cycle.

FIG. 14 illustrates two example stages 1402 and 1404 of a fuel displacement cycle 1400. In stage 1402, the displacement element 1401 includes a hollow or solid displacement rod 1403 and a displacement body 1407 inserted deep into molten fuel salt 1409 within a reactor core section 1411. In stage 1404, the displacement body 1407 inserted less deeply into the molten fuel salt 1409 within the reactor core section 1411. As a result, the maximum volume of displacement can be vertically selected/located within the reactor core section 1411 by raising or lowering the displacement body 1407 to a desired height in the molten fuel salt 1409 within the reactor core section 1411. It should be understood that the displacement rod 1403 and/or the displacement body 1407 may be formed of or filled with various materials, including non-neutron absorbing materials and neutron absorbing materials. Accordingly, in one implementation, the reactivity control may be characterized as more negative in the stage 1402 than in the stage 1404 because the displacement body 1407 is inserted more deeply into the reactor core section 1411, displaying more fuel at an input region of the reactor core section 1411, where the molten fuel salt 1409 first enters the active fission reaction region at each circulation cycle.

It should be appreciated that multiple volumetric displacement assemblies may be used in various configurations within the reactor core section 1411.

Figure 15:
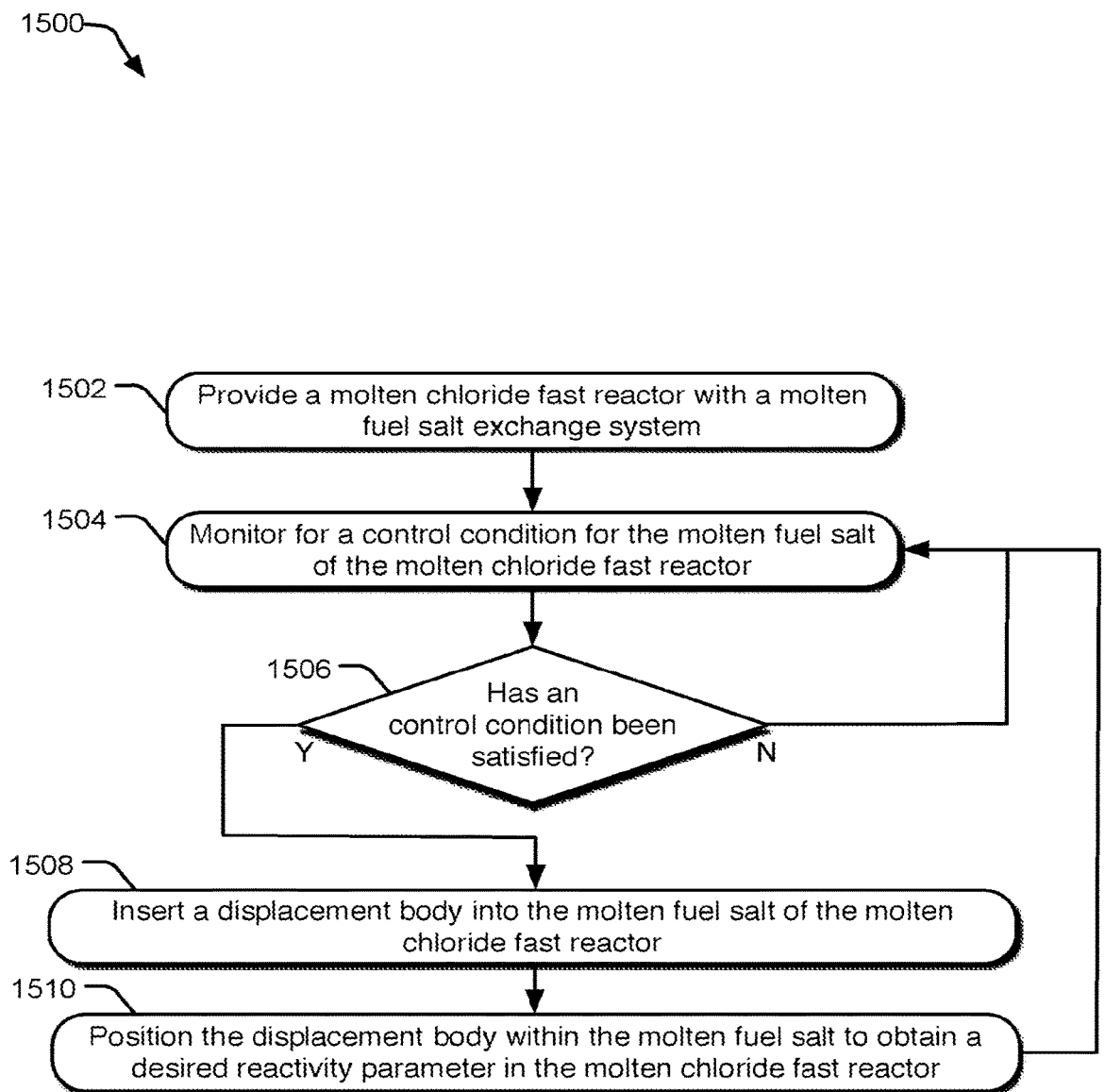
FIG. 15 illustrates example operations for a molten fuel salt displacement process.

FIG. 15 illustrates example operations 1500 for a molten fuel salt displacement process. A system provisioning operation 1502 provides a molten chloride fast reactor (which is an example molten salt reactor) with a molten fuel salt exchange system. A monitoring operation 1504 monitors for a control condition for the molten fuel salt (e.g., k-effective meets or exceeds a threshold, such as 1.005). For example, one or more reactivity parameter sensors may monitor the reactivity within the molten chloride fast reactor. The control condition may be set for monitored reactivity or some other operating parameter to trigger a molten fuel salt displacement event.

If the control condition has not been satisfied, then a decision operation 1506 returns processing to the monitoring operation 1504. If the control condition has been satisfied, then the decision operation 1506 progresses processing to an insertion operation 1508, which inserts a displacement body into molten fuel salt within a reactor core section. A positioning operation 1510 positions the displacement body into the molten fuel salt of the molten chloride fast reactor to remove a selected volume of molten fuel salt from the reactor core section to obtain desired reactivity parameters in the molten chloride fast reactor. Processing returns to the monitoring operation 1504.

In one implementation, an example molten salt reactor includes a nuclear reactor core configured to contain a nuclear fission reaction fueled by a molten fuel salt. A molten fuel salt control system is coupled to the nuclear reactor core and is configured to remove a selected volume of the molten fuel salt from the nuclear reactor core to maintain a parameter indicative of reactivity of the molten salt reactor within a selected range of nominal reactivity.

Another example molten salt reactor of any preceding reactor provides a molten fuel salt control system that includes a molten fuel salt exchange system fluidically coupled to the nuclear reactor core and configured to exchange a selected volume of the molten fuel salt with a selected volume of a feed material containing a mixture of a selected fertile material and a carrier salt.

Another example molten salt reactor of any preceding reactor provides a molten fuel salt exchange system that includes a feed-fuel supply unit configured to transfer the feed material into the nuclear reactor core.

Another example molten salt reactor of any preceding reactor provides a molten fuel salt exchange system that a feed-fuel supply unit configured to transfer a selected volume of the feed material into the nuclear reactor core.

Another example molten salt reactor of any preceding reactor provides a molten fuel salt exchange system that the molten fuel salt exchange system that includes a feed-fuel supply unit configured to transfer a selected composition of the feed material into the nuclear reactor core.

Another example molten salt reactor of any preceding reactor provides a molten fuel salt exchange system that includes a used-fuel transfer unit configured to transfer the selected volume of the molten fuel salt as used-fuel from the nuclear reactor core.

Another example molten salt reactor of any preceding reactor provides a molten fuel salt exchange system that is configured to transfer concurrently the selected volume of the molten fuel salt from the nuclear reactor core and the feed material into the nuclear reactor core.

Another example molten salt reactor of any preceding reactor provides a molten fuel salt exchange system that controls reactivity of the nuclear fission reaction by exchanging the feed material with the selected volume of the molten fuel salt in the nuclear reactor core.

Another example molten salt reactor of any preceding reactor provides a molten fuel salt exchange system that controls composition of the molten fuel salt in the nuclear fission reaction by exchanging the feed material with the selected volume of the molten fuel salt in the nuclear reactor core.

Another example molten salt reactor of any preceding reactor provides a fast spectrum fission reactor and the molten fuel salt includes a chloride salt.

Another example molten salt reactor of any preceding reactor provides a molten fuel salt exchange system controls a composition of UCl3-UCl4-NaCl in the spectrum fission reaction by exchanging the feed material with the selected volume of the molten fuel salt in the nuclear reactor core.

Another example molten salt reactor of any preceding reactor provides a molten fuel salt exchange system is configured to exchange repeatedly a selected volume of the molten fuel salt with a selected volume of the feed material to maintain the parameter indicative of reactivity of the molten salt reactor within a selected range of nominal reactivity over time.

Another example molten salt reactor of any preceding reactor further includes a reactivity parameter sensor positioned proximate the nuclear reactor core. The nuclear parameter sensor is configured to monitor one or more parameters indicative of reactivity of the nuclear reactor core. A controller communicatively couples to the reactivity parameter sensor to receive the one or more parameters indicative of reactivity of the nuclear reactor core. The controller is configured to control exchange of the selected volume of the molten fuel salt with the selected volume of a feed material containing a mixture of a selected fertile material and a carrier salt based on the one or more parameters.

Another example molten salt reactor of any preceding reactor provides the molten fuel salt control system to further include a volumetric displacement control system having one or more volumetric displacement assemblies insertable into the nuclear reactor core. Each volumetric displacement assembly is configured to volumetrically displace a selected volume molten fuel salt from the nuclear reactor core when inserted into the nuclear reactor core.

Another example molten salt reactor of any preceding reactor provides the molten fuel salt control system to further include a volumetric displacement control system having one or more volumetric displacement bodies insertable into the nuclear reactor core, each volumetric displacement body being configured to volumetrically displace a selected volume of molten fuel salt from the nuclear reactor core when inserted into the nuclear reactor core.

Another example molten salt reactor of any preceding reactor provides the molten fuel salt control system to further include a volumetric displacement control system having one or more volumetric displacement bodies insertable into the nuclear reactor core, each volumetric displacement body being configured to volumetrically displace a selected volume of molten fuel salt from the nuclear reactor core when inserted into the nuclear reactor core, the volumetric displacement control system further having molten fuel salt spill-over system configured to transport molten fuel salt that is displaced by the volumetric displacement body above a tolerated fill level of the nuclear reactor core.

Another example molten salt reactor of any preceding reactor provides the molten fuel salt control system to further include a volumetric displacement control system having one or more volumetric displacement bodies insertable into the nuclear reactor core, each volumetric displacement body being configured to volumetrically displace a selected volume of molten fuel salt from the nuclear reactor core when inserted into the nuclear reactor core, the volumetric displacement control system being insertable at multiple insertion depths into the nuclear reactor core to maintain the parameter indicative of reactivity of the molten salt reactor within a selected range of nominal reactivity over time.

Another molten salt nuclear reactor includes a nuclear reactor core configured to sustain a nuclear fission reaction fueled by a molten fuel salt and means for exchanging a selected volume of the molten fuel salt with a selected volume of a feed material containing a mixture of a selected fertile material and a carrier salt.

Another molten salt nuclear reactor includes a nuclear reactor core configured to sustain a nuclear fission reaction fueled by a molten fuel salt and means for removing a selected volume of the molten fuel salt from the nuclear reactor core to maintain a parameter indicative of reactivity of the molten salt reactor within a selected range of nominal reactivity.

An example method includes sustaining a nuclear fission reaction fueled by a molten fuel salt within a nuclear reactor core and removing a selected volume of the molten fuel salt from the nuclear reactor core to maintain a parameter indicative of reactivity of the molten salt reactor within a selected range of nominal reactivity.

Another example method of any preceding method further includes replacing the selected volume of the molten fuel salt with a selected volume of a feed material containing a mixture of a selected fertile material and a carrier salt.

Another example method of any preceding method wherein the replacing operation includes transferring the feed material into the nuclear reactor core.

Another example method of any preceding method wherein the replacing operation includes transferring a selected volume of the feed material into the nuclear reactor core.

Another example method of any preceding method wherein the replacing operation includes transferring a selected composition of the feed material into the nuclear reactor core.

Another example method of any preceding method wherein the replacing operation includes controlling the reactivity of the nuclear reactor core based on the selected volume of the feed material.

Another example method of any preceding method wherein the replacing operation includes controlling the composition of the molten fuel salt fueling the nuclear fission reaction within the nuclear reactor core based on the selected composition of the feed material.

Another example method of any preceding method wherein the replacing operation includes controlling the composition of the $UCl_3$-$UCl_4$-$NaCl$ fueling the nuclear fission reaction within the nuclear reactor core based on the selected composition of the feed material.

Another example method of any preceding method wherein the method further includes monitoring satisfaction of an exchange condition by the molten fuel salt and controlling exchange of the selected volume of the molten fuel salt with the selected volume of a feed material containing a mixture of a selected fertile material and a carrier salt responsive to satisfaction of the exchange condition.

Another example method of any preceding method wherein the method further includes monitoring one or more reactivity parameters indicative of reactivity of the nuclear reactor core and controlling exchange of the selected volume of the molten fuel salt with the selected volume of a feed material containing a mixture of a selected fertile material and a carrier salt based on the one or more reactivity parameters.

Another example method of any preceding method wherein the method further includes monitoring one or more composition parameters indicative of composition of the molten fuel salt of the nuclear reactor core and controlling exchange of the selected volume of the molten fuel salt with the selected volume of a feed material containing a mixture of a selected fertile material and a carrier salt based on the one or more composition parameters.

Another example method of any preceding method wherein the removing operation includes volumetrically displacing the selected volume molten fuel salt from the nuclear reactor core by inserting one or more volumetric displacement bodies into molten fuel salt within the nuclear reactor core.

Another example method of any preceding method wherein the removing operation includes transporting the volumetrically displaced volume of molten fuel salt from the nuclear reactor core via a molten fuel salt spill-over system when the volumetrically displaced volume of molten fuel salt is displaced by the volumetric displacement body above a tolerated fill level of the nuclear reactor core.

Another example method of any preceding method provides a method wherein each volumetric displacement body is configured to volumetrically displace a selected volume of molten fuel salt from the nuclear reactor core when inserted into the nuclear reactor core, the volumetric displacement control system being insertable at multiple insertion depths into the nuclear reactor core to maintain the parameter indicative of reactivity of the molten salt reactor within a selected range of nominal reactivity over time.

An example fast spectrum molten salt nuclear reactor includes a reactor core section including a fuel input and a fuel output, the fuel input and the fuel output arranged to flow a molten chloride salt nuclear fuel through the reactor core section. The molten chloride salt nuclear fuel including a mixture of $UCl_4$ and at least one of an additional uranium chloride salt or an additional metal chloride salt, the mixture of $UCl_4$ and at least one additional metal chloride salt having a $UCl_4$ content greater than 5% by molar fraction.

Another example fast spectrum molten salt nuclear reactor of any preceding reactor provides the uranium concentration in the mixture of $UCl_4$ and at least one additional metal chloride salt is greater than 61% by weight.

Another example fast spectrum molten salt nuclear reactor of any preceding reactor provides the additional uranium chloride salt including $UCl_3$.

Another example fast spectrum molten salt nuclear reactor of any preceding reactor provides the mixture of $UCl_4$ and at least one of an additional uranium chloride salt or an additional metal chloride salt has a composition of $82UCl_4$-$18UCl_3$.

Another example fast spectrum molten salt nuclear reactor of any preceding reactor provides the mixture of $UCl_4$ and at least one of an additional uranium chloride salt or an additional metal chloride salt has a composition of $17UCl_3$-$71UCl_4$-$12NaCl$.

Another example fast spectrum molten salt nuclear reactor of any preceding reactor provides the mixture of $UCl_4$ and at least one of an additional uranium chloride salt or an additional metal chloride salt has a composition of 50 $UCl_4$-$50NaCl$.

Another example fast spectrum molten salt nuclear reactor of any preceding reactor provides the additional metal chloride including at least one of $NaCl$, $MgCl_2$, $CaCl_2$, $BaCl_2$, $KCl$, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example fast spectrum molten salt nuclear reactor of any preceding reactor provides the mixture of $UCl_4$ and at least one of an additional uranium chloride salt or an additional metal chloride salt has an additional metal chloride salt concentration at or below the precipitation concentration for the an additional metal chloride salt.

Another example fast spectrum molten salt nuclear reactor of any preceding reactor provides the mixture of $UCl_4$ and at least one of an additional uranium chloride salt or an additional metal chloride salt having a melting temperature below a temperature of 800 degrees Celsius.

Another example fast spectrum molten salt nuclear reactor of any preceding reactor provides the mixture of $UCl_4$ and at least one of an additional uranium chloride salt or an additional metal chloride salt having the selected melting temperature above a temperature of 330 degrees Celsius.

Another example fast spectrum molten salt nuclear reactor of any preceding reactor provides breed-and-burn behavior established within the molten chloride salt nuclear fuel with a uranium-plutonium cycle.

Another example fast spectrum molten salt nuclear reactor of any preceding reactor provides the fuel input located on a first side of the reactor core section and the fuel output located on a second side of the reactor core section opposite to the fuel input.

Another example fast spectrum molten salt nuclear reactor of any preceding reactor provides a protective layer disposed on at least one surface facing the molten chloride salt nuclear fuel.

Another example fast spectrum molten salt nuclear reactor of any preceding reactor provides that the at least one surface exposed to the molten chloride salt nuclear includes an internal surface of the reactor core section.

Another example fast spectrum molten salt nuclear reactor of any preceding reactor provides the protective layer that is substantially resistant to at least one of corrosion or radiation.

Another example fast spectrum molten salt nuclear reactor of any preceding reactor provides the protective layer including at least one of a refractory alloy, a nickel alloy, a refractory metal or silicon carbide.

Another example fast spectrum molten salt nuclear reactor of any preceding reactor includes a reflector assembly configured to reflect at least a portion of neutrons emanating from the reactor core section back to the molten chloride salt nuclear fuel within the reactor core section, the reflector assembly including a plurality of reflector modules, at least some of the reflector modules containing a liquid reflector material.

Another example fast spectrum molten salt nuclear reactor of any preceding reactor provides at least one of the reflector modules formed from at least one of a molybdenum alloy, a nickel alloy or a carbide.

Another example fast spectrum molten salt nuclear reactor of any preceding reactor provides the liquid reflector material including at least one of liquid lead or liquid lead-bismuth.

Another example fast spectrum molten salt nuclear reactor of any preceding reactor includes a displacement assembly operably coupled to the reactor core section and configured to selectively displace a volume of the molten salt nuclear fuel in order to control reactivity within the molten salt nuclear fuel.

Another example fast spectrum molten salt nuclear reactor of any preceding reactor provides the displacement assembly configured to displace a volume of the molten salt nuclear fuel in order to reduce reactivity within the molten salt nuclear fuel.

Another example fast spectrum molten salt nuclear reactor of any preceding reactor provides the displacement assembly that includes a displacement element, an actuator operably coupled to the displacement element, and a controller. The controller is configured to selectively direct the actuator to control a position of the displacement element in order to control the reactivity within the molten salt nuclear fuel contained within the reactor core section.

Another example fast spectrum molten salt nuclear reactor of any preceding reactor provides the displacement element that is formed from a substantially non-neutron-absorbing material.

Another example fast spectrum molten salt nuclear reactor of any preceding reactor includes a molten salt transfer assembly.

Another example fast spectrum molten salt nuclear reactor of any preceding reactor provides the molten salt transfer assembly to include a molten salt transfer unit fluidically coupled to the reactor core section and configured to transfer a selected portion of the molten chloride salt fuel from a portion of the fast spectrum molten salt nuclear reactor to a reservoir. The molten salt transfer unit is further configured to transfer a feed material including at least some fertile material from a feed material supply to a portion of the fast spectrum molten salt nuclear reactor.

Another example fast spectrum molten salt nuclear reactor of any preceding reactor provides the at least some fertile material of the feed material that includes at least one fertile fuel salt.

Another example fast spectrum molten salt nuclear reactor of any preceding reactor provides the at least one fertile fuel salt in include a salt containing at least one of depleted uranium, natural uranium or thorium.

Another example fast spectrum molten salt nuclear reactor of any preceding reactor provides the at least one fertile fuel salt to include a salt containing at least one metal from a used nuclear fuel.

Another example fast spectrum molten salt nuclear reactor of any preceding reactor includes a fission product removal unit configured to remove at least one fission product from the molten chloride salt fuel.

Another example fast spectrum molten salt nuclear reactor of any preceding reactor includes a primary coolant loop fluidically coupled to the input of the nuclear core section and the output of the nuclear core section.

Another example fast spectrum molten salt nuclear reactor of any preceding reactor includes a primary heat exchanger and a secondary coolant loop, the primary coolant loop and the secondary coolant loop thermally coupled via the primary heat exchanger.

Another example fast spectrum molten salt nuclear reactor of any preceding reactor includes at least one pump disposed along the primary coolant loop to circulate the molten chloride salt nuclear fuel through the primary coolant loop.

Another example fast spectrum molten salt nuclear reactor of any preceding reactor provides the at least pump that circulates the molten chloride salt nuclear fuel through the primary coolant loop at or below a selected flow velocity limit.

Another example fast spectrum molten salt nuclear reactor of any preceding reactor includes a gas sparging unit configured to remove one or more noble gases from the molten chloride salt nuclear fuel.

Another example fast spectrum molten salt nuclear reactor of any preceding reactor includes a filter unit configured to remove at least one of a noble metal or a semi-noble metal from the molten salt nuclear fuel.

A example method of fueling a fast spectrum molten salt nuclear reactor includes providing a volume of $UCl_4$, providing a volume of at least one of an additional uranium chloride salt or an additional metal chloride salt, mixing the volume of $UCl_4$ with the volume of the at least one of an additional uranium chloride salt or an additional metal chloride salt to form a molten chloride salt nuclear fuel having a $UCl_4$ content greater than 5% by molar fraction, and supplying the molten chloride salt nuclear fuel having a $UCl_4$ content greater than 5% by molar fraction to at least a reactor core section of the fast spectrum molten salt nuclear reactor.

Another example method of any preceding method includes providing a volume of at least one of an additional uranium chloride salt or an additional metal chloride salt by providing a volume of $UCl_3$.

Another example method of any preceding method includes providing a volume of at least one of an additional uranium chloride salt or an additional metal chloride salt by providing a volume of at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example method of any preceding method includes providing the mixing the volume of $UCl_4$ with the volume of the at least one of an additional uranium chloride salt or an additional metal chloride salt to form a molten chloride salt nuclear fuel having a $UCl_4$ content greater than 5% by molar fraction by mixing the volume of $UCl_4$ with the volume of the at least one of an additional uranium chloride salt or an additional metal chloride salt to form a molten chloride salt nuclear fuel having a $UCl_4$ content greater than 5% by molar fraction and a melting temperature between 330 and 800° C.

Another example method of any preceding method includes providing the mixing the volume of $UCl_4$ with the volume of the at least one of an additional uranium chloride salt or an additional metal chloride salt to form a molten chloride salt nuclear fuel having a $UCl_4$ content greater than 5% by molar fraction by mixing the volume of $UCl_4$ with the volume of the at least one of an additional uranium chloride salt or an additional metal chloride salt to form a molten chloride salt nuclear fuel having a composition of $82UCl_4$-$18UCl_3$.

Another example method of any preceding method includes providing the mixing the volume of $UCl_4$ with the volume of the at least one of an additional uranium chloride salt or an additional metal chloride salt to form a molten chloride salt nuclear fuel having a $UCl_4$ content greater than 5% by molar fraction by mixing the volume of $UCl_4$ with the volume of the at least one of an additional uranium chloride salt or an additional metal chloride salt to form a molten chloride salt nuclear fuel having a composition of $17UCl_3$-$71UCl_4$-$12NaCl$.

Another example method of any preceding method includes providing the mixing the volume of $UCl_4$ with the volume of the at least one of an additional uranium chloride salt or an additional metal chloride salt to form a molten chloride salt nuclear fuel having a $UCl_4$ content greater than 5% by molar fraction by mixing the volume of $UCl_4$ with the volume of the at least one of an additional uranium chloride salt or an additional metal chloride salt to form a molten chloride salt nuclear fuel having a composition of $50\ UCl_4$-$50NaCl$.

Another example method of any preceding method includes providing the mixing the volume of $UCl_4$ with the volume of the at least one of an additional uranium chloride salt or an additional metal chloride salt by mixing the volume of $UCl_4$ with the volume of the at least one of an additional uranium chloride salt or an additional metal chloride salt inside of the fast spectrum molten salt nuclear reactor.

Another example method of any preceding method includes providing the mixing the volume of $UCl_4$ with the volume of the at least one of an additional uranium chloride salt or an additional metal chloride salt by mixing the volume of $UCl_4$ with the volume of the at least one of an additional uranium chloride salt or an additional metal chloride salt outside of the fast spectrum molten salt nuclear reactor.

An example molten chloride salt fuel for use in a fast spectrum molten salt nuclear reactor prepared by a process including providing a volume of $UCl_4$, providing a volume of at least one of an additional uranium chloride salt or an additional metal chloride salt, and mixing the volume of $UCl_4$ with the volume of the at least one of an additional uranium chloride salt or an additional metal chloride salt to form a molten chloride salt nuclear fuel having a $UCl_4$ content greater than 5% by molar fraction.

An example fast spectrum molten salt nuclear reactor includes a reactor core section including a fuel input and a fuel output. The fuel input and the fuel output are arranged to flow a mixture of molten salt nuclear fuel and at least one lanthanide through the reactor core section at start-up of the fast spectrum molten salt nuclear reactor.

Another example fast spectrum molten salt nuclear reactor of any preceding reactor provides the at least one lanthanide that includes at least one of La, Ce, Pr or Nd.

Another example fast spectrum molten salt nuclear reactor of any preceding reactor provides the mixture of molten salt nuclear fuel and at least one lanthanide that includes a mixture of molten salt nuclear fuel and at least one lanthanide formed by mixing the molten salt nuclear fuel with at least one lanthanide chloride.

Another example fast spectrum molten salt nuclear reactor of any preceding reactor provides the at least one lanthanide chloride that includes at least one of $LaCl_3$, $CeCl_3$, $PrCl_3$ or $NdCl_3$.

Another example fast spectrum molten salt nuclear reactor of any preceding reactor provides the mixture of molten salt nuclear fuel and at least one lanthanide that includes a mixture of molten salt nuclear fuel and at least one lanthanide having a lanthanide concentration between 0.1 and 10% by weight.

Another example fast spectrum molten salt nuclear reactor of any preceding reactor provides the mixture of molten salt nuclear fuel and at least one lanthanide having a lanthanide concentration between 0.1 and 10% by weight that includes a mixture of molten salt nuclear fuel and at least one lanthanide having a lanthanide concentration between 4 and 8% by weight.

Another example fast spectrum molten salt nuclear reactor of any preceding reactor provides the mixture of molten salt nuclear fuel and the at least one lanthanide that is formed outside of the fast spectrum molten salt nuclear reactor.

Another example fast spectrum molten salt nuclear reactor of any preceding reactor provides the mixture of molten salt nuclear fuel and the at least one lanthanide that is formed inside of the fast spectrum molten salt nuclear reactor.

Another example fast spectrum molten salt nuclear reactor of any preceding reactor provides the fuel input and the fuel output that are arranged to flow a mixture of molten salt nuclear fuel and at least one lanthanide through the reactor core section prior to achieving a selected reactivity threshold in the fast spectrum molten salt nuclear reactor.

Another example fast spectrum molten salt nuclear reactor of any preceding reactor provides the fuel input and the fuel output that are arranged to flow a mixture of molten salt nuclear fuel and at least one lanthanide through the reactor core section prior to achieving criticality in the fast spectrum molten salt nuclear reactor.

Another example fast spectrum molten salt nuclear reactor of any preceding reactor provides the fuel input and the fuel output that are arranged to flow a mixture of molten salt nuclear fuel and at least one lanthanide through the reactor core section prior to generation of a selected amount of plutonium in the fast spectrum molten salt nuclear reactor.

Another example fast spectrum molten salt nuclear reactor of any preceding reactor provides the molten salt nuclear fuel that includes a mixture of at least two of a first uranium chloride, a second uranium chloride or an additional metal chloride.

Another example fast spectrum molten salt nuclear reactor of any preceding reactor provides the additional metal chloride that includes at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$ or $AmCl_3$.

Another example fast spectrum molten salt nuclear reactor of any preceding reactor provides at least one of the first uranium chloride or the second uranium chloride that includes at least one of $UCl_4$ or $UCl_3$.

Another example fast spectrum molten salt nuclear reactor of any preceding reactor provides the molten salt nuclear fuel that has a composition of $82UCl_4$-$18UCl_3$.

Another example fast spectrum molten salt nuclear reactor of any preceding reactor provides the molten salt nuclear fuel that has a composition of $17UCl_3$-$71UCl_4$-$12NaCl$.

Another example fast spectrum molten salt nuclear reactor of any preceding reactor provides the molten salt nuclear fuel that has a composition of 50 $UCl_4$-50NaCl.

Another example fast spectrum molten salt nuclear reactor of any preceding reactor provides the molten salt nuclear fuel that has a composition of 34 $UCl_3$-66NaCl.

Another example fast spectrum molten salt nuclear reactor of any preceding reactor provides the mixture of at least a first uranium chloride, a second uranium chloride and an additional metal chloride that includes at least 5% by molar fraction $UCl_4$.

Another example fast spectrum molten salt nuclear reactor of any preceding reactor provides the mixture of at least a first uranium chloride, a second uranium chloride and an additional metal chloride that has a uranium concentration of greater than 61% by weight.

Another example fast spectrum molten salt nuclear reactor of any preceding reactor provides the mixture of at least a first uranium chloride, a second uranium chloride and an additional metal chloride that has a melting point between 330 and 800 degrees Celsius.

An example method of fueling a fast spectrum molten salt nuclear reactor includes providing a molten salt nuclear fuel and providing at least one lanthanide. Prior to start-up of the fast spectrum molten salt nuclear reactor, the molten salt nuclear fuel is mixed with the at least one lanthanide to form a lanthanide-loaded molten salt nuclear fuel. The lanthanide-loaded molten salt nuclear fuel is supplied to at least a reactor core section of the fast spectrum molten salt nuclear reactor.

Another example method of any preceding method provides a molten salt nuclear fuel by providing a mixture of at least two of a first uranium chloride, an additional uranium chloride and an additional metal chloride.

Another example method of any preceding method provides a molten salt nuclear fuel by providing a mixture of at least two of $UCl_4$, $UCl_3$ and an additional metal chloride.

Another example method of any preceding method provides the additional metal chloride to include at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$ or $AmCl_3$.

Another example method of any preceding method provides a molten salt nuclear fuel by providing a molten salt nuclear fuel having at least 5% by molar fraction $UCl_4$.

Another example method of any preceding method provides a molten salt nuclear fuel by providing a molten salt nuclear fuel having a uranium concentration of greater than 61% by weight.

Another example method of any preceding method provides a molten salt nuclear fuel by providing a molten salt nuclear fuel having a melting point between 330 and 800 degrees Celsius.

Another example method of any preceding method provides at least one lanthanide by providing at least one of La, Ce, Pr or Nd.

Another example method of any preceding method provides at least one lanthanide by providing at least one lanthanide in the form of a lanthanide chloride.

Another example method of any preceding method provides at least one lanthanide in the form of a lanthanide chloride by providing at least one of $LaCl_3$, $CeCl_3$, $PrCl_3$ or $NdCl_3$.

Another example method of any preceding method provides mixing of the molten salt nuclear fuel with the at least one lanthanide to form a lanthanide-loaded molten salt nuclear fuel by mixing the molten salt nuclear fuel with the at least one lanthanide to form a lanthanide-loaded molten salt nuclear fuel having a lanthanide concentration between 0.1 and 10% by weight.

Another example method of any preceding method provides mixing of the molten salt nuclear fuel with the at least one lanthanide to form a lanthanide-loaded molten salt nuclear fuel having a lanthanide concentration between 0.1 and 10% by weight by mixing the molten salt nuclear fuel with the at least one lanthanide to form a lanthanide-loaded molten salt nuclear fuel having a lanthanide concentration between 4 and 8% by weight.

Another example method of any preceding method provides mixing of the molten salt nuclear fuel with the at least one lanthanide to form a lanthanide-loaded molten salt nuclear fuel by mixing the molten salt nuclear fuel with the at least one lanthanide outside of the fast spectrum molten salt nuclear reactor.

Another example method of any preceding method provides mixing of the molten salt nuclear fuel with the at least one lanthanide to form a lanthanide-loaded molten salt nuclear fuel by mixing the molten salt nuclear fuel with the at least one lanthanide inside of the fast spectrum molten salt nuclear reactor.

Another example method of any preceding method provides, prior to start-up of the fast spectrum molten salt nuclear reactor, the mixing of the molten salt nuclear fuel with the at least one lanthanide to form a lanthanide-loaded molten salt nuclear fuel by, prior to achieving a selected reactivity threshold in the fast spectrum molten salt nuclear reactor, mixing the molten salt nuclear fuel with the at least one lanthanide to form a lanthanide-loaded molten salt nuclear fuel.

Another example method of any preceding method provides, prior to start-up of the fast spectrum molten salt nuclear reactor, mixing of the molten salt nuclear fuel with the at least one lanthanide to form a lanthanide-loaded molten salt nuclear fuel by, prior to achieving criticality in the fast spectrum molten salt nuclear reactor, mixing the molten salt nuclear fuel with the at least one lanthanide to form a lanthanide-loaded molten salt nuclear fuel.

Another example method of any preceding method provides, prior to start-up of the fast spectrum molten salt nuclear reactor, mixing of the molten salt nuclear fuel with the at least one lanthanide to form a lanthanide-loaded molten salt nuclear fuel by, prior to generation of a selected amount of plutonium in the fast spectrum molten salt nuclear reactor, mixing the molten salt nuclear fuel with the at least one lanthanide to form a lanthanide-loaded molten salt nuclear fuel.

An example molten salt fuel for use in a fast spectrum molten salt nuclear reactor prepared by a processing that includes providing a molten salt nuclear fuel, providing at least one lanthanide, and prior to start-up of the fast spectrum molten salt nuclear reactor, mixing the molten salt nuclear fuel with the at least one lanthanide to form a lanthanide-loaded molten salt nuclear fuel.

An example fast spectrum molten salt nuclear reactor includes a reactor core section including a fuel input and a fuel output. The fuel input and the fuel output are arranged to flow a molten salt nuclear fuel through the reactor core section. A displacement assembly is operably coupled to the reactor core section and configured to selectively displace a volume of the molten salt nuclear fuel in order to control reactivity within the molten salt nuclear fuel.

Another example fast spectrum molten salt nuclear reactor of any preceding claim provides the displacement assembly as configured to selectively displace a volume of the molten salt nuclear fuel at a central region of the reactor core section.

Another example fast spectrum molten salt nuclear reactor of any preceding claim provides the displacement assembly as configured to displace a volume of the molten salt nuclear fuel in order to reduce reactivity within the molten salt nuclear fuel.

Another example fast spectrum molten salt nuclear reactor of any preceding claim provides the displacement assembly to include a displacement element, an actuator operably coupled to the displacement element, and a controller. The controller is configured to selectively direct the actuator to control a position of the displacement element in order to control the reactivity within the molten salt nuclear fuel contained within the reactor core section.

Another example fast spectrum molten salt nuclear reactor of any preceding claim provides the displacement element and the reactor section to be centered along a common axis.

Another example fast spectrum molten salt nuclear reactor of any preceding claim provides the actuator as configured to drive the displacement assembly into the reactor core section in order to reduce the reactivity within the molten salt nuclear fuel.

Another example fast spectrum molten salt nuclear reactor of any preceding claim provides the actuator as configured to withdraw the displacement assembly from the reactor core section in order to increase the reactivity within the molten salt nuclear fuel.

Another example fast spectrum molten salt nuclear reactor of any preceding claim includes a reactivity parameter sensor configured to sense at least one reactivity parameter of the molten chloride salt nuclear fuel, wherein the reactivity parameter sensor is communicatively coupled to the controller.

Another example fast spectrum molten salt nuclear reactor of any preceding claim provides the reactivity parameter sensor that includes at least one of a fission detector, a neutron flux monitor, a neutron fluence sensor, a fission product sensor, a temperature sensor, a pressure sensor or a power sensor.

Another example fast spectrum molten salt nuclear reactor of any preceding claim provides the controller as configured to selectively direct the actuator to control the position of the displacement element within the reactor core section in response to at least one sensed reactivity parameter of the molten chloride salt nuclear fuel from the reactivity parameter sensor.

Another example fast spectrum molten salt nuclear reactor of any preceding claim provides the displacement element that includes a displacement rod.

Another example fast spectrum molten salt nuclear reactor of any preceding claim provides the displacement element that includes a plurality of displacement rods.

Another example fast spectrum molten salt nuclear reactor of any preceding claim provides the displacement element as formed from a substantially non-neutron-absorbing material.

Another example fast spectrum molten salt nuclear reactor of any preceding claim provides the displacement element as formed from at least one of a substantially neutron-transparent material or a substantially neutron-reflective material.

Another example fast spectrum molten salt nuclear reactor of any preceding claim includes a spill-over system configured to transport excess molten salt nuclear fuel out of the reactor core section.

Another example fast spectrum molten salt nuclear reactor of any preceding claim provides the spill-over system that includes a fuel salt uptake. The fuel salt uptake is positioned above a selected maximum molten salt nuclear fuel fill level of the reactor core section and configured to transport excess molten salt nuclear fuel out of the reactor core section. At least one fluid transport element and a spill-over reservoir are also included. The at least one fluid transport element fluidically couples the fuel salt uptake and the spill-over reservoir. The spill-over reservoir is configured to store excess molten salt nuclear fuel received from the at least one fluid transport element.

Another example fast spectrum molten salt nuclear reactor of any preceding claim provides the molten salt nuclear fuel that includes a mixture of at least two of a first uranium chloride, a second uranium chloride or an additional metal chloride.

Another example fast spectrum molten salt nuclear reactor of any preceding claim provides the additional metal chloride that includes at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example fast spectrum molten salt nuclear reactor of any preceding claim provides at least one of the first uranium chloride or the second uranium chloride that includes at least one of $UCl_4$ or $UCl_3$.

Another example fast spectrum molten salt nuclear reactor of any preceding claim provides the molten salt nuclear fuel that has a composition of $82UCl_4$-$18UCl_3$.

Another example fast spectrum molten salt nuclear reactor of any preceding claim provides the molten salt nuclear fuel that has a composition of $17UCl_3$-$71UCl_4$-$12NaCl$.

Another example fast spectrum molten salt nuclear reactor of any preceding claim provides the molten salt nuclear fuel that has a composition of 50 $UCl_4$-50NaCl.

Another example fast spectrum molten salt nuclear reactor of any preceding claim provides the molten salt nuclear fuel that has a composition of 34 $UCl_3$-66NaCl.

Another example fast spectrum molten salt nuclear reactor of any preceding claim provides the mixture of at least a first uranium chloride, a second uranium chloride and an additional metal chloride that includes at least 5% by molar fraction $UCl_4$.

Another example fast spectrum molten salt nuclear reactor of any preceding claim provides the mixture of at least a first uranium chloride, a second uranium chloride and an additional metal chloride that has a uranium concentration of greater than 61% by weight.

Another example fast spectrum molten salt nuclear reactor of any preceding claim provides the mixture of at least a first uranium chloride, a second uranium chloride and an additional metal chloride that has a melting point between 330 and 800 degrees Celsius.

Another example fast spectrum molten salt nuclear reactor of any preceding claim provides the molten salt nuclear fuel that includes a mixture of at least one uranium fluoride and an additional metal fluoride.

An example method includes determining a reactivity parameter in a molten salt nuclear fuel of a molten salt nuclear reactor and, responsive to the reactivity parameter in the molten salt nuclear fuel, displacing a selected volume of the molten salt nuclear fuel with at least one displacement element to control the reactivity of the molten salt nuclear fuel.

Another example method of any preceding method provides the determining a reactivity parameter in a molten salt nuclear fuel of a molten salt nuclear reactor by acquiring at least one of a neutron production rate, a neutron absorption rate, a neutron flux, a neutron fluence, a temperature, a pressure, a power or a fission product production rate of the molten salt nuclear fuel, and determining a reactivity parameter in the molten salt nuclear fuel of a molten salt nuclear reactor based on the at least one of a neutron production rate, a neutron absorption rate, a neutron flux, a neutron fluence, a temperature, a pressure, a power or a fission product production rate.

Another example method of any preceding method provides, responsive to a reactivity parameter in the molten salt nuclear fuel, displacing a selected volume of the molten salt nuclear fuel with at least one displacement element to adjust the reactivity of the molten salt nuclear fuel by responsive to a reactivity parameter indicative of excess reactivity in the molten salt nuclear reactor, displacing a selected volume of the molten salt nuclear fuel with at least one displacement element to reduce the reactivity of the molten salt nuclear reactor.

Another example method of any preceding method provides displacing a selected volume of the molten salt nuclear fuel with at least one displacement element by displacing a selected volume of the molten salt nuclear fuel by driving at least a portion of at least one displacement element into the molten salt nuclear fuel to reduce the reactivity of the molten salt nuclear reactor.

Another example method of any preceding method provides displacing a selected volume of the molten salt nuclear fuel with at least one displacement element by displacing a selected volume of the molten salt nuclear fuel by withdrawing at least a portion of at least one displacement element from the molten salt nuclear fuel to increase the reactivity of the molten salt nuclear reactor.

Another example method of any preceding method provides displacing a selected volume of the molten salt nuclear fuel by driving at least a portion of at least one displacement element into the molten salt nuclear fuel by displacing a selected volume of the molten salt nuclear fuel by driving a selected amount of at least one displacement element into the molten salt nuclear fuel, wherein the selected amount is based on the determined reactivity parameter.

Another example method of any preceding method provides displacing a selected volume of the molten salt nuclear fuel by driving at least a portion of at least one displacement element into the molten salt nuclear fuel by displacing a selected volume of the molten salt nuclear fuel by driving at least a portion of at least one displacement element into a volume of the molten salt nuclear fuel within a reactor core section of the molten salt nuclear reactor.

Another example method of any preceding method provides displacing a selected volume of the molten salt nuclear fuel by driving at least a portion of at least one displacement element into a volume of the molten salt nuclear fuel within a reactor core section of the molten salt nuclear reactor by displacing a selected volume of the molten salt nuclear fuel by driving at least a portion of at least one displacement element into a volume of the molten salt nuclear fuel at a central region of the reactor core section of the molten salt nuclear reactor.

Another example method of any preceding method provides displacing a selected volume of the molten salt nuclear fuel with at least one displacement element by displacing a selected volume of the molten salt nuclear fuel with at least one displacement rod.

Another example method of any preceding method provides displacing a selected volume of the molten salt nuclear fuel with at least one displacement rod by displacing a selected volume of the molten salt nuclear fuel with at least one hollow displacement rod.

Another example method of any preceding method provides displacing a selected volume of the molten salt nuclear fuel with at least one displacement rod by displacing a selected volume of the molten salt nuclear fuel with at least one solid displacement rod.

Another example method of any preceding method provides displacing a selected volume of the molten salt nuclear fuel with at least one displacement rod by displacing a selected volume of the molten salt nuclear fuel with a plurality of displacement rods.

Another example method of any preceding method provides the at least one displacement rod that is formed from at least one of lead or tungsten.

Another example method of any preceding method provides the displacing a selected volume of the molten salt nuclear fuel with at least one displacement element by displacing a selected volume of the molten salt nuclear fuel with at least one displacement rod formed from a substantially non-neutron-absorbing material.

Another example method of any preceding method provides the displacing a selected volume of the molten salt nuclear fuel with at least one displacement element by displacing between 0.1 and 10 cubic meters of the molten salt nuclear fuel with at least one displacement element.

Another example method of any preceding method provides determining a reactivity parameter in a molten salt nuclear fuel of a molten salt nuclear reactor by determining a reactivity parameter in a molten salt nuclear fuel including a mixture of at least two of a first uranium chloride, an additional uranium chloride or an additional metal chloride.

Another example method of any preceding method provides determining a reactivity parameter in a molten salt nuclear fuel including a mixture of at least two of a first uranium chloride, an additional uranium chloride or an additional metal chloride by determining a reactivity parameter in a molten salt nuclear fuel including a mixture of at least two of a first uranium chloride, an additional uranium chloride or an additional metal chloride a mixture of at least two of $UCl_4$, $UCl_3$ and an additional metal chloride.

Another example method of any preceding method provides the additional metal chloride that includes at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example method of any preceding method provides determining a reactivity parameter in a molten salt nuclear fuel by determining a reactivity parameter in a molten salt nuclear fuel having at least 5% by molar fraction $UCl_4$.

Another example method of any preceding method provides the determining a reactivity parameter in a molten salt nuclear fuel by determining a reactivity parameter in a molten salt nuclear fuel having a uranium concentration of greater than 61% by weight.

Another example method of any preceding method provides determining a reactivity parameter in a molten salt nuclear fuel by determining a reactivity parameter in a molten salt nuclear fuel having a melting point between 330 and 800 degrees Celsius.

An example fast spectrum molten salt nuclear reactor includes a reactor core section including a fuel input and a fuel output, the fuel input and the fuel output arranged to flow a molten salt nuclear fuel through the reactor core section and a molten fuel salt exchange assembly operably coupled to the reaction core section and configured to replace a selected volume of the molten salt nuclear fuel with a selected volume of feed material to control the reactivity of the molten salt nuclear reactor. The molten salt nuclear fuel includes at least some fissile material. The feed material includes at least some fertile material.

Another example fast spectrum molten salt nuclear reactor of any preceding reactor provides the selected volume of feed material that is substantially equal in volume to the selected volume of the molten salt nuclear fuel.

Another example fast spectrum molten salt nuclear reactor of any preceding reactor provides the replaced selected volume of the molten salt nuclear fuel that includes at least some fission products.

Another example fast spectrum molten salt nuclear reactor of any preceding reactor provides the at least some fission products that includes one or more lanthanides.

Another example fast spectrum molten salt nuclear reactor of any preceding reactor provides the replaced selected volume of the molten salt nuclear fuel that includes a carrier salt.

Another example fast spectrum molten salt nuclear reactor of any preceding reactor provides the molten fuel salt exchange assembly that includes a used-fuel transfer unit fluidically coupled to the reactor core section and configured to transfer a selected volume of the molten salt fuel from the reactor core section to a reservoir and a feed-fuel supply unit fluidically coupled to the reactor core section and configured to transfer a selected volume of feed material including at least some fertile material from a feed material source to the reactor core section.

Another example fast spectrum molten salt nuclear reactor of any preceding reactor that includes a controller is configured to selectively direct the used-fuel unit to transfer a selected volume of the molten salt fuel from the reactor core section to a reservoir and to selectively direct the feed-fuel supply unit to transfer a feed material including at least some fertile material from a feed material source to a portion of the reactor core section.

Another example fast spectrum molten salt nuclear reactor of any preceding reactor that includes a reactivity parameter sensor configured to sense at least one reactivity parameter of the molten salt nuclear fuel, wherein the reactivity parameter sensor is communicatively coupled to the controller.

Another example fast spectrum molten salt nuclear reactor of any preceding reactor provides the controller as configured to selectively direct the used-fuel transfer unit to transfer a selected volume of the molten salt fuel from the reactor core section to a reservoir and the controller is further configured to selectively direct the feed-fuel supply unit to transfer a feed material including at least some fertile material from a feed material source to a portion of the reactor core section in response to at least one sensed reactivity parameter of the molten salt nuclear fuel from the reactivity parameter sensor.

Another example fast spectrum molten salt nuclear reactor of any preceding reactor provides the reactivity parameter sensor that includes at least one of a fission detector, a neutron flux monitor, a neutron fluence sensor, a fission product sensor, a temperature sensor, a pressure sensor or a power sensor.

Another example fast spectrum molten salt nuclear reactor of any preceding reactor provides the reservoir that includes at least one of a storage reservoir.

Another example fast spectrum molten salt nuclear reactor of any preceding reactor provides the reservoir that includes at least one second generation molten salt reactor.

Another example fast spectrum molten salt nuclear reactor of any preceding reactor provides the at least some fertile material of the feed material that includes at least one fertile fuel salt.

Another example fast spectrum molten salt nuclear reactor of any preceding reactor provides the at least one fertile fuel salt that includes a salt containing at least one of depleted uranium, natural uranium or thorium.

Another example fast spectrum molten salt nuclear reactor of any preceding reactor provides the at least one fertile fuel salt that includes a salt containing at least one metal from a used nuclear fuel.

Another example fast spectrum molten salt nuclear reactor of any preceding reactor provides the molten salt nuclear fuel that includes a mixture of at least a first uranium chloride, a second uranium chloride and an additional metal chloride.

Another example fast spectrum molten salt nuclear reactor of any preceding reactor provides the additional metal chloride that includes at least one of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example fast spectrum molten salt nuclear reactor of any preceding reactor provides at least one of the first uranium chloride or the second uranium chloride that includes at least one of $UCl_4$ or $UCl_3$.

Another example fast spectrum molten salt nuclear reactor of any preceding reactor provides the molten salt nuclear fuel that has a composition of $82UCl_4$-$18UCl_3$.

Another example fast spectrum molten salt nuclear reactor of any preceding reactor provides the molten salt nuclear fuel that has a composition of $17UCl_3$-$71UCl_4$-$12NaCl$.

Another example fast spectrum molten salt nuclear reactor of any preceding reactor provides the molten salt nuclear fuel that has a composition of 50 $UCl_4$-50NaCl.

Another example fast spectrum molten salt nuclear reactor of any preceding reactor provides the molten salt nuclear fuel that has a composition of 34 $UCl_3$-66NaCl.

Another example fast spectrum molten salt nuclear reactor of any preceding reactor provides the mixture of at least a first uranium chloride, a second uranium chloride and an additional metal chloride that includes at least 5% by molar fraction $UCl_4$.

Another example fast spectrum molten salt nuclear reactor of any preceding reactor provides the mixture of at least a first uranium chloride, a second uranium chloride and an additional metal chloride that has a uranium concentration of greater than 61% by weight.

Another example fast spectrum molten salt nuclear reactor of any preceding reactor provides the mixture of at least a first uranium chloride, a second uranium chloride and an additional metal chloride that has a melting point between 330 and 800 degrees Celsius.

Another example fast spectrum molten salt nuclear reactor of any preceding reactor provides the molten salt nuclear fuel that includes a mixture of at least one uranium fluoride and an additional metal fluoride.

Another example fast spectrum molten salt nuclear reactor of any preceding reactor includes a gas sparging unit configured to remove a noble gas from the molten salt nuclear fuel.

Another example fast spectrum molten salt nuclear reactor of any preceding reactor includes a filter unit configured to remove at least one of a noble metal or a semi-noble metal from the molten salt nuclear fuel.

An example method includes operating a molten salt fast spectrum nuclear reactor including a molten salt nuclear fuel and replacing a selected volume of the molten salt nuclear fuel with a selected volume of feed material to control the reactivity of the molten salt nuclear reactor. The molten salt nuclear fuel includes at least some fissile material. The feed material includes at least some fertile material.

Another example method of any preceding method provides replacing a selected volume of the molten salt nuclear fuel with a selected volume of feed material by replacing a selected volume of the molten salt nuclear fuel with a selected volume of feed material equal in volume to the selected volume of the molten salt nuclear reactor.

Another example method of any preceding method provides replacing a selected volume of the molten salt nuclear fuel with a selected volume of feed material by replacing a selected volume of the molten salt nuclear fuel including at least some fission products with a selected volume of feed material.

Another example method of any preceding method provides replacing a selected volume of the molten salt nuclear fuel including at least some fission products with a selected volume of feed material by replacing a selected volume of the molten salt nuclear fuel including one or more lanthanides with a selected volume of feed material.

Another example method of any preceding method provides replacing a selected volume of the molten salt nuclear fuel with a selected volume of feed material by replacing a selected volume of the molten salt nuclear fuel including a carrier salt with a selected volume of feed material.

Another example method of any preceding method provides replacing a selected volume of the molten salt nuclear fuel with a selected volume of feed material to control the reactivity of the molten salt nuclear reactor by replacing a selected volume of the molten salt nuclear fuel with a selected volume of feed material to maintain the reactivity of the molten salt nuclear fuel of molten salt nuclear reactor.

Another example method of any preceding method includes measuring a reactivity parameter of the molten salt nuclear fuel of the molten salt fast spectrum nuclear reactor.

Another example method of any preceding method provides replacing a selected volume of the molten salt nuclear fuel with a selected volume of feed material to control the reactivity of the molten salt nuclear reactor by, responsive to the measured reactivity parameter of the molten salt nuclear fuel, replacing a selected volume of the molten salt nuclear fuel with a selected volume of feed material to control the reactivity of the molten salt nuclear reactor.

Another example method of any preceding method provides measuring a reactivity parameter of the molten salt nuclear fuel of the molten salt fast spectrum nuclear reactor by measuring at least one of a neutron production rate, a neutron absorption rate, a neutron flux, a neutron fluence, a temperature, a pressure, a power or a fission product production rate of the molten salt nuclear fuel of the molten salt fast spectrum nuclear reactor.

Another example method of any preceding method provides replacing a selected volume of the molten salt nuclear fuel with a selected volume of feed material to control the reactivity of the molten salt nuclear reactor by continuously replacing a selected volume of the molten salt nuclear fuel with a selected volume of feed material to control the reactivity of the molten salt nuclear reactor.

Another example method of any preceding method provides replacing a selected volume of the molten salt nuclear fuel with a selected volume of feed material to control the reactivity of the molten salt nuclear reactor by repeatedly replacing a selected batch volume of the molten chloride salt nuclear fuel with a selected volume of feed material to control the reactivity of the molten salt nuclear reactor.

Another example method of any preceding method provides replacing a selected volume of the molten salt nuclear fuel with a selected volume of feed material to control the reactivity of the molten salt nuclear reactor, the molten salt nuclear fuel including at least some fissile material, the feed material including at least some fertile material by removing a selected volume of the molten salt nuclear fuel from the fast spectrum molten salt nuclear reactor, the removed selected volume of molten salt nuclear fuel including at least some fissile material, and supplying a selected volume of feed material to the fast spectrum molten salt nuclear reactor, the supplied selected volume of feed material including at least some fertile material.

Another example method of any preceding method provides a rate of supply of the selected volume of feed material that is selected to match a rate of addition of fertile material into the molten salt nuclear reactor to a rate of burning of fissile material within the molten salt nuclear reactor.

Another example method of any preceding method provides the removed selected volume of the molten salt nuclear fuel that further includes at least one of a fission product, a fertile material or a carrier salt.

Another example method of any preceding method provides the at least some fertile material of the feed material that includes at least one fertile fuel salt.

Another example method of any preceding method provides the at least one fertile fuel salt that includes a salt containing at least one of depleted uranium, natural uranium or thorium.

Another example method of any preceding method provides the at least one fertile fuel salt that includes a salt containing at least one metal from a used nuclear fuel.

Another example method of any preceding method provides the at least one fertile fuel salt that maintains a chemical composition of the molten salt reactor fuel.

Another example method of any preceding method includes removing a noble gas from the molten salt nuclear fuel via a gas sparging process.

Another example method of any preceding method includes removing at least one of a noble metal or a semi-noble metal from the molten salt nuclear fuel via a plating process.

An example system includes at least one first generation molten salt nuclear reactor including a molten salt nuclear fuel, at least one second generation molten salt nuclear reactor, and a molten salt transfer unit configured to transfer a volume of molten salt nuclear fuel from the at least one first generation molten salt nuclear reactor to at least one second generation molten salt nuclear reactor. The volume of the molten salt nuclear fuel includes at least some fissile material enriched in the at least one first generation molten salt nuclear reactor.

Another example system of any preceding system provides the volume of the molten salt nuclear fuel including at least some fissile material that is enriched in the at least one first generation molten salt nuclear reactor to so as to achieve criticality in the at least one second generation molten nuclear reactor.

Another example system of any preceding system provides the volume of the molten salt nuclear fuel including at least some fissile material that is enriched in the at least one first generation molten salt nuclear reactor to so as to achieve criticality in the at least one second generation molten nuclear reactor without enrichment of the volume of the molten salt nuclear fuel in the at least one second generation molten nuclear reactor.

Another example system of any preceding system provides operation of the at least one first generation molten salt nuclear reactor to enrich at least some uranium to generate Pu-239 within the at least one first generation molten salt nuclear reactor.

Another example system of any preceding system provides the volume of molten salt nuclear fuel transferred from the at least one first generation molten salt nuclear reactor to the at least one second generation molten salt nuclear reactor that includes Pu-239 generated within the at least one first generation molten salt nuclear reactor.

Another example system of any preceding system provides the molten salt transfer unit that includes a fission product removal system configured to remove one or more fission products from the volume of molten salt nuclear fuel from the at least one first generation molten salt nuclear reactor.

Another example system of any preceding system provides the at least one first generation molten salt nuclear reactor that includes: a plurality of first generation molten salt nuclear reactors.

Another example system of any preceding system provides the at least one second generation molten salt nuclear reactor that includes a plurality of second generation molten salt nuclear reactors.

Another example system of any preceding system provides the molten salt nuclear fuel of the at least one first generation molten salt nuclear reactor that includes a mixture of at least two of a first uranium chloride, a second uranium chloride or an additional metal chloride.

Another example system of any preceding system provides the additional metal chloride that includes at least one of $NaCl$, $MgCl_2$, $CaCl_2$, $BaCl_2$, $KCl$, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$ or $NdCl_3$.

Another example system of any preceding system provides at least one of the first uranium chloride or the second uranium chloride that includes at least one of $UCl_4$ or $UCl_3$.

Another example system of any preceding system provides the molten salt nuclear fuel that has a composition of $82UCl_4$-$18UCl_3$.

Another example system of any preceding system provides the molten salt nuclear fuel that has a composition of $17UCl_3$-$71UCl_4$-$12NaCl$.

Another example system of any preceding system provides the molten salt nuclear fuel that has a composition of 50 $UCl_4$-$50NaCl$.

Another example system of any preceding system provides the molten salt nuclear fuel that has a composition of 34 $UCl_3$-$66NaCl$.

Another example system of any preceding system provides the mixture of at least two of a first uranium chloride, a second uranium chloride or an additional metal chloride that includes at least 5% by molar fraction $UCl_4$.

Another example system of any preceding system provides the mixture of at least two of a first uranium chloride, a second uranium chloride or an additional metal chloride that has a uranium concentration of greater than 61% by weight.

Another example system of any preceding system provides the mixture of at least two of a first uranium chloride, a second uranium chloride or an additional metal chloride that has a melting point between 330 and 800 degrees Celsius.

Another example system of any preceding system provides the molten salt nuclear fuel of the at least one first generation molten salt nuclear reactor that includes a mixture of at least one uranium fluoride and an additional metal fluoride.

An example method includes enriching at least a portion of a molten salt nuclear fuel in at least one first generation molten salt nuclear reactor, removing a volume of the enriched molten salt nuclear fuel from the at least one first generation molten salt nuclear reactor, and supplying at least a portion of the removed volume of molten salt nuclear fuel from the at least one first generation molten salt nuclear reactor to at least one second generation molten salt nuclear reactor.

Another example method of any preceding method provides enriching at least a portion of a molten salt nuclear fuel in at least one first generation molten salt nuclear reactor by enriching at least a portion of a molten salt nuclear fuel in at least one first generation molten salt nuclear reactor so as to achieve criticality in the at least one second generation molten nuclear reactor.

Another example method of any preceding method provides enriching at least a portion of a molten salt nuclear fuel in at least one first generation molten salt nuclear reactor so as to achieve criticality in the at least one second generation molten nuclear reactor by enriching at least a portion of a molten salt nuclear fuel in at least one first generation molten salt nuclear reactor so as to achieve criticality in the at least one second generation molten nuclear reactor without enrichment of the volume of the molten salt nuclear fuel in the at least one second generation molten nuclear reactor.

Another example method of any preceding method provides enriching at least a portion of a molten salt nuclear fuel in at least one first generation molten salt nuclear reactor by enriching at least some uranium within a volume of the molten salt nuclear fuel of the at least one first generation molten salt nuclear reactor to generate Pu-239.

Another example method of any preceding method incudes removing one or more fission products from the at least a portion of the volume of molten salt nuclear fuel removed from the at least one first generation molten salt nuclear reactor.

Another example method of any preceding method provides supplying at least a portion of the removed volume of molten salt nuclear fuel from the at least one first generation molten salt nuclear reactor to at least one second generation molten salt nuclear reactor by supplying a portion of the removed volume of molten salt nuclear fuel from the at least one first generation molten fast spectrum salt nuclear reactor to a first second generation molten salt nuclear reactor and supplying at least one additional portion of the removed volume of molten salt nuclear fuel from the at least one first generation fast spectrum molten salt nuclear reactor to at least one additional second generation molten salt nuclear reactor.

Another example method of any preceding method provides removing a volume of the enriched molten salt nuclear fuel from the at least one first generation molten salt nuclear reactor by removing a volume of molten salt nuclear fuel from at least one first generation molten salt nuclear reactor to control reactivity of the at least one first generation molten salt nuclear reactor.

Another example method of any preceding method provides removing a volume of the enriched molten salt nuclear fuel from the at least one first generation molten salt nuclear reactor by continuously removing a volume of the enriched molten salt nuclear fuel from the at least one first generation molten salt nuclear reactor.

Another example method of any preceding method provides removing a volume of the enriched molten salt nuclear fuel from the at least one first generation molten salt nuclear reactor by repeatedly removing a selected batch of a volume of the enriched molten salt nuclear fuel from the at least one first generation molten salt nuclear reactor.

Another example method of any preceding method that includes supplying a selected volume of feed material to the at least one first generation molten salt nuclear reactor, the feed material including at least some fertile material.

Another example method of any preceding method provides the at least some fertile material of the feed material that includes at least one fertile fuel salt.

Another example method of any preceding method provides the at least one fertile fuel salt that includes a salt containing at least one of depleted uranium, natural uranium or thorium.

Another example method of any preceding method provides the at least one fertile fuel salt that includes a salt containing at least one metal from a used nuclear fuel.

Another example method of any preceding method provides the at least one fertile fuel salt that maintains a chemical composition of the molten salt reactor fuel. Another example method of any preceding method includes supplying a selected volume of feed material to the at least one second generation molten salt nuclear reactor, the feed material including at least some fertile material.

An example fast spectrum molten salt nuclear reactor includes a reactor core section including a fuel input and a fuel output. The fuel input and the fuel output are arranged to flow a molten chloride salt nuclear fuel through the reactor core section. The molten chloride salt nuclear fuel includes a mixture of $UCl_4$ and at least one of an additional uranium chloride salt or an additional metal chloride salt, the mixture of $UCl_4$ and at least one additional metal chloride salt having a $UCl_4$ content greater than 5% by molar fraction.

Another example fast spectrum molten salt nuclear reactor of any preceding reactor provides the uranium concentration in the mixture of $UCl_4$ and at least one additional metal chloride salt that is greater than 61% by weight.

Another example fast spectrum molten salt nuclear reactor of any preceding reactor provides the additional uranium chloride salt that includes $UCl_3$.

Another example fast spectrum molten salt nuclear reactor of any preceding reactor provides the mixture of $UCl_4$ and at least one of an additional uranium chloride salt or an additional metal chloride salt has a composition of $82UCl_4$-$18UCl_3$.

Another example fast spectrum molten salt nuclear reactor of any preceding reactor provides the mixture of $UCl_4$ and at least one of an additional uranium chloride salt or an additional metal chloride salt that has a composition of $17UCl_3$-$71UCl_4$-$12NaCl$.

Another example fast spectrum molten salt nuclear reactor of any preceding reactor provides the mixture of $UCl_4$ and at least one of an additional uranium chloride salt or an additional metal chloride salt that has a composition of 50 $UCl_4$-50NaCl.

Another example fast spectrum molten salt nuclear reactor of any preceding reactor provides the mixture of $UCl_4$ and at least one of an additional uranium chloride salt or an additional metal chloride salt that has an additional metal chloride salt concentration at or below the precipitation concentration for the additional metal chloride salt.

Another example fast spectrum molten salt nuclear reactor of any preceding reactor provides the mixture of $UCl_4$ and at least one of an additional uranium chloride salt or an additional metal chloride salt that has a melting temperature below a temperature of 800 degrees Celsius.

Another example fast spectrum molten salt nuclear reactor of any preceding reactor provides the selected melting temperature that is above a temperature of 330 degrees Celsius.

Another example fast spectrum molten salt nuclear reactor of any preceding reactor provides breed-and-burn behavior that is established within the molten chloride salt nuclear fuel with a uranium-plutonium cycle.

An example method of fueling a fast spectrum molten salt nuclear reactor includes providing a volume of $UCl_4$, providing a volume of at least one of an additional uranium chloride salt or an additional metal chloride salt, mixing the volume of $UCl_4$ with the volume of the at least one of an additional uranium chloride salt or an additional metal chloride salt to form a molten chloride salt nuclear fuel having a $UCl_4$ content greater than 5% by molar fraction, and supplying the molten chloride salt nuclear fuel having a $UCl_4$ content greater than 5% by molar fraction to at least a reactor core section of the fast spectrum molten salt nuclear reactor.

Another example method of any preceding method provides a volume of at least one of an additional uranium chloride salt or an additional metal chloride salt by providing a volume of $UCl_3$.

Another example method of any preceding method provides the chlorine in the $UCl_4$ that is enriched with 37Cl.

Another example method of any preceding method provides the chlorine in the salt that is enriched to at least 75% 37Cl.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of controlling reactivity of a nuclear fission reaction in a fast spectrum, molten salt reactor comprising:
    sustaining a nuclear fission reaction with fast neutrons in an unmoderated nuclear reactor core, the fast neutrons generated by a molten fuel salt within the unmoderated nuclear reactor core, thereby generating heated molten fuel salt in the unmoderated nuclear reactor core;
    removing heat from the molten fuel salt by circulating the molten fuel salt between the unmoderated nuclear reactor core and one or more heat exchangers in which heated molten fuel salt is cooled;
    monitoring one or more reactivity parameters indicative of reactivity of the molten fuel salt within the nuclear reactor core, the one or more reactivity parameters including a first parameter; and
    when the first parameter indicative of reactivity indicates that the reactivity has increased above an upper threshold of reactivity, reducing the reactivity by replacing a first volume of the molten fuel salt with a second volume of a feed material that does not contain any fissile material.

2. The method of claim 1 wherein the first volume and the second volume are the same.

3. The method of claim 1 wherein the feed material consists of a mixture of a selected fertile material and salt.

4. The method of claim 1 wherein the replacing comprises:
    inserting one or more volumetric displacement bodies into the molten fuel salt within the molten salt reactor.

5. The method of claim 1 further comprising:
    determining the second volume of the feed material to be added to the nuclear reactor core necessary to bring the first parameter within the selected range.

6. The method of claim 1 wherein the first parameter indicative of reactivity of the molten fuel salt within the nuclear reactor core is $k_{eff}$ and the selected range of nominal reactivity is from 1.0 to 1.035.

7. The method of claim 1 wherein the first parameter indicative of reactivity of the molten fuel salt within the nuclear reactor core is $k_{eff}$ and the selected range of nominal reactivity is from 1.001 to 1.005.

8. The method of claim 1 wherein the first parameter indicative of reactivity of the molten fuel salt within the nuclear reactor core is $k_{eff}$ and the selected range of nominal reactivity is from 1.0 to 1.01.

9. The method of claim 1 further comprising:
    monitoring the one or more reactivity parameters indicative of reactivity of the nuclear reactor core; and
    controlling exchange of the first volume of the molten fuel salt with the second volume of a feed material, wherein the feed material consists of a mixture of a selected fertile material and salt based on the one or more reactivity parameters.

10. The method of claim 1 wherein the feed material consists of $UCl_3$ and one or more of $UCl_4$, NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $PuCl_3$, $AmCl_3$, $LaCl_3$, $CeCl_3$, $PrCl_3$, and/or $NdCl_3$.

* * * * *